US010067398B2

(12) United States Patent
O'Keeffe

(10) Patent No.: US 10,067,398 B2
(45) Date of Patent: Sep. 4, 2018

(54) ELECTROPHORETIC DEVICE HAVING A TRANSPARENT LIGHT STATE

(71) Applicant: Vlyte Innovations Limited, Shannon Airport (IE)

(72) Inventor: Donal O'Keeffe, Parteen (IE)

(73) Assignee: Vlyte Innovations Limited, Shannon Airport (IE)

( * ) Notice: Subject to any disclaimer, the term of this patent is extended or adjusted under 35 U.S.C. 154(b) by 0 days.

(21) Appl. No.: 14/772,919

(22) PCT Filed: Mar. 11, 2014

(86) PCT No.: PCT/EP2014/054734
§ 371 (c)(1),
(2) Date: Sep. 4, 2015

(87) PCT Pub. No.: WO2014/146937
PCT Pub. Date: Sep. 25, 2014

(65) Prior Publication Data
US 2016/0026061 A1 Jan. 28, 2016

(30) Foreign Application Priority Data

Mar. 22, 2013 (IE) .................................. S2013/0104
Dec. 30, 2013 (GB) .................................. 1323092.5

(51) Int. Cl.
*G02B 26/00* (2006.01)
*G02B 26/08* (2006.01)
(Continued)

(52) U.S. Cl.
CPC .......... *G02F 1/167* (2013.01); *G02F 1/13306* (2013.01); *G02F 1/13392* (2013.01); *G02F 2001/13396* (2013.01); *G02F 2203/01* (2013.01)

(58) Field of Classification Search
USPC ................ 359/237, 242, 245, 250–253, 267, 359/270–273, 290–292, 295, 296, 298,
(Continued)

(56) References Cited

U.S. PATENT DOCUMENTS 4,298,448 A 11/1981 Müller et al.
5,285,517 A 2/1994 Wu
(Continued)

FOREIGN PATENT DOCUMENTS

EP 2073057 A2 6/2009
WO 2005024767 A1 3/2005
(Continued)

OTHER PUBLICATIONS

Aizenberg, Joanna, et al., "Patterned Colloidal Deposition Controlled by Electrostatic and Capillary Forces," Physical Review Letters, vol. 84, Issue 13, Mar. 27, 2000, The American Physical Society, pp. 2997-3000.
(Continued)

*Primary Examiner* — Brandi Thomas
(74) *Attorney, Agent, or Firm* — Withrow & Terranova, P.L.L.C.

(57) ABSTRACT

An electrophoretic light attenuator comprises a cell including a first substrate (90), a second substrate (90) spaced apart from the first substrate, a layer arranged between the substrates and containing an electrophoretic ink (30), and a monolayer of closely packed protrusions (2) projecting into the electrophoretic ink (30) and arranged adjacent a surface of the second substrate. The protrusions (2) have surfaces defining a plurality of depressions between adjacent protrusions. The ink (30) includes charged particles (11) of at least one type, the particles being responsive to an electric field applied to the cell to move between a first extreme light state, in which the particles (11) are maximally spread within
(Continued)

US 10,067,398 B2

Page 2 the cell so as to lie in the path of light through the cell and thus strongly attenuate light transmitted from one substrate to the opposite substrate, and a second extreme light state, in which the particles (11) are maximally concentrated within the depressions so as to let light be transmitted.

17 Claims, 37 Drawing Sheets

(51) Int. Cl.
  *G02F 1/29* (2006.01)
  *G09G 3/34* (2006.01)
  *G02F 1/167* (2006.01)
  *G02F 1/133* (2006.01)
  *G02F 1/1339* (2006.01)

(58) Field of Classification Search
  USPC .................. 359/315, 321, 322; 345/107
  See application file for complete search history.

(56) References Cited

U.S. PATENT DOCUMENTS

| | | |
|---|---|---|
| 6,410,213 B1 | 6/2002 | Raguin et al. |
| 6,515,649 B1 | 2/2003 | Albert et al. |
| 6,900,923 B2 | 5/2005 | Chakrapani et al. |
| 6,934,067 B2 | 8/2005 | Ash et al. |
| 7,002,758 B2 | 2/2006 | Uno et al. |
| 7,319,554 B1* | 1/2008 | Abe .................. G02F 1/167 345/107 |
| 7,417,787 B2 | 8/2008 | Chopra et al. |
| 7,470,386 B2 | 12/2008 | Kang et al. |
| 7,824,516 B2 | 11/2010 | Amos et al. |
| 7,951,938 B2 | 5/2011 | Yang et al. |
| 7,957,054 B1 | 6/2011 | Yeo et al. |
| 8,174,755 B2 | 5/2012 | Yamamoto et al. |
| 8,184,357 B2 | 5/2012 | Yeo et al. |
| 8,837,032 B2 | 9/2014 | Lam et al. |
| 8,854,714 B2 | 10/2014 | Clapp et al. |
| 2002/0186197 A1 | 12/2002 | Biegelsen |
| 2007/0146310 A1* | 6/2007 | Paolini, Jr. .............. G02F 1/167 345/107 |
| 2008/0130092 A1 | 6/2008 | Whitesides et al. |
| 2009/0268303 A1 | 10/2009 | Takai |
| 2011/0149376 A1 | 6/2011 | Mabeck et al. |
| 2012/0134010 A1 | 5/2012 | Sprague et al. |
| 2012/0250141 A1* | 10/2012 | Chen .................. G02B 1/06 359/320 |
| 2014/0355101 A1 | 12/2014 | Shian et al. |

FOREIGN PATENT DOCUMENTS

| | | |
|---|---|---|
| WO | 2006108285 A1 | 10/2006 |
| WO | 2009000521 A1 | 12/2008 |
| WO | 2011154104 A1 | 12/2011 |
| WO | 2012076884 A1 | 6/2012 |
| WO | 2013110564 A1 | 8/2013 |

OTHER PUBLICATIONS

Schneider, Tod, et al., "50.4: Flexible Encapsulated Cholesteric LCDs by Polymerization Induced Phase Separation," SID Symposium Digest of Technical Papers, vol. 36, Issue 1, May 2005, Society for Information Display, pp. 1568-1571.
Zenner, Robert, et al., "20.2: Drive Waveforms for Active Matrix Electrophoretic Displays," SID Symposium Digest of Technical Papers, vol. 34, Issue 1, May 2003, Society for Information Display, pp. 842-845.
International Search Report and Written Opinion for International Patent Application No. PCT/EP2014/054734, dated Nov. 12, 2014, 26 pages.
International Preliminary Report on Patentability for International Patent Application No. PCT/EP2014/054734, dated Oct. 1, 2015, 19 pages.
Hansen, Charles, "Hansen Solubility Parameters: A User's Handbook," Second Edition, 2007, CRC Press, Boca Raton, Florida, 546 pages.
International Search Report and Written Opinion for International Patent Application No. PCT/EP2014/072241, dated Jan. 14, 2015, 8 pages.
International Preliminary Report on Patentability for International Patent Application No. PCT/EP2014/072241, dated May 6, 2016, 15 pages.
International Search Report and Written Opinion for International Patent Application No. PCT/EP2016/056225, dated May 25, 2016, 7 pages.
International Preliminary Report on Patentability for International Patent Application No. PCT/EP2016/056225, dated Oct. 10, 2017, 5 pages.

* cited by examiner

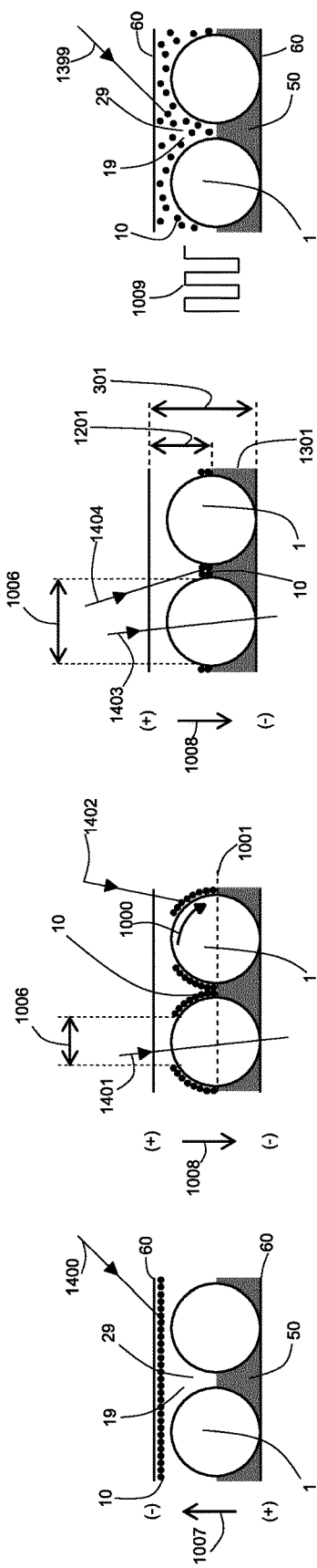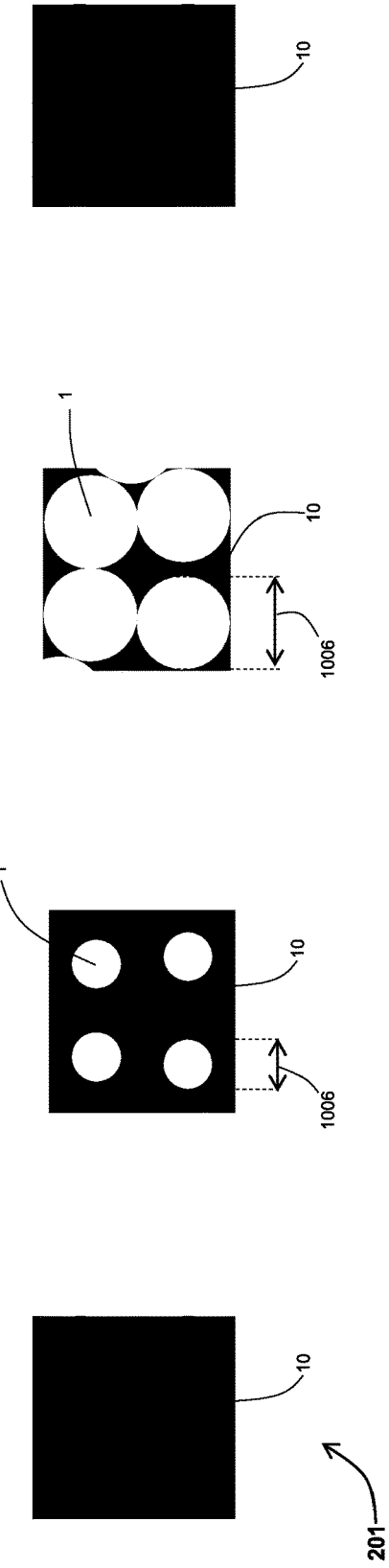
Fig. 1D
Fig. 1C
Fig. 1B
Fig. 1A

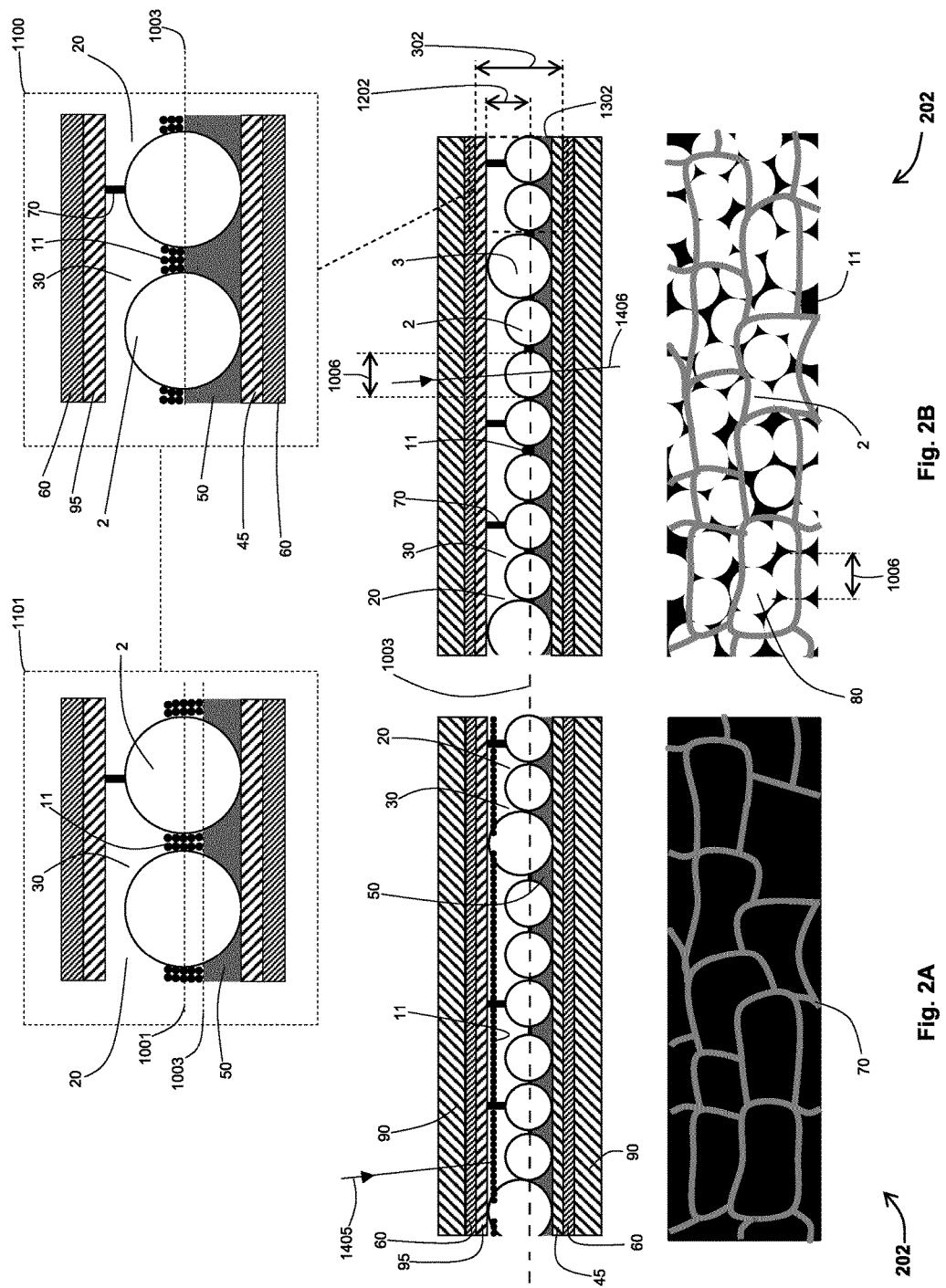

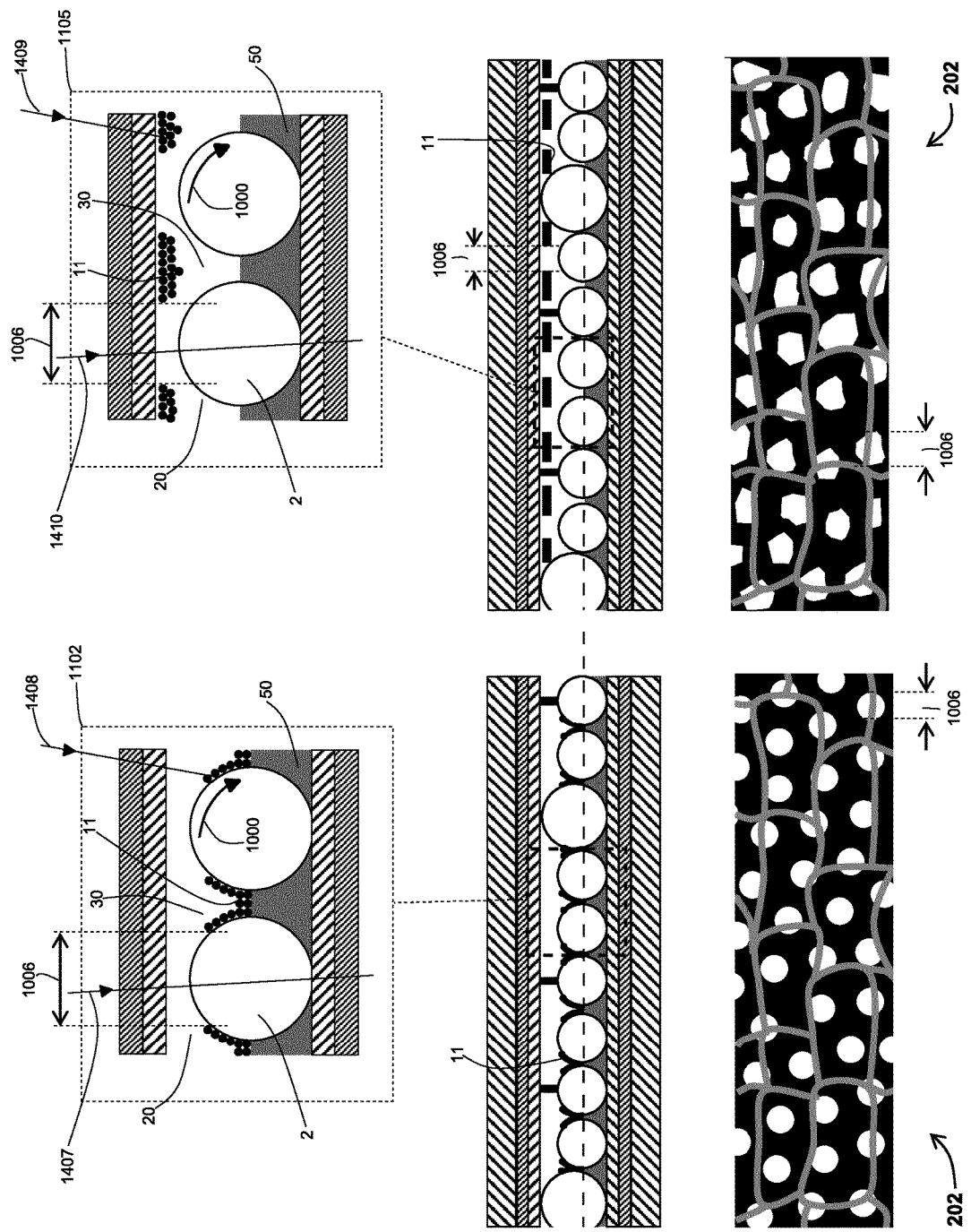

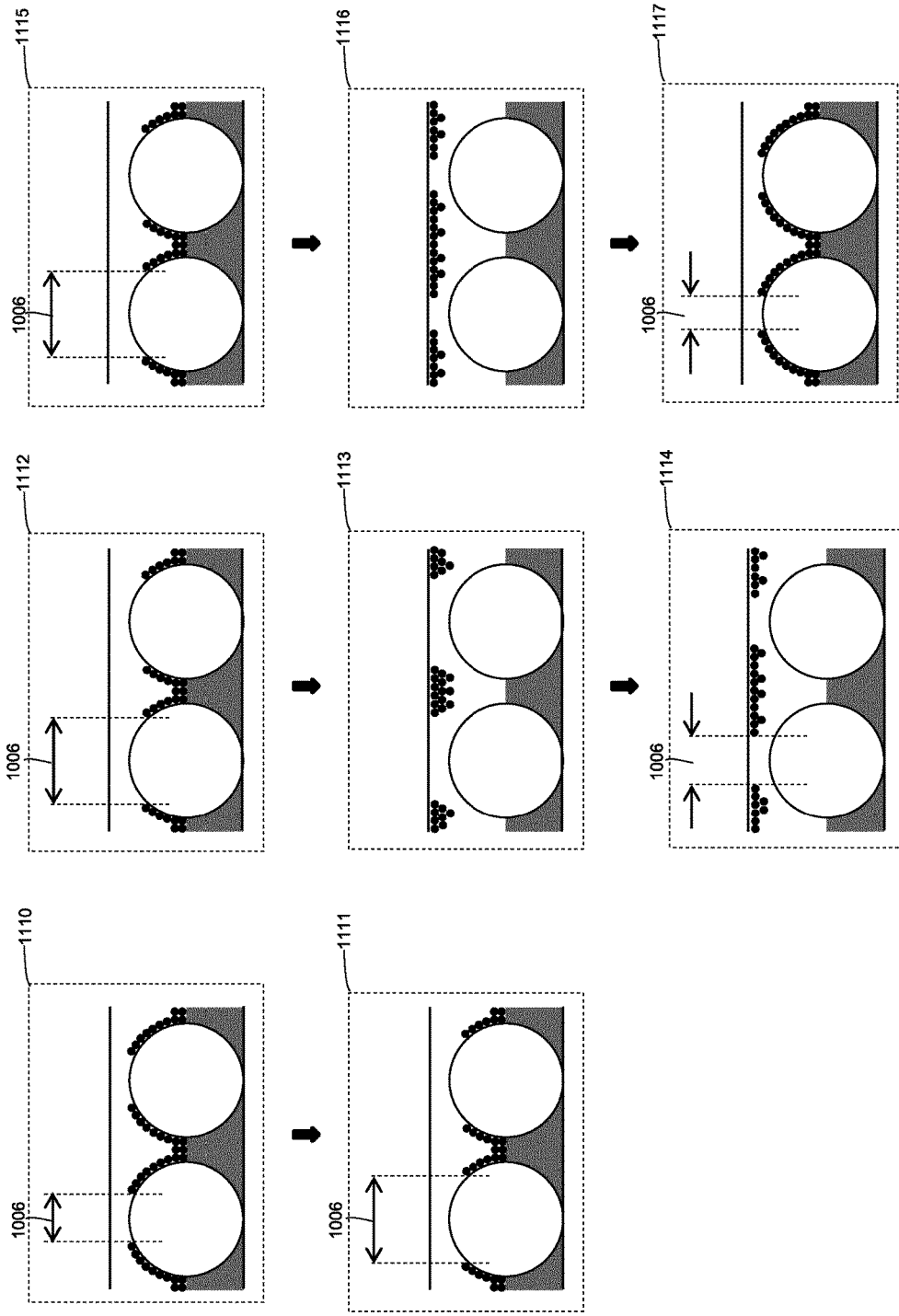

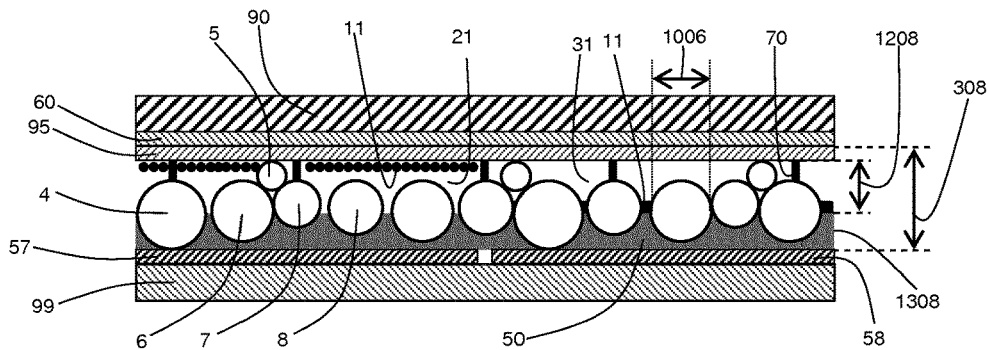
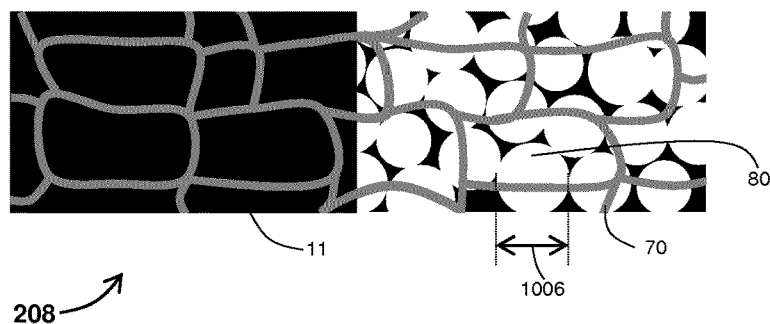
Fig. 8
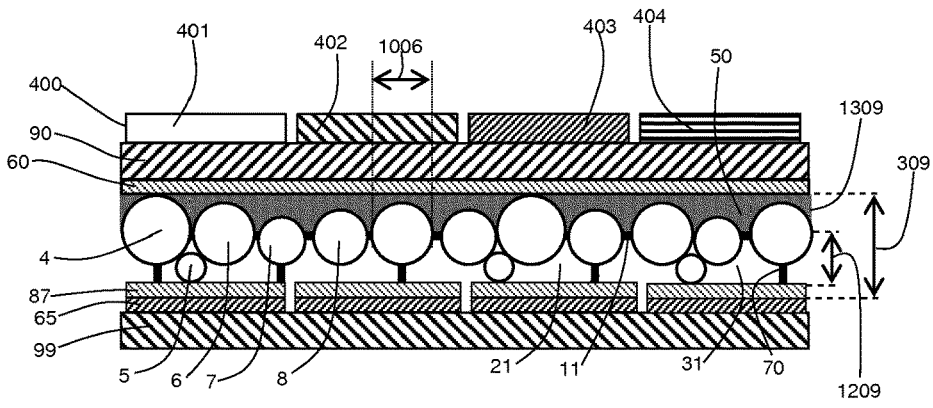
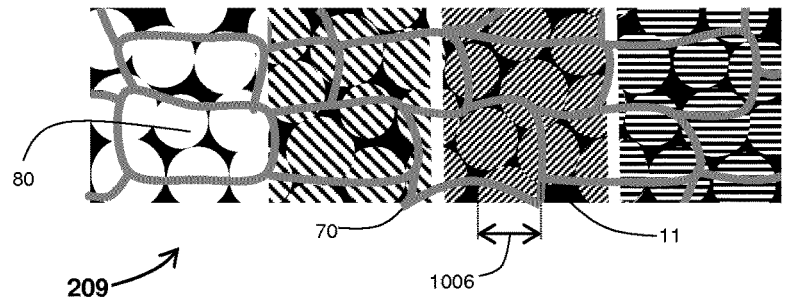
Fig. 9

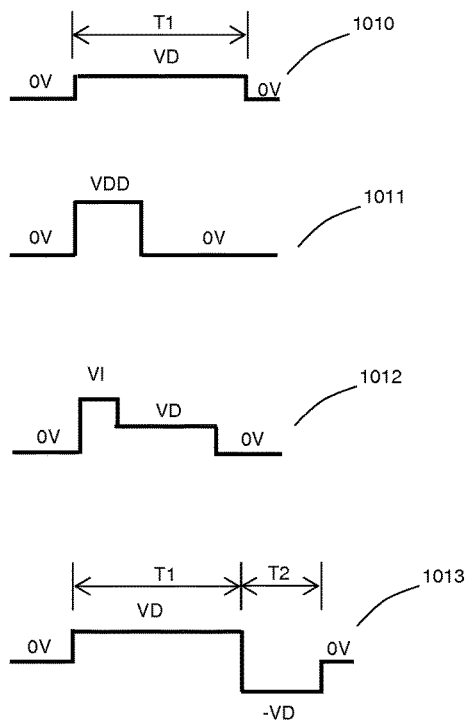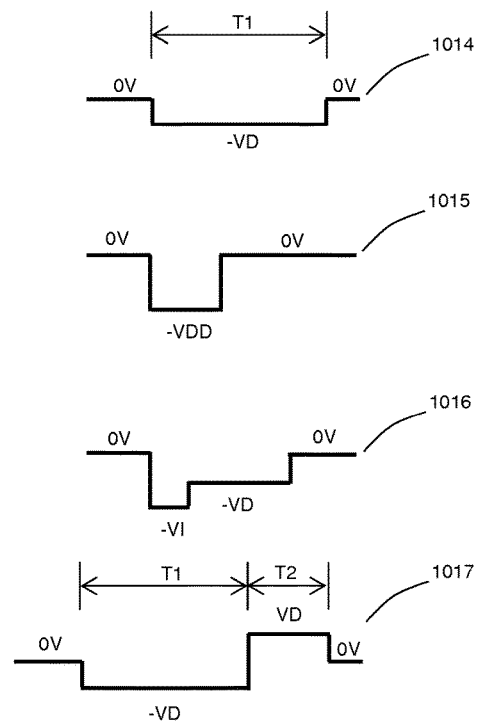
Fig. 16A    Fig. 16B
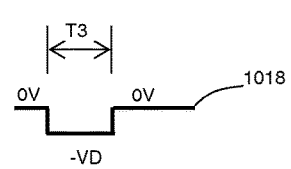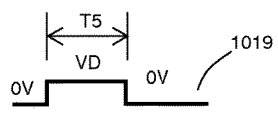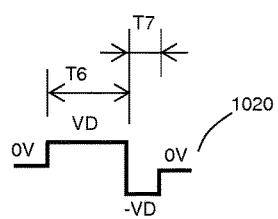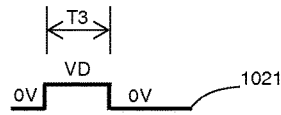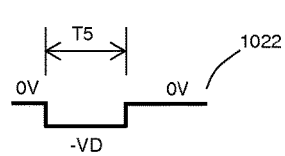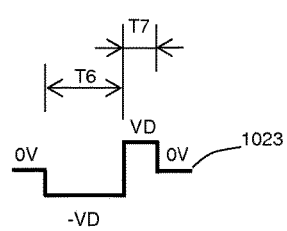
Fig. 16C    Fig. 16D

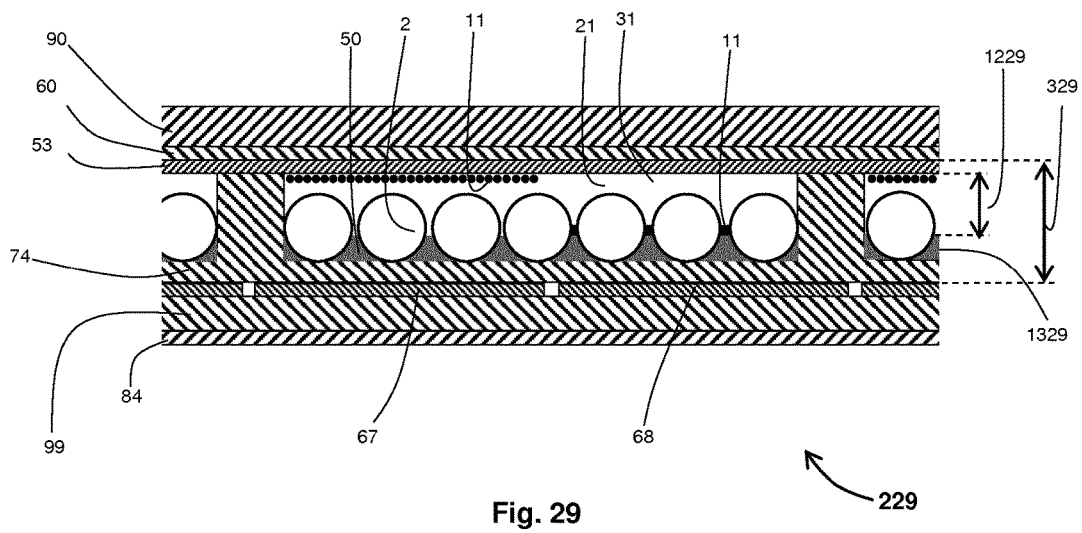
Fig. 29
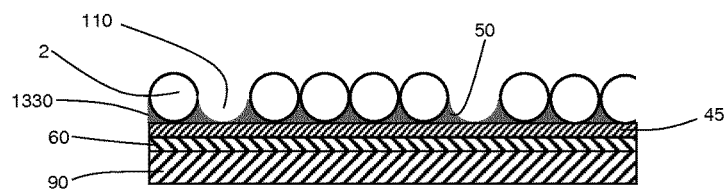
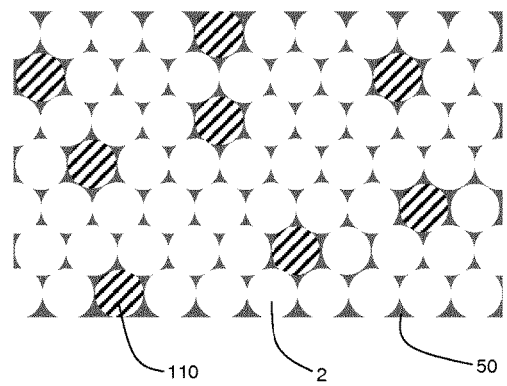
Fig. 30

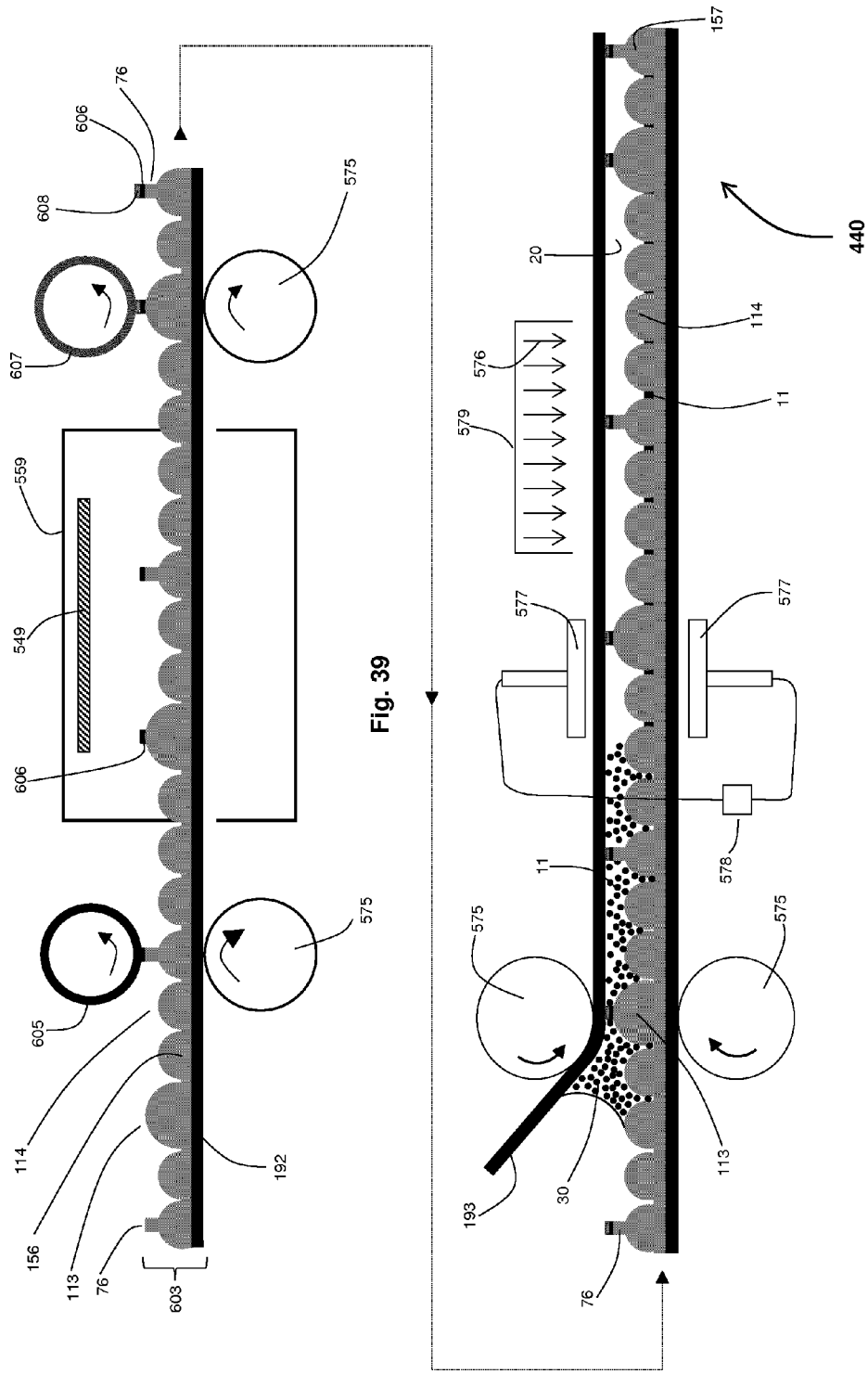

ELECTROPHORETIC DEVICE HAVING A TRANSPARENT LIGHT STATE

This application is a 35 USC 371 national phase filing of PCT/EP2014/054734, filed Mar. 11, 2014, which claims priority to Irish national patent application no. S2013/0104 filed Mar. 22, 2013 and United Kingdom national patent application no. 1323092.5 filed Dec. 30, 2013, the disclosures of which are incorporated herein by reference in their entireties.

FIELD

The present invention relates to an electrophoretic device having a construction that provides transparent light states for use in selectively controlling light, and a method for manufacturing and operating an electrophoretic device.

BACKGROUND TO THE INVENTION

There is a need for an electro-optical device that in one or more light states is transparent to visible light and in other light states attenuates light, and in particular for a device that transmits a high level of light in an extreme light state. Applications for such a device include use as a light attenuator in a smart glass, use as a see-through display, or use as a sunlight-readable, reflective display.

It is desirable to control light transmittance in windows, and to provide functions including: see-through (i.e. transparent), privacy (opaque), variable tinting or dimming, or black-out (light transmittance of a few percent or less). In the prior art, the available active window solutions (i.e. selectable or switchable light control) have limited functionality and inherent technological obstacles. In display devices it is desirable to extend functionality into new areas such as providing see-through (i.e. transparent displays), or providing large-format, sunlight-readable, reflective displays for outdoor applications.

Conventional electrophoretic displays move oppositely charged particle sets in a suspending fluid in the direction of an electrical field. This is normally an orthogonal field and a transparent state is not possible. Inherent in the addressing of these displays is the need to flash or blank a screen each time it is updated to achieve repeatable, grey-scale, light states. The white state in conventional electrophoretic displays can appear grey instead of white because they rely on white charged particles to reflect light, and typically the reflected light is about 50% of the incident light on a particle. By contrast, a diffuse white reflector layer revealed by a highly transparent state could provide up to 100% reflectance within the aperture area revealed.

One proposal to create a transparent state in an electrophoretic device is to finely pattern one or both electrodes. This allows the charged particles to be moved laterally as well as vertically and to collect on patterned electrodes (corresponding to a subset of a display area) that have a pitch of about 200 to 300 microns. The area between patterned electrodes is then transparent and provides visual access. In some examples of display devices employing patterned electrodes just one substrate has electrodes and particles move laterally between neighbouring electrodes with one electrode group accounting for about 70% of the area. But while the fine patterning of electrodes is normal for display devices having a matrix of pixels, it adds undesirable complexity. In a light attenuator for smart glass applications fine patterning of electrodes is prohibitively expensive.

Examples of electrophoretic devices that may have an inherent transparent light state capable of transmitting light and providing visual access include electrophoretic devices that use a dielectrophoretic effect to collect charged particles at a side wall of a capsule in one light state; or electrophoretic devices that form microstructures in place (e.g., using one of the following processes: embossing with a directly-formed tool, photolithography, extruding, or laser micromachining) to collect charged particles in one light state; or electrophoretic devices that use the dispersal (i.e. in a suspending fluid volume) of 10 nm to 50 nm scale, charged nanoparticles to transmit light and provide visual access in one light state; or hybrid electrophoretic devices (called electrokinetic by their inventors at Hewlett Packard) that use photolithographically created micro-pits to collect charged particles in one light state. The feasibility of these prior art electrophoretic technologies for a light attenuator in a smart glass application is questionable due to the efficacy of their transparent light state or their complexity, and for some of these technologies in display devices their complexity limits them to small-area applications. For example, one proponent of replicated microstructures proposes making embossing moulds on silicon. This would seem to limit such devices to small areas and discrete or batch manufacturing, and such tooling would not seem suited to large-format, roll-to-roll manufacturing.

In conclusion, there is a need for an electrophoretic device that has an inherent transparent light state and provides variable control of light attenuation. Its construction and method of manufacture needs to be compatible with roll-to-roll manufacture, and a web width of about 1M for smart glass applications. Its operation should provide seamless variable light control in applications ranging from smart glass to active-matrix displays and avoid the need for flashing or blanking.

SUMMARY OF THE INVENTION

In a first aspect, a light attenuator comprises a cell comprising a first substrate and a second substrate spaced apart from said first substrate, and a layer between said substrates containing an electrophoretic ink, a surface of said layer adjacent said second substrate comprising a monolayer of closely packed protrusions projecting into said layer, said protrusions having surfaces defining a plurality of depressions in the volumes there between, said ink including charged particles of at least one type, the particles being responsive to an electric field applied to said cell to move between: a first extreme light state, in which particles are maximally spread within the cell to lie in the path of light through the cell and to strongly attenuate light transmitted through the cell; over the surface of said protrusions, which deflect said particles from their path from the first substrate to the second substrate; to a second extreme light state in which said particles are maximally concentrated within said depressions to remove them from the path of light through the cell and to substantially transmit light through the cell.

Preferably, each of said substrates comprises a respective electrode defining an electrophoretic cell.

Alternatively, each of said substrates comprises a layer which is arranged to be affixed in cofacing relationship with a respective electrode of an electrophoretic cell.

In some embodiments said electrophoretic cell is metastable having one or more light states intermediate said first and second light states. Preferably the number of intermediate light states is sufficient to provide variable light attenuation or variable light transmittance.

In some embodiments said protrusions are microspheres, microbeads, microparticles, or polymer balls, and can be substantially (i.e. about >80%) monodisperse or have a distribution of sizes and/or shapes. Preferably said protrusions are spherical and 75% or more have a minimum diameter of about half the thickness of the electrophoretic cell and a maximum diameter of less than the thickness of the cell.

In some embodiments the protrusions are in discrete form and formed from a powder or suspension used to coat a substrate and form said monolayer of close packed protrusions in said electrophoretic cell.

In some embodiments the light attenuator can be a layer within a monolithic, glass laminate and be a window, or a light attenuator can incorporate a specularly reflective surface and be a mirror, or a light attenuator can be used as a light shutter, a light modulator, a variable light transmittance sheet, a variable light absorptance sheet, a variable light reflectance sheet, a monochrome display, a colour display that uses a colour filter with said monochrome display, or a see-through display.

In said second light state, each protrusion provides a discrete aperture area that is substantially free of said charged particles and transparent to specular light, said concentrated particles surrounding said aperture areas defining a contiguous strongly light attenuating area. In such embodiments, these two types of areas give rise to an aperture fraction representing the face area of said electrophoretic cell that is transparent, and the aperture fraction corresponds to a maximum light transmittance level that in turn is directly related to the degree of said close packing of protrusions whereby the greater the degree of close packing, the greater the light transmittance of said electrophoretic cell.

The close packing of protrusions in embodiments, in increasing degree of packing, is one of random close packing, or part random and part lattice close packing (i.e. quasi-random), or lattice close packing including hexagonal, square, rectangular, rhombic, or parallelogrammic, or aspects of these when protrusions have a distribution of sizes. Preferably to achieve a high level of close packing said protrusions have two or more sizes, and more preferably a distribution of sizes.

In some embodiments, in a second light state a viewer's perception of black tint is one of a uniform tinting due to the micron scale, discrete distribution, and dense distribution of said aperture areas in surrounding contiguous black area. The perception of tint in the second light state is comparable to the black tint in the windshield of a vehicle having tinted glass.

Preferably the maximum separation of neighbouring protrusions at their equator plane does not exceed 250 microns to avoid a perceivable optical defect, and more preferably does not exceed 150 microns.

Embodiments provide two sets of intermediate light states, each unidirectional, a first set of intermediate light states transitions from said first light state and provides a range of increasing (i.e. variable) light transmittance levels as charged particles vacate an increasing aperture area on each protrusion's surface as a second light state is approached, and a second set of intermediate light states transitions from said second light state and provides a range of decreasing light transmittance levels as concentrated charged particles spread adjacent said first electrode, decreasing aperture areas as said first light state is approached.

In said intermediate light states, metastability is enhanced by the van der Waals interaction of said charged particles with the surface of protrusions in said first set of intermediate light states, or the planar surface adjacent said second electrode in said second set of intermediate light states. This contrasts with charged particles having no interaction with a solid surface in intermediate states of prior art electrophoretic devices.

Embodiments minimize the time to switch from a first light state to a second light state by minimizing the distance charged particles travel within an electrophoretic cell. To reach a second light state in an electrical field, said charged particles acquire a lateral component as well as an orthogonal component to their movement, and when protrusions are spherical, particles are laterally deflected by no more than the radius of a protrusion (e.g., r=10 microns). In preferred embodiments, the orthogonal component is about half the cell gap (e.g., d/2=15 microns) as said charged particles concentrate in a second light state about midway through an electrophoretic cell (not including an OCA layer if present). This short distance or path contrasts with the 200 microns or more that charged particles have to move in prior art, patterned-electrode, light attenuators.

In embodiments said electrophoretic cell includes one or more of the following polymer elements: protrusions, space-filling polymer, and cavity walls; and to minimize haze these elements are optically isotropic and refractive index matched to the suspending fluid of said electrophoretic ink, preferably within 0.01 of each other, more preferably within 0.005, and most preferably within 0.002; said polymer elements are a non-polar, amorphous, polymer—most preferred—or a polar, amorphous polymer, and preferably elements have compatible polymers (e.g., lipophilic polymers), more preferably elements have similar chemistries (e.g., acrylates/methacrylates), and most preferably elements use substantially the same monomer components.

Preferably, said polymer elements (i.e. protrusions, space-filling-polymer 50, and cavity walls) are crosslinked, and more preferably polymer elements are insoluble in a suspending fluid. In this regard preferably a suspending fluid's dominant functionality is provided by a fluorocarbon (i.e. a fluorinated oil), a perfluorinated compound, or a polymerized siloxane (i.e. a silicone oil).

In some embodiments a small percentage (<10%, and preferably <5%) of protrusions act as cell-gap spacers and in addition to being used to establish a uniform thickness for said electrophoretic cell, the cell-gap spacers ensure space within an electrophoretic cell for an electrophoretic ink to surround or engulf the main distribution of protrusions (i.e. all protrusions other than cell-gap spacers) and allow said charged particles therein to spread adjacent the first electrode in a first light state unobstructed by the main distribution of protrusions.

In some embodiments there are two cell-gap, spacer sizes: a first spacer establishes a uniform polymer-ball film thickness and a second spacer is dispersed in an electrophoretic ink and sits over protrusions to space-apart protrusions from the first electrode, together the spacers determine the cell gap of an electrophoretic cell (see embodiment 204 in FIG. 4).

In some embodiments said electrophoretic cell is divided into a monolayer of discrete or semi-discrete cavities and said cavities conform to the curvature of said protrusions on one side and the planar surface of said second electrode on another side. The cavities may be formed by one of a PIPS process or a photolithographic process within the electrophoretic cell, or said cavities may be formed in a separate microencapsulation process that results in conformal shells and these shells are subsequently coated as a monolayer onto said protrusions. The polymer walls of said cavities form a web-like network of walls within an electrophoretic cell at about 10 micron to 150 micron spacing, and provide one or more of the following: mechanical strength for said light attenuator, self-sealing for said electrophoretic ink, and resistance to delamination in a glass laminate embodiment.

In some embodiments the first light state appears opaque and provides a privacy function. This is achieved by keeping the level of said charged particles in the electrophoretic ink sufficiently high (i.e. >10% by mass, preferably >15%, and most preferably >17.5%) to have negligible specular light transmittance. In other embodiments, the first light state is still partially transparent, the latter is achieved by keeping the level of said charged particles in the electrophoretic ink sufficiently low to provide a specified level of specular light transmittance.

Some embodiments provide a substantially uniform electrical field in the electrophoretic cell by raising the dielectric constant of an electrophoretic ink's suspending fluid using a soluble additive in order for it to match the dielectric constant of protrusions. Preferably said matching is within 0.3 of each other in an electrical field, more preferably within 0.2, and most preferably within 0.15. Preferably said additive is a polarizable dielectric fluid representing <35% of the overall mass of a suspending fluid and most preferably said polarizable dielectric additive is a liquid crystal fluid, and even more preferred said liquid crystal additive also raises the refractive index of said suspending fluid.

Preferably embodiments that reflect light (i.e. a mirror embodiment or a reflective display embodiment) are orientated with said electrophoretic ink layer adjacent a reflective surface, and in a first light state said charged particles directly mask the reflective surface.

In reflective display embodiments said second light state has one of: Lambertian reflectance provided by a rear diffuse reflector, or directional reflectance provided by a rear retroreflector, or partial reflectance and partial transmittance provided by a rear transflector and backlight.

Some embodiments provide a range of variable, coloured, light transmittance levels (equivalent to a colour filter having a variable colour density) by using dye colorant in their charged particles and by refractive index matching the charged particles to their electrophoretic ink's suspending fluid.

Some embodiments provide a range of variable, coloured translucency levels (equivalent to frosted or colour pigmented glass) by using pigment colourant in their charged particles.

In some embodiments (i.e. 211) all of the volume between protrusions is occupied by an electrophoretic ink apart from cavity walls, preferably such embodiments use positively and negatively charged black particles in their electrophoretic ink so that in the second light state, concentrated particles congest in the space between protrusions (about the equator plane) thereby minimizing the volume occupied by concentrated particles and maximizing the light transmittance level.

In use, some embodiments, (i.e. 212) act as an electrophoretic skin or electrophoretic paint layer when secured to an underlying opaque surface such that the first light state hides the underlying surface from view (with black particles) and a second light state reveals it.

Some embodiments (i.e. 213) are an electrophoretic sun visor for a vehicle and use variable light attenuation to eliminate glare from the sun while providing reduced transparency.

Some embodiments (i.e. 214) include patterned electrodes to allow block areas on the face of an electrophoretic device to be independently addressed in first, second and intermediate light states. Examples of such embodiments include a visor (i.e. 215) in which a face is divided into horizontal stripes so that one area can be operated in a strongly light attenuating state (e.g. the first light state) to avoid glare from the sun and another area operated in a light transmitting state (e.g. the second light state) to allow visual access, and in use the relative widths of such areas can be varied by a user. In some embodiments the protrusions are adhered to an adhesive sheet or adhesive layer or an adhesive or tacky surface on a substrate for at least one step of a process to construct the electrophoretic cell.

In some embodiments, a dry powder coating of protrusions causes stacking and in a subsequent process step, stacked protrusions are removed to reveal a monolayer of protrusions by directing a pressured gas/air flow at them.

In a second aspect there is provided a metastable light attenuator comprising:

an electrophoretic cell comprising a first electrode and a second electrode spaced apart from said first electrode, and a layer between said electrodes containing an electrophoretic ink, said ink including charged particles of at least one type;

a programmable controller operably connected to each of said electrodes and being arranged to apply signals to said electrodes to generate an intermittent electric field across said ink to drive said particles to one of a first extreme light state in which particles are maximally spread within the cell to lie in the path of light through the cell and to strongly attenuate light transmitted through the cell, or a second extreme light state in which said particles are maximally concentrated within the cell to remove them from the path of light through the cell and to substantially transmit light through the cell, or two or more light states intermediate said first and second light states, the programmable controller being operable to apply an intermittent signal to said electrodes to drive said particles from one intermediate light state to a second intermediate light state while remaining within a range of light transmittance defined by said two intermediate light states to avoid flashing.

Preferably, said intermediate light states provide one of variable light transmittance, variable light absorbance or variable light reflectance.

Preferably said attenuator is incorporated in one of: a window, a mirror, a light shutter, a light modulator, a variable light transmittance sheet, a variable light absorbance sheet, a variable light reflectance sheet, a monochrome display, a colour display that uses a colour filter with said monochrome display, or a see-through display.

Preferably said controller is operable to drive said particles from one intermediate light state to a second intermediate light state directly and without passing through one of said first or second light states to avoid flashing.

Preferably, in said first light state, said particles are maximally distributed across a substantially planar surface of said electrophoretic cell.

Preferably, in said second light state said particles are maximally concentrated at a surface of said electrophoretic cell opposite said planar surface. Preferably said surface comprises a non-planar, polymer structure and the structure is shaped to interact with said particles within said electrical field causing particles to be concentrated.

Preferably, in said second light state protrusions in said structure deflect said particles in said electrical field away from their path from said first electrode to said second electrode causing the particles to move over the surface of said protrusions and further causing particles to be driven to concentrate in the space between protrusions.

Preferably, said programmable controller is arranged to drive said particles from said first light state to a selected one of a first set of intermediate light states and thereafter within said first light state set, said particles are progressively deflected by said protrusions from the path of light through the cell towards said second light state with increasing light transmittance and without flashing.

Further preferably, said programmable controller is arranged to drive said particles from said second light state to a selected one of a second set of intermediate light states and thereafter within said second light state set said particles are progressively distributed across said planar surface towards said first light state with decreasing light transmittance and without flashing. In this case, the programmable controller is arranged to drive said particles from said second light state towards said planar surface before driving said particles to said one of said second set of intermediate light states.

In some embodiments, said programmable controller is arranged to drive said particles from one of said first set of intermediate light states with a given light transmittance to a less transmissive state in said second light state set by driving said particles to a planar surface of said electrophoretic cell and subsequently driving said particles to a selected one of said second set of intermediate light states less transmissive than said one of said first set of intermediate light states without flashing.

Alternatively in some embodiments, said programmable controller is arranged to drive said particles regressively from one of said first set of intermediate light states with a given light transmittance to a less transmissive state in said first set by initially driving said particles toward a planar surface of said electrophoretic cell to cause said particles to distribute sufficiently to reduce light transmittance and then to return said particles to an intermediate light state in a first light state set less transmissive than said one of said first set of intermediate light states without flashing.

In some embodiments said particles remain in said first set of intermediate light states after increasing or decreasing light transmittance and said electrophoretic device's operation and metastability is optimized for said first set.

In some embodiments, said programmable controller is arranged to drive said particles from one of said second set of intermediate states with a given light transmittance to a more transmissive state in said first light state set by driving said particles to a non-planar surface of said electrophoretic cell and subsequently driving said particles to a selected one of said first set of intermediate light states more transmissive than said one of said second set of intermediate light states without flashing.

Alternatively in some embodiments, said programmable controller is arranged to drive said particles regressively from one of said second set of intermediate light states with a given light transmittance to a more transmissive state in said second set by initially driving said particles toward a non-planar surface of said electrophoretic cell to cause said particles to concentrate sufficiently to increase light transmittance and then to return said particles to an intermediate light state in said second light state set more transmissive than said one of said second set of intermediate light states without flashing.

In some embodiments said particles remain in said second set of intermediate light states after decreasing or increasing light transmittance and said electrophoretic device's operation and metastability is optimized for said second set.

Embodiments of the invention implement variable intermediate light states including changing direction with respect to increasing or decreasing light transmittance from state to state by driving charged particles at a non-planar surface to concentrate them further and increase light transmittance; or at a planar surface to spread them further and reduce light transmittance.

Preferably, the programmable controller is operable to apply a first signal type to said electrodes to drive said particles progressively within an intermediate light state set without flashing, said signal type having one or more pulses for said first light state set including a pulse having an opposite polarity to that which establishes said first light state. Conversely for said second set, said first signal type includes a pulse having an opposite polarity to that which establishes said second light state.

Preferably, the programmable controller is operable to apply a second signal type to said electrodes to drive said particles from one intermediate light state set to another without flashing, said signal type having one or more pulses to drive particles from an intermediate light state in said first light state set to one in said second light state set and including a pulse having a same polarity as that which establishes said first light state. Conversely, driving from said second light state set to said first light state set includes a pulse having a same polarity to that which establishes said second light state.

Preferably, the programmable controller is operable to apply a third signal type to said electrodes to drive said particles regressively within an intermediate light state set, said signal type having at least two pulses, such that in said first light state set, a first pulse momentarily drives said particles toward said planar surface using a same polarity to that which establishes said first light state, and a second pulse having an opposite polarity returns said particles to an intermediate light state in said first light state set. Conversely, in said second set, said first pulse momentarily drives said particles toward said non-planar surface using a same polarity to that which establishes said second light state, and a second pulse having an opposite polarity returns said particles to an intermediate light state in said second light state set.

In some embodiments, each of said first, second and third signal types are AC balanced either as part of said signals or by providing balancing pulses over a period of time such that there is a negligible, net, DC component.

Said AC balancing uses one or more pulses less than a threshold value to cause no perceivable change in light state for said electrophoretic device. Said less-than-threshold pulses can comprise a train of one or more pulses, each having a duration less than a threshold duration for changing light states of said electrophoretic device, or comprise one or more pulses having an amplitude less than a threshold amplitude for changing light states of said electrophoretic device, or a combination of these two.

In some embodiments each of said first, second and third signal types are AC balanced as part of said signals by dividing said signals into two parts, one of said parts provides AC balancing and the other part causes a change in light state. In such embodiments, one or more signal components comprising said AC balancing part comprise an opposite polarity and the same magnitude as the net DC component of one or all signal components comprising the second part.

In some embodiments said periodic balancing pulses are provided at a period less than one minute, more preferably, less than 10 seconds, and most preferably, less than 3 seconds.

In embodiments, said first, second and third signal types can be either pulse-width modulated or amplitude modulated.

Preferably in light attenuator embodiments said programmable controller includes a microprocessor or a microcontroller connected to said electrodes via a two-state-trajectory, high-voltage, output stage.

Preferably in light attenuator embodiments each output stage comprises a pair of oppositely doped MOSFETs, each MOSFET protected with at least one snubber circuit comprising one or more of a resistor, a capacitor or an inductor. Preferably said snubber circuit elements are matched to a load provided by said electrophoretic cell.

In embodiments that require said high-voltage, output stage to apply more than two voltage levels across said electrophoretic cell (e.g., embodiments that use waveforms based on amplitude modulation, or embodiments that use AC balancing pulses that have below threshold amplitude) said programmable controller is arranged to modulate an output voltage of a high-voltage, power supply to provide a signal of a required amplitude to said electrophoretic cell.

Preferably said high-voltage, power supply comprises a switch-mode-power-supply (SMPS) and a digital-to-analog converter arranged to provide a reference voltage.

Preferably in light attenuator embodiments said programmable controller includes a manual control enabling a user to select a required light state of said attenuator. Preferably, said controller is programmed to change light states in response to user interaction at below a given frequency.

Preferably, said manual control comprises two directional keys (or buttons or functions), one to increase and another to decrease said electrophoretic cell's light transmittance.

Preferably, said controller is operably connected to a look-up table to determine signal characteristics for a signal required to change the current light state of said cell to a selected light state.

In some embodiments, said metastable, electrophoretic device includes one or more temperature sensors operably connected to said programmable controller to provide an indication of a temperature at one or both surfaces of said device, said controller being operable to adjust signal characteristics for a signal required to change the light state of said cell to a selected light state accordingly.

In some embodiments, said attenuator includes a light source and a light sensor disposed at opposite surfaces of said attenuator and operably connected to said programmable controller to provide an indication of transmittance of said attenuator, said controller being responsive to differences in transmittance before and after a change of light state to adjust signal characteristics for a signal required to change the light state of said cell to a selected light state accordingly.

In a third aspect, there is provided a method of manufacturing an electrophoretic device comprising:
providing a plurality of discrete members;
applying a monolayer of said discrete members to a first substrate to define a structure on said first substrate, said structure having a non-planar surface deriving from said discrete members;
coating said surface with an electrophoretic suspension, said suspension including charged particles of at least one type, and
providing a second substrate spaced apart from said first substrate with said structure disposed between the substrates to define a volume between the structure and the second substrate;
wherein said particles are movable within said volume to interact with said non-planar surface to move between a plurality of light states.

The method contrasts with prior art methods that form a structure by embossing, extruding, microlasering, or photolithographic methods.

In said method, the electrophoretic device can be a light attenuator or a display device.

Preferably, said applying comprises dry powder coating said discrete members. Preferably, said dry powder coating employs any one of: an electrostatic spray gun, a triboelectric gun, a doctor blade, or an electro-motive brush (EMB) roll coater. An EMB roll coater is most preferred.

Preferably, said applying further comprises: coating solid discrete members onto said first substrate where at least a portion of their surfaces provide protrusions and in the volumes there between depressions. In said method said solid discrete members are preferably densely coated.

Alternatively, said applying further comprises: coating discrete sacrificial members to said first substrate; at least partially filling volumes between sacrificial members with a pre-polymer; solidifying said pre-polymer to provide a polymer structure; and removing said sacrificial members so that the exposed polymer surface provides recesses. In said method said sacrificial discrete members are removed once said polymer solidifies about said members to derive micron scale recesses (i.e. depressions or pits or void spaces) in the polymer structure. In said method, sacrificial members are dispersed as a low-density coating.

In still further alternatives, said applying comprises coating said substrate with a combination of solid discrete members and sacrificial members. In this case, the resulting structure has both protrusions and recesses with their relative instances being proportional to the combined mass of each member type and the mean volume of each member type.

In these methods, the substrate to which said discrete members are applied preferably comprises an adhesive surface. Preferably, the adhesive surface is solid and provided by one of: an adhesive sheet, an adhesive layer, or an adhesive or tacky coating. Preferably the adhesive is non-reactive, and more preferably the adhesive is a pressure-sensitive adhesive (PSA), and most preferably the adhesive is an optical clear adhesive (OCA).

Preferably, in said coating step, said discrete members that touch said substrate adhere on contact with said adhesive surface. In said method said adhesion of discrete members in contact with said substrate is sufficiently strong to withstand further processing steps. In said method, said coating of said discrete members can cause stacking and in this case, the method further comprises: directing a pressured gas/air flow at stacked members to remove them to reveal a monolayer of discrete members adhered to said substrate.

In some embodiments said adhesive surface is permanent and bonds said non-planar structure to an electrode-coated substrate; in other embodiments the adhesive is reworkable (i.e. removable) forming a temporary bond with discrete members coated onto its surface, and in a subsequent process step the reworkable adhesive is removed from said non-planar structure.

Preferably, solid discrete members are densely coated to achieve close packing of members so that the resultant protrusions substantially cover (i.e. >50%, and preferably >60%, and most preferably >70%) a face area of said device. Such a structure in said electrophoretic device can require no further processing and be a close-packed, monolayer of protrusions bonded to an adhesive layer on an electrode-coated substrate.

To achieve a high degree of close packing, discrete members are preferably packed in increasing degree of packing using one of: random close packing, or part random and part lattice close packing (i.e. quasi-random), or lattice close packing including hexagonal, square, rectangular, rhombic, or parallelogrammic, or aspects of these when protrusions have a distribution of sizes. Preferably to achieve a high level of close packing said discrete members have two or more sizes, and more preferably a distribution of sizes.

Devices manufactured according to the invention comprising a monolayer of close packed protrusions deflect charged particles in an electrical field away from their natural path from a front electrode to a rear electrode causing the particles to move over the surface of the protrusions and further cause particles to be driven to concentrate in the depressions defined by the volumes there between in one or more light states.

In said method said particles interact with said non-planar surface in forming a transparent light state.

Preferably, sacrificial discrete members are low-density coated to derive a structure that has recesses dispersed over said structure and the sum of the projected face area of recesses is between 10% and 40%, and preferably 12.5% and 33%, and most preferably 15% and 30%.

Where recesses are formed after dry powder coating sacrificial discrete members onto said substrate, the method preferably comprises: wet coating said coated substrate with a pre-polymer or latex solution; forming said structure about said sacrificial members by a film forming technique or by polymerization; and removing said sacrificial members by melting or softening them using elevated temperature, or dissolving them using solvent, or a combination of both.

Where a monolayer of close packed protrusions are formed after dry powder coating solid discrete members onto said substrate, the method preferably comprises: wet coating said coated substrate with a pre-polymer solution or latex solution; forming a space filling polymer about said discrete members up to a plane (or level) about an equator plane by a film forming technique or by polymerization, or a combination of both. Preferably, said structure is a close-packed, monolayer of protrusions embedded in space filling polymer and bonded to (or constructed on) an adhesive layer on a sheet, and said sheet can be an electrode-coated substrate.

In a still further alternative method, a monolayer of discrete members is dry powder coated onto a reworkable adhesive surface on a sheet so that said sheet and adhesive are sacrificial materials removed in further process steps that bond said discrete members directly to an electrode-coated substrate using a space filling polymer. The method comprises: wet coating said electrode-coated substrate with a pre-polymer solution; partially curing a polymer layer there upon, and then laminating said coated substrate to said coated sheet so that said partially cured polymer conforms to said discrete members and fills the space between discrete members up to a plane (or level) about an equator plane and on curing embeds said discrete members in said polymer and bonds said resulting structure to said electrode-coated substrate. This method further comprising peeling said reworkable adhesive and sheet from said structure under conditions that permit said adhesive to be reworked (e.g., raised temperature).

For electrophoretic devices produced according to the invention with a non-planar structure having recesses therein, the ink is preferably a hybrid electrophoretic ink that relies on multiple electrokinetic forces to lead to the compaction of charged particles in recesses when in a transparent light state.

Preferably, said discrete members are microspheres, microbeads, microparticles, or micro balls, and can be substantially (i.e. about >80%) monodisperse or have a distribution of sizes and/or shapes. Preferably said discrete members are spherical.

Preferably, a small percentage (<5% by mass) of said solid discrete members are relatively larger in diameter than the remainder of said solid discrete members to define the thickness of said volume.

Preferably, said coating comprises laminating said suspension together with an electrode-coated substrate to said non-planar surface.

In some embodiments a substrate comprises one of: an electrode-coated, polymer film, an electrode-coated, glass pane, or an active-matrix substrate.

Alternatively, in some embodiments a substrate comprises one of: a sacrificial adhesive layer, a sacrificial adhesive on a carrier film, or a release liner.

Preferably, said method comprises dividing said electrophoretic ink volume into a monolayer of discrete or semi-discrete cavities conforming to the curvature of said structure on one side and the planar surface of an electrode on another side. Preferably, said cavities are formed by one of a PIPS process or a photolithographic process within the electrophoretic device, or said cavities are formed in a separate microencapsulation process that results in conformal shells and these shells are subsequently wet coated as a monolayer onto said structure. The polymer walls of said cavities form a web-like network of walls within an electrophoretic cell at about 10 micron to 150 micron spacing, and provide one or more of the following: mechanical strength, self-sealing for said electrophoretic ink, and resistance to delamination.

Particular embodiments of the invention comprise the following steps: in a first step a sheet is provided with an adhesive (i.e. tacky) surface, and said sheet can be a first electrode-coated substrate of said electrophoretic device; in a second step a dry powder of discrete members is coated onto said adhesive surface of said sheet and on contact members adhere resulting in solid discrete members coated in a close packing and sacrificial members coated in a dispersed manner; in a third step stacked or excess members are removed by directing a pressurised air or gas stream at said coated sheet so that the resultant sheet has a monolayer of members; in a fourth step a polymer solution or suspension is wet coated onto said coated sheet, the solution or suspension comprises a pre-polymer part and a solvent part; in a fifth step said solvent is evaporated so that said wet coat reduces to the space between members up to a plane about an equator plane, and once sufficient solvent has evaporated said pre-polymer solidifies, or solidifies on polymerizing (e.g., by thermal initiator or photoinitiator means) embedding said discrete members, at this point sacrificial discrete members are removed by dissolving them; in a sixth step a suspension of electrophoretic ink and pre-polymers are coated on to said coated sheet together with a second electrode-coated substrate using a lamination technique to form an electrophoretic device; in a seventh step said electrophoretic device is driven to a second light state using an electrical field prior to curing said pre-polymer; in an eight step cavities are formed within said electrophoretic device to divide said electrophoretic ink into discrete or semi-discrete (i.e. interpenetrating) volumes that conform to the surface of the structure on the coated sheet, said cavities are formed by polymerizing said pre-polymers causing phase separation from said suspension using a PIPS or photolithographic technique.

In order to minimize haze within devices produced according to the method, elements are selected to be optically isotropic and refractive index matched including said suspending fluid of said electrophoretic ink, said structure including discrete members and/or space filling polymer, and said cavity walls. Preferably the refractive indices of these elements are within 0.01 of each other, more preferably within 0.005, and most preferably within 0.002.

Preferably said structure is polymeric, and preferably discrete members and/or space-filling polymer are a non-polar, amorphous, polymer, and preferably polymer elements within said device have compatible polymers (e.g., lipophilic polymers), more preferably elements have similar chemistries (e.g., acrylates/methacrylates), and most preferably elements use substantially the same monomer components.

Preferably, said sacrificial discrete members comprise a wax with a melting temperature in the range of 50° C. to 150° C. and soluble in organic solvent, and preferably one of: a paraffin wax, polyethylene wax, or polypropylene wax.

Preferably said reworkable adhesive includes one of the following: a reworkable pressure-sensitive adhesive, a reworkable optical-clear-adhesive, a self-wetting adhesive layer, or an adhesive coating/film that has low peel strength (about 6 grams per inch). Preferably said reworkable adhesive layer incorporates a carrier sheet or film (e.g., a PET) on one side and a release liner on the other side.

In a fourth aspect, there is provided an alternative method of manufacturing an electrophoretic device comprising:

providing a template surface having a contoured shape defined by a plurality of polymer microstructures;

in one or more moulding steps replicating said template surface to transfer said shape to the surface of a non-planar, polymer structure on a second substrate;

coating said non-planar surface with an electrophoretic suspension, said suspension including charged particles of at least one type, and providing a first substrate spaced apart from said second substrate with said polymer structure disposed between the substrates to define a volume between the polymer structure and the first substrate;

wherein said particles are movable within said volume to interact with said replicated, non-planar, polymer surface to move between a plurality of light states.

The method contrasts with prior art embossing methods that directly form a template's three-dimensional microstructures by material removal from a hard template such as a metal, silicon, fused silica, or calcium fluoride using expensive and time consuming processes such as mechanical milling, chemical etching, ion-beam milling, reactive-ion etching, or laser ablation.

In some embodiments said template surface comprises said polymer microstructures.

In alternative embodiments said template surface is transferred from a surface comprising said polymer microstructures.

In embodiments in said moulding steps said replicating includes inversely replicating.

In embodiments of the method said microstructures are in a monolayer and comprise protrusions or recesses.

In embodiments of the method said monolayer includes microstructures arranged with close-packing or distributed.

In embodiments of the method said particles within said volume move over (or are deflected by) the surface of said replicated protrusions projecting into said volume in an electrical field to concentrate in the interstices of protrusions in a light transmitting state (corresponding to a second light state).

In some embodiments said moulding step comprises using a fixed-length, continuous, master to transfer said shape to a corresponding fixed-length, continuous, replica.

In said light transmitting state, each protrusion provides a discrete aperture area that is substantially free of said charged particles and transparent to specular light, said concentrated particles surrounding said aperture areas defining a contiguous strongly light attenuating area.

In some methods said polymer template microstructures comprise a plurality of discrete polymer members arranged in a monolayer and partially embedded in a polymer layer adhered to a planar substrate.

In alternative methods said polymer template microstructures include recesses (or openings) defined by removing a plurality of discrete sacrificial polymer members from a polymer layer.

In another alternative method said polymer template microstructures include protrusions or recesses defined by exposing a photosensitive polymer (photoresist) with one of a laser beam or electron beam (e-beam) and subsequently developing said photoresist to reveal said template surface. Preferably said beam is computer controlled and produces microstructures with smooth slopes and curvature. Preferably said computer control provides means to select the area per square centimeter (or square meter) corresponding to the interstices (and determining the charged particles area in said second light state) in a face view. Preferably, said computer control provides an analog, continuously-varying, surface-relief, polymer structure.

In some embodiments, the method comprises transferring said template surface from a polymer surface to a hard material by inversely replicating said template surface using an electroforming process to provide an electroformed, negative mould master that has the inverse shape of the polymer surface. The electroforming process preferably uses nickel, and after removal of the mould from the template polymer surface (i.e. from the mandrel) the revealed mould surface can optionally be coated with a thin layer (<250 nm) of chromium or other material to enhance surface properties by electroplating.

In some embodiments of the method said template surface is made more durable by transferring said shape from a polymer surface to a hard material by depositing a thin (<250 nm) metallic or ceramic conformal coating (or coatings) onto said polymer surface by chemical-vapour-deposition (CVD), physical-vapour-deposition (PVD), or electroplating.

In embodiments said fixed-length, continuous, master is at least 2 meters long, more preferably at least 10 meters, and most preferably at least 15 meters.

In some embodiments, said moulding steps comprise:

forming a negative mould master by coating (or contacting) said template surface with a prepolymer and optionally laminating a substrate, curing said coating to inversely replicate said shape as recesses in a polymer layer adhered to a substrate, and peeling apart the negative mould master and the template;

forming said replicated, non-planar, polymer structure by coating said negative mould master with a prepolymer and laminating said second substrate (optionally the coating is done as part of laminating), curing said coating to inversely replicate the negative mould master surface as protrusions in a polymer layer adhered to the second substrate, and peeling apart the negative mould master and the non-planar structure; and wherein the shape of the protrusions in the template is transferred to those in the replicated, non-planar, polymer structure.

In alternative embodiments, said moulding steps comprise:

forming said replicated, non-planar, polymer structure by coating said template surface with a prepolymer and laminating said second substrate (optionally the coating is done as part of laminating), curing said coating to inversely replicate said shape as protrusions in a polymer layer adhered to the second substrate, and peeling apart the template and the non-planar structure; and wherein the template is the mould master and the shape of recesses in the template is transferred to those in the replicated, non-planar, polymer structure.

In some embodiments of the method said template surface for subsequent transfer to replicated, non-planar, polymer structures is made from a mould of a replicated, non-planar, polymer structure produced using a prior template.

In such a method said template is provided in the form of a fixed-length continuous-film (a roll of film), a belt, a roller surface, or a foil, sheet or plate. Preferably said template shape is seamless in the area corresponding to the maximum (viewing) face-area of said device by using a template surface area greater than or equal to the maximum face-area, and more preferably said template is a fixed-length continuous film or a belt, and most preferably said template is a fixed-length continuous film. In some embodiments said fixed-length, continuous master is a negative mould of a fixed-length, continuous, film template.

Preferably, said fixed-length continuous master transfers said shape to said replicated, non-planar, polymer structure on a corresponding fixed-length continuous substrate, and said curing is conducted (at least in part) by thermal means over a time interval of at least one minute and more preferably at least one hour. The method uses a continuous-film as said template and said master to provide roll-to-roll replication of said non-planar, polymer structure as a seamless continuous film that is thermally cured slowly (from minutes to hours or days).

In an alternative method a roller surface or belt is said mould master (or template) and the replicated, non-planar, polymer structure is photo-cured using UV and/or visible light while still in contact with, and before peeling apart from, said mould.

In the method said mould master uses elastomeric solid polymer to provide a soft surface with improved release flexibility from said replicated, non-planar, polymer structure. Preferably the method uses a fluorinated elastomer so that said prepolymer fails to wet or swell the elastomer on contact and releases with low peel adhesion.

In the method some features of the shape of said replicated, non-planar, polymer structure can be formed directly in said negative mould master and these features add or remove material locally with respect to said shape of said template. In some embodiments forming polymer walls in said non-planar, polymer structure is implemented by laser ablating corresponding recesses (or cavities) in said negative mould master and the polymer of said negative mould master provides sufficient beam absorption by selecting a suitable laser wavelength (strong absorption) or adding colourant to the polymer.

The method avoids trapping air when coating prepolymer onto said negative mould master by orientating (i.e. angling) recesses corresponding to polymer walls away from a pinch line of a NIP roller.

In the method polymers walls provide the device with structure by spanning between said substrates and strongly adhering to both. Preferably, spacers supplement the structure that the polymer walls provide, or, as an alternative to spacers, pillars (or columns or posts) can be formed analogous to forming said polymer walls.

The method includes printing a black mask (or layer) over non-active areas that form part of a face-view comprising contact area between said non-planar, polymer structure and said first substrate including polymer walls, cell gap spacers and pillars (if present). Preferably the black mask is a polymer layer having black colorant, and more preferably the black mask is also an adhesive layer, and in some embodiments said adhesive layer is photo cured to bond said first substrate to said non-planar, polymer structure. Preferably said printing uses an elastomer-coated roller means.

In the method the release properties of said non-planar, polymer structure from said negative mould master or template are improved by having the polymer walls and facets in said microstructures subtend an angle of at least three degrees about the substrate's normal.

In embodiments the requirement to provide sufficient polymer wall contact area with said second substrate to develop strong peel adhesion between said first and second substrates is balanced with the requirement to minimize the face-area corresponding to said polymer walls as these are non-switching black areas, wherein said polymer-wall face-area is less than 25% of the device face-area, and preferably less than 20%, and more preferably less than 17.5%, and most preferably less than 15%.

To minimize haze in said device said replicated, non-planar polymer structure (including said polymer walls) are optically isotropic and refractive index matched to the suspending fluid of said electrophoretic ink, preferably within 0.01 of each other, more preferably within 0.005, and most preferably within 0.002, and the suspending fluid is insoluble in (does not swell) the replicated, non-planar polymer structure.

In a fifth aspect, a light attenuator comprises a cell having a first substrate and a second substrate spaced apart from said first substrate, and a layer between said substrates containing an electrophoretic ink having charged particles in a suspending fluid;

secured to said second substrate a non-planar, polymer structure comprising a plurality of aperiodic microstructures, a surface of said layer adjacent said second substrate forming a non-planar interface with said polymer structure conforming to the surface of the microstructures;

in at least one light state said charged particles concentrating adjacent said interface in response to an electrical field forming features that diffract light; and in said light state said features being defined by said microstructures and being aperiodic when viewing a face of said light attenuator.

In embodiment said features comprise apertures (i.e. optical openings) and obstructions (i.e. optical stops).

In embodiments light diffracts at the circumference (or extent) of said features traveling through said apertures or around said obstructions.

In embodiments said aperiodic microstructures are in a monolayer and are arranged irregularly forming said features with centre-to-centre distances in a local area that are random.

In embodiments said aperiodic (arrangement of) features diffract light randomly minimizing or avoiding the perception of a Fraunhofer diffraction pattern (or a complex pattern of varying intensity due to the superposition or interference of different parts of light waves) about a bright light source viewed through said light attenuator.

In embodiments said features are defined by cross sections through said microstructures parallel to said substrates in the plane of (or containing) said concentrated particles that form the circumference (or extent) of said features. Preferably said cross sections have variable area forming variably sized features.

In some embodiments in said light state the total circumference of said apertures is minimized per unit squared of face area of said device, and preferably said apertures are discrete and said concentrated charged particle area is continuous or semi-continuous.

In embodiments where said microstructures are protrusions and said charged particles form discrete apertures in said light state, the maximum angle subtended by an aperture to a viewer at a required viewing distance is one arcminute (corresponding to 290 microns at a viewing distance of 1 meter) and preferably 0.6 arcminutes (corresponding to 174.5 microns at 1 meter), and the subtended angle of the aperture pitch (i.e. aperture and concentrated charged particle area) is double these limits.

In alternative embodiments where said microstructures are recesses and said charged particles form discrete obstructions in said light state, the maximum angle subtended by an obstruction to a viewer at a required viewing distance is one arcminute (corresponding to about 290 microns at a viewing distance of 1 meter) and preferably 0.6 arcminutes (corresponding to about 174.5 microns at 1 meter), and the subtended angle of the obstruction pitch (i.e. obstruction and light transmitting area) is double these limits.

In embodiments where said microstructures are protrusions the major axis (or approximation to diameter) of said apertures is more than 20 microns, preferably more than 50 microns, more preferably more than 80 microns, and most preferably more than 95 microns.

In some embodiments said features possess differences (from one another) defined by said microstructures, said microstructures having differences in at least one aspect including surface shape, cross-sectional area, cross-sectional geometric form, or orientation (and light encountering said features diffracting with greater randomness).

In some embodiments said differences derive from a population of microstructures on a non-planar structure having randomness in at least one of said aspects. In alternative embodiments a mix of said aspects is used, preferably having equal incidence of each one (each difference) and having random probability for each one.

In embodiments said suspending fluid and said non-planar polymer structure are optically-transparent and refractive index matched (preferably to within 0.0035, and most preferably 0.002) and light travelling from one to the other is not significantly diffracted.

Preferably, each of said substrates comprises respective first and second electrodes defining an electrophoretic cell, and said charged particles move position (i.e. translate) in said suspending fluid in response to an electric field applied using the electrodes.

Alternatively, each of said substrates comprises a layer which is arranged to be affixed in cofacing relationship with a respective electrode of an electrophoretic cell.

In embodiments said charged particles are responsive to an electric field applied to said light attenuator to move between: a first extreme light state adjacent said first electrode in which particles are maximally spread within said cell to lie in the path of light through the cell and to strongly attenuate light transmitted through the cell, and a second extreme light state adjacent said interface in which said particles are maximally concentrated within the cell to remove them from the path of light through the cell and to substantially transmit light through the cell.

In some embodiments said microstructures are closely-packed protrusions projecting into said layer and contacting said suspending fluid, and under the influence of an electrical field said charged particles are deflected from their path from said first electrode (first light state) to said second electrode (second light state) moving over the surface of protrusions and being driven to concentrate in the interstices of protrusions to form said second light state.

In embodiments said features are defined by said microstructures in light states intermediate said first and second light states.

In some embodiments the shape of the surface of a microstructure comprises one or more of convex, concave, or facet, and said microstructure can be defined by a single slope (e.g., the dome of a sphere) or multiple slopes.

Preferably said microstructures are asymmetric and randomly orientated in said non-planar polymer structure.

In some embodiments the highest point of the surface of respective protrusions (nearest point to said first substrate) substantially falls within a common plane parallel to the plane of said substrates.

In some embodiments in said light state said charged particles form a concentrated edge to said features having a sharp transition (in an edge area) between visible light transmitting and visible light absorbing, and preferably said apertures are substantially free of charged particles.

In some embodiments said slope (or interaction with said non-planar structure) slows the velocity of said charged particles in said ink in an electrical field relative to the velocity of the particles in the suspending fluid before reaching the non-planar structure, concentrating the particles and forming a sharp transition between a light transmitting area and a light absorbing area they move towards said interstices in said light state.

In some embodiments polymer walls divide said layer into discrete or semi-discrete cavities and span between said non-planar structure and said first substrate bonding to both, and the polymer walls appear black in a face view and are an obstruction locally where a wall edge is adjacent a light transmitting area in said light state, and said polymer walls are aperiodic in a face view.

In some embodiments some microstructures are recesses defining channels that hold said charged particles in said second light state.

In some embodiments said aperiodic polymer walls are in peripheral areas of said apertures (i.e. the light absorbing area) in said light state and wall edges are adjacent concentrated particles.

In some embodiments, said cavities and polymer walls coincide with the extent of one or more microstructures.

In some embodiments each protrusion is closely surrounded by said channel (to hold charged particles deflected by the surfaces of the protrusion) and a polymer wall and defines a cavity.

In some embodiments pillars (or spacers or columns) set the cell gap and space apart said non-planar polymer structure and said first substrate, optionally bonding to both, and the pillars appear black in a face view and are an obstruction locally where a pillar edge is adjacent a light transmitting area in said light state, and said pillars are aperiodic in a face view.

In some embodiments said non-planar polymer structure is a set of, or a distribution of, discrete polymer balls embedded as a monolayer in a polymer layer, said protrusions corresponding to hemispheres or spherical caps.

In some embodiments said protrusions are deformed hemispheres including non-uniformly melted, non-uniformly corroded, non-uniformly etched, non-uniformly milled, or non-uniformly ablated.

In some embodiments said non-planar polymer structure is derived from a photosensitive polymer (cured photoresist) exposed by a laser beam or electron beam (e-beam) and developed to reveal said microstructures. Preferably each microstructure is independently written, asymmetrical, and randomly orientated. More preferably, the parameters that define each are uncorrelated, and said close-packing has random centres.

BRIEF DESCRIPTION OF THE DRAWINGS

Embodiments of the invention will now be described, by way of example, with reference to the accompanying drawings, in which:

FIG. 1A shows embodiment 201 in a first light state. Electrophoretic ink 29 has positively-charged, black particles 10 and the ink is continuous in electrophoretic cell 301.

FIG. 1B shows embodiment 201 in an intermediate light state.

FIG. 1C shows embodiment 201 in a second light state.

FIG. 1D shows embodiment 201 in an alternative first light state.

FIG. 2A shows embodiment 202 in a first light state. Electrophoretic ink 30 has negatively-charged, black particles 11, and the ink is divided into cavities 80 using a PIPS process step.

FIG. 2B shows embodiment 202 in a second light state.

FIG. 2C shows embodiment 202 in an intermediate light state of a first set of intermediate light states.

FIG. 2D shows embodiment 202 in an intermediate light state of a second set of intermediate light states.

FIG. 2E shows an intermediate light state in a first set being progressively changed to increase light transmittance without causing flashing.

FIG. 2F shows an intermediate light state in a first set being changed to a less light transmissive state in a second set without causing flashing.

FIG. 2G shows an intermediate light state in a first set being regressively changed to a less light transmissive state in a first set without causing flashing.

FIG. 8 shows an embodiment 208 of an active-matrix, transparent display.

FIG. 9 shows an embodiment 209 of an active-matrix, colour-filter, reflective display.

FIG. 16A shows positive electrical field waveforms for applying to embodiments.

FIG. 16B shows negative electrical field waveforms for applying to embodiments.

FIG. 16C shows a set of positive electrical field waveforms for changing intermediate light states without flashing.

FIG. 16D shows a set of negative electrical field waveforms for changing intermediate light states without flashing.

FIG. 29 shows an embodiment 229 that has cavity walls formed by microembossing and within cavities there is a monolayer of protrusions.

FIG. 30 shows a substrate that has a non-planar structure comprising protrusions and recesses for use in embodiments.

FIG. 39 shows a black mask and adhesive layer being applied to the polymer walls of a replicated, non-planar polymer structure in a roll-to-roll manufacturing step.

FIG. 40 shows the electrophoretic ink and top substrate being applied in a roll-to-roll manufacturing step in the assembly of embodiment 440.

DETAILED DESCRIPTION

Figure 3:
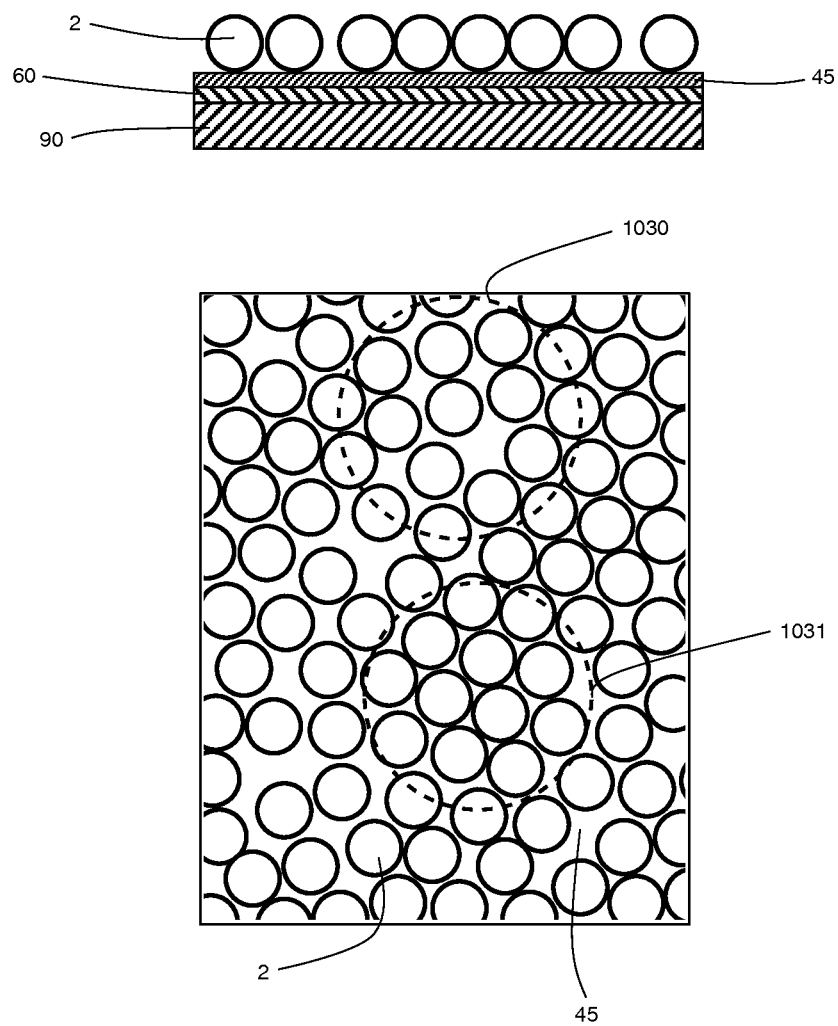
FIG. 3 shows a micrograph of a polymer-ball, coated film that is a partially constructed cell of embodiment 202. It shows a monolayer of closely packed polymer balls bonded to an optical clear adhesive (OCA) layer 45.

The present invention's embodiments are based on an electrophoretic cell that has a unique mode or construction that internally provides a transparent state.

In embodiments of the present invention a device has one or more functional layers and uses an electrophoretic ink in a cell of an embodiment to control light. In some embodiments the cell is bonded to transparent substrates that each have a transparent, conductive electrode, and an electrical field can be applied across the cell to select a light state using the conductive electrodes. In some window embodiments a film embodiment (i.e. an embodiment that has film substrates) is laminated to at least one glass, polycarbonate, acrylic or other suitable transparent sheet to form a rigid structure. A film embodiment can be flexible or semi-rigid.

Light attenuator embodiments can be used in smart glass or display devices applications. The former include light attenuators used as windows, skylights, transparent doors, or mirrors in homes; light attenuators used in commercial and public buildings such as the façade, internal walls, curtain walls, or skylights; light attenuators used in automotive applications including a car's sunroof, roof system, side or rear windows, a partition, rearview and door mirrors, or a sun visor; use in windows and doors of rail and public transport; use as aircraft windows; and use in marine windows. Other applications of embodiments include use as visors, masks, eyewear, or fenestration devices.

In this document a light attenuator can be a light modulator, a light shutter, a variable light transmittance (i.e. dimming) sheet, a variable light absorptance sheet, a variable light reflectance sheet, a monochrome display, a colour display that uses a colour filter with a monochrome display, or a see-through display. Preferably, display embodiments incorporate an active-matrix substrate.

In embodiments a light attenuator has an electrophoretic cell containing an electrophoretic ink in one or more volumes or cavities, the electrophoretic cell has particles of at least one charge polarity or type and has at least two extreme light states, in a first light state particles are spread within a cell to lie in the path of light through a cell (so that light is absorbed, attenuated, partially transmitted, reflected, or scattered) and in a second light state particles are concentrated within a cell to remove them significantly from the path of light through a cell (so that visible light is transmitted); to reach the second light state an electrophoretic cell uses a monolayer of closely packed protrusions to deflect particles in an electrical field away from their natural path (from a front electrode to a rear electrode) causing the particles to move over the surface of the solid protrusions and further causing particles to be driven to concentrate in the volume between protrusions (i.e. the depressions there between). For example, see embodiment 202 in FIGS. 2A (first light state) and 2B (second light state).

In some embodiments an electrophoretic cell has one or more light states that can be intermediate the first and second light states, and in some embodiments the number of intermediate states is sufficient to provide variable light transmittance, or variable light absorptance, or variable light attenuation, or variable light reflectance. A variable light function is also known as dimming or grey-scale.

Protrusions 1 are preferably spherical and the close packing of protrusions in embodiments, in increasing degree of packing, is one of random close packing (e.g., see FIG. 2B), or part random and part lattice close packing (i.e. quasi-random and shown in FIG. 3), or lattice close packing including hexagonal (e.g., see FIG. 11C), square, rectangular, rhombic, or parallelogrammic, or aspects of these when protrusions have a distribution of sizes. Preferably to achieve a high level of close packing protrusions have two or more sizes, and more preferably a distribution of sizes as shown in embodiment 204 (see FIG. 4).

The figures show embodiments in two views: one view shows a cross section of an embodiment's electrophoretic cell, and the other view is of a face of an embodiment and can be a front or rear face unless otherwise indicated. Some exploded views are also shown within figures and these are indicated with a number. Cross section views represent a diagonal cross section of the face view unless otherwise indicated. In addition, a figure having a letter denominator represents an embodiment in a specific light state and each letter denominated figure (for a given number) is of the same embodiment, just different light states. For example, FIGS. 2A to 2G are of the same embodiment 202 in different light states.

Three different light states for embodiment 201 are shown in FIGS. 1A to 1D: FIG. 1A shows a first light state, 1B an intermediate light state, 1C a second light state, and 1D an alternative first light state. In FIGS. 1A to 1D embodiment 201 has an electrophoretic ink 29 in an electrophoretic cell 301. The latter is indicated by an arrow in FIG. 1C and in embodiments includes all of the elements sandwiched between top and bottom electrodes 60. Ink 29 has positively-charged, black particles 10 in a transparent, isotropic suspending fluid 19. Electrophoretic ink 29 is adjacent to a transparent conductive electrode 60 on one side in the plane of the electrophoretic cell 301 and adjacent a non-planar, polymer structure 1301 on the other side comprising of polymer 50 and protrusions 1.

Protrusions 1 are in the form of a monolayer and project into an electrophoretic ink 29's volume and fill a significant part of the electrophoretic layer 1201 that otherwise indicates the volume filled with electrophoretic ink 29. In non-planar, polymer structure 1301 polymer 50 fills the space/volume between protrusions 1 below their equator plane 1001 (i.e. a plane parallel to an embodiment's face and passing through the centre of protrusions). In the face view of FIG. 1C each protrusion 1 touches or nearly touches its neighbours and can generally be described as being a closely packed monolayer within electrophoretic cell 301. In the cross sectional view of FIGS. 1A to 1D protrusions 1 are deliberately shown as spaced apart consistent with a diagonal cross section of the face view. This allows the cross sectional view to show clearly how particles 10 can be concentrated into the space/volume between protrusions 1.

Embodiment 201 has an edge seal (not shown) all around and spherical spacers (not shown) establish the cell-gap of the electrophoretic cell 301. Transparent substrates (not shown) are rigid or semi rigid. The edge seal and cell gap spacers provide sufficient structure when used with rigid substrates such as glass for small area devices (up to 500 mm diagonal), or for small area devices that have a fixed curvature and use semi-rigid substrates (e.g., a visor). The lack of structure in electrophoretic cell 301 (unlike subsequent embodiments) means that embodiment 201 is not compatible with flexible substrates, with lamination to glass panes in a smart glass, or manufacture as a continuous roll. However, suitable film structures are shown in subsequent embodiments, and the simplified embodiment 201 shows the elements of the current invention that give rise to the light states.

Protrusions 1 and polymer 50 can be any optically transparent solid material that is optically isotropic. For example, protrusions 1 or polymer 50 could be a non-polar, amorphous, polymer—most preferred—or a polar, amorphous polymer, or a silicon oxide. Preferably, polymer 50 and protrusions 1 are compatible polymers (e.g., lipophilic polymers), more preferably both have similar chemistries (e.g., acrylates/methacrylates), and most preferably polymer elements use similar monomers and are highly crosslinked.

Protrusions 1 can be spherical and referred to as microspheres or micro beads or micro particles or polymer balls; protrusions 1 can be oblate spherical, ellipsoidal, cylindrical, conical, or distorted versions of these; or protrusions 1 can have sloped and/or curved surfaces in a regular or irregular shape once particles 10 can be deflected in an electrical field as described earlier and once there is no obstruction to an electrical field driving particles to concentrate in the space between protrusions. Alternatively protrusions 1 could be fibres, preferably cylindrical, and preferably short or chopped. The diameter of a fibre in this case corresponds to the diameter of the spherical protrusion 1 shown in FIGS. 1A to 1D.

Figure 17:
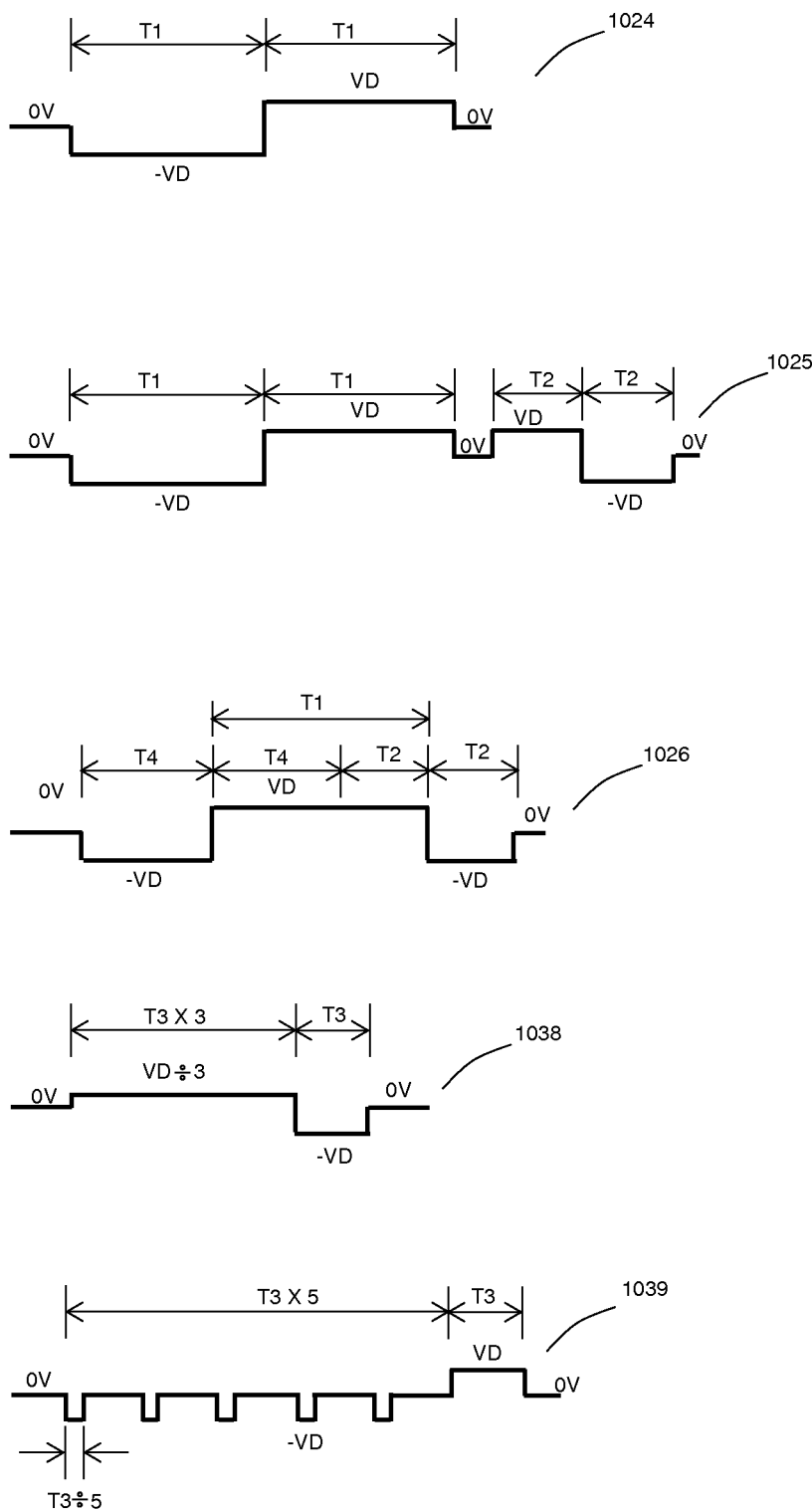
FIG. 17 shows AC balanced waveforms that are based on the pulse-width-modulated waveforms of FIGS. 16A to 16D.
Figure 18:
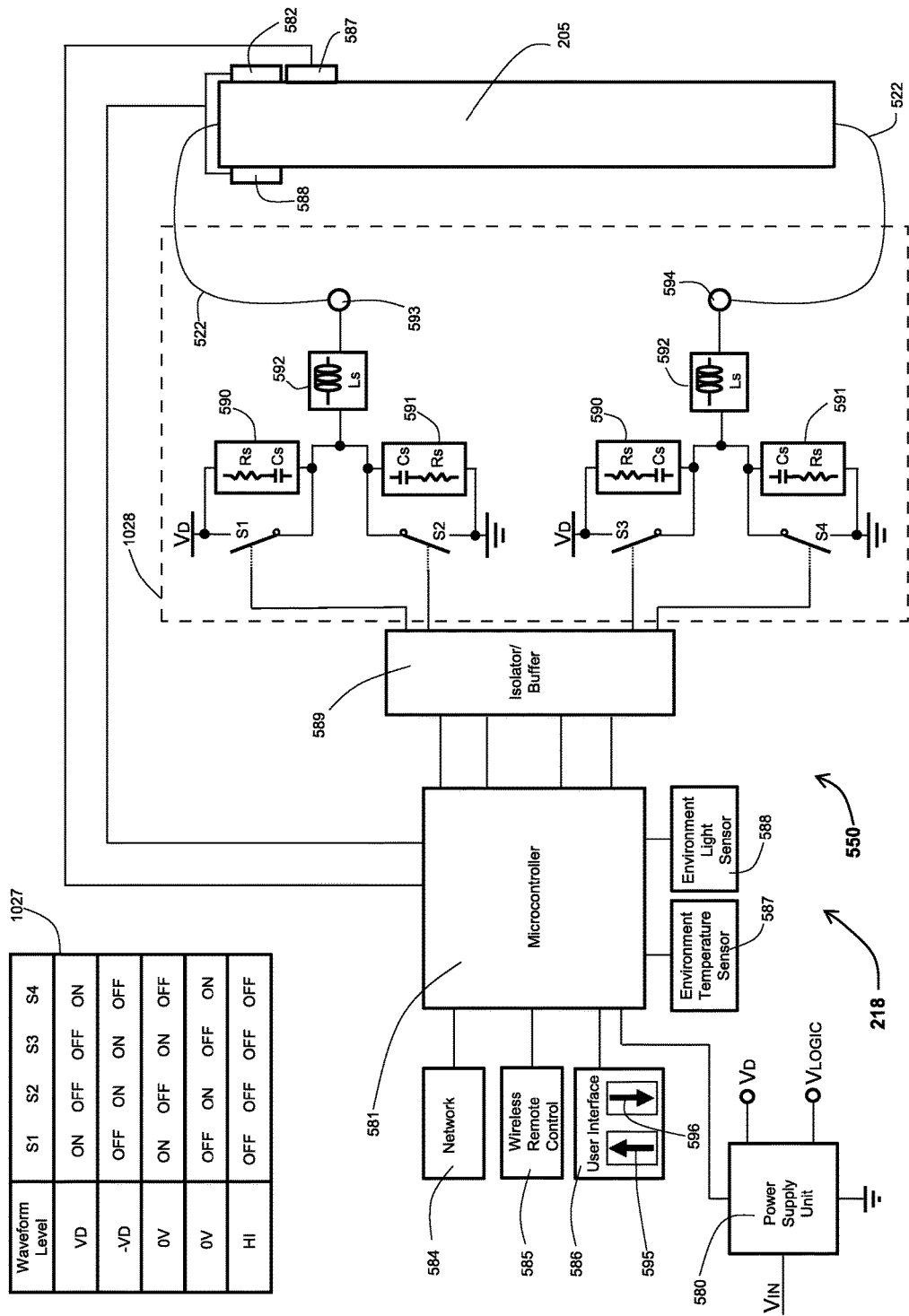
FIG. 18 shows an embodiment 218 of an electrophoretic, smart-glass system including a controller 550 and an electrophoretic smart glass 205.

In FIG. 1A positively charged particles 10 are driven to spread over the surface of a front electrode 60 by a negative electrical field 1007 to form a first light state, see the face view and its corresponding cross sectional view. The field 1007 is applied across the electrophoretic cell 301 by connecting a suitable signal generator between the pair of electrodes 60 (the connection is not shown but FIGS. 16 and 17 show suitable waveforms and FIG. 18 shows a suitable signal generator in the form of controller 550). Particles 10 are black and absorb or attenuate visible light of all wavelengths uniformly in a first light state.

In some embodiments a first light state is opaque (as shown in FIG. 1A for embodiment 201). In this case particles 10 block visual access to objects that would otherwise be in view behind embodiment 201. In some embodiments a first light state obscures or is translucent. In this case particles 10 also block visual access to objects that would otherwise be in view behind embodiment 201. In other embodiments a first light state is still marginally or partially transparent depending on ambient light levels on each face. In this latter case the level of particles 10 in an electrophoretic ink 29 is sufficiently low to allow a desired transmittance of specular light in a first light state.

Visible light ray 1400 incident on electrophoretic cell 301 is absorbed by particles 10. Crucially, a uniform black, light absorbing first light state is readily available when the black particles typically used in electrophoretic ink displays are used in the current embodiments, these are discussed later. This high quality black, first light state of embodiment 201 contrasts with the lack of a black state in prior art light control devices.

The face view of FIG. 1A shows a uniform black (or dark) state because particles 10 are spread over a face of electrophoretic cell 301. Embodiment 201 has a black state that is opaque and provides a privacy function because the layer of particles 10 spread adjacent an electrode face is a stacked layer of particles whose diameters generally range from 100 nm to about 2 micron (the stacking is not shown in FIG. 1A). The thickness of the stacked layer of particles is determined by the particle loading (percentage) in an electrophoretic ink 29.

FIG. 1C shows a positive electrical field 1008 and positively charged particles 10 in a second light state. In this state the particles 10 are concentrated into the space/volume between protrusions 1 with the result that particles 10 are removed from the path of light through an embodiment for a significant part of its face area. In embodiment 201 particles 10 concentrate in a second light state about midway through the cell 301 in the z-axis.

In a second light state each protrusion 1 defines an aperture 1006 that is substantially free of particles 10 and transparent to specular light. The apertures 1006 provide visual access to objects lying in view behind embodiment 201. Light ray 1403 incident on electrophoretic cell 301 is transmitted through an aperture 1006 defined by a protrusion 1 (i.e. aperture 1006's area is proportional to the cross sectional area of protrusion 1 in the equator plane 1001) and exits cell 301 substantially free of attenuation or light scattering (the latter is subject to refractive index matching discussed later). The spaces/volumes between protrusions 1 are strongly light absorbing because particles 10 are concentrated into these spaces. Light ray 1404 incident on cell 301 is absorbed by particles 10 in the space between protrusions 1.

The face view of FIG. 1C can be simplified to two types of areas: aperture areas 1006 that are transparent, and black areas between protrusions 1 where particles 10 are concentrated. In a second light state aperture areas 1006 are discrete and the light blocking area (where the particles 10 are concentrated) is contiguous. Together these two give rise to an aperture fraction in the second light state representing the face area of an electrophoretic cell 301 that is transparent to visible light, and the fraction corresponds to a maximum light transmittance level in a second light state. For example, in the second light state the sum of aperture areas 1006 may represent 70% of the face area of electrophoretic cell 301, this then corresponds to a maximum light transmittance of 70%.

When an embodiment is operated solely with first and second light states then it is called a light shutter or switchable device.

FIG. 1B shows positively charged particles 10 in a light state that is intermediate the first and second light states. The figure is also useful in describing how particles 10 move within electrophoretic ink 29 when transitioning between the first and second light states. Positive electrical field 1008 moves positively charged particles 10 from a prior first light state in the direction of the electrical field 1008, and this direction is orthogonal to the plane of the electrodes 60. But on reaching protrusions 1 their natural path (from a top electrode 60 adjacent electrophoretic ink 29 to a bottom electrode 60 adjacent non-planar, polymer structure 1301) becomes blocked forcing the particles 10 to deflect over the surface of solid protrusions 1 as indicated by the arrow 1000. Together, the deflection caused by the solid surface of protrusions 1 and the electrical field 1008 drive particles 10 to concentrate in the space/volume between protrusions 1 (i.e. the depressions there between) and thereby remove particles 10 substantially from the path of light through electrophoretic cell 301 in areas corresponding to apertures 1006.

In deflecting particles 10 away from their orthogonal (i.e. vertical) path the particles 10 acquire a lateral component as well as an orthogonal component to their movement in an electrophoretic cell 301 when transitioning from a first light state to a second light state. When protrusions 1 are spherical, particles 10 are laterally deflected by no more than the radius of a protrusion, or when protrusions 1 are ellipsoidal by no more than a semi-major axis, or more generally, by no more than half a protrusion's maximum dimension. This is important with regard to minimizing the switching time from a first light state to a second light state because the shorter the path length that charged particle travel the faster the switching time. The path length is also minimized because the orthogonal component is about half the cell gap as charged particles concentrate in a second light state about midway through an electrophoretic cell. The path length in embodiments will be generally <50 microns, much shorter than the 200 microns or more that charged particles have to move in prior art, patterned-electrode devices.

Particles 10 stop moving and do not complete the transition from a first light state to a second light state if electrical field 1008 is removed (i.e. zero volts applied) or if the magnitude of the field is reduced to less than a threshold field strength (i.e. a voltage level). This corresponds to an intermediate light state in a first set of intermediate light states and is shown in FIG. 1B. The differences between a first set and a second set of intermediate light states are discussed in relation to FIGS. 2C and 2D later. The direction of the electrical field 1008 is shown for guidance only, on reaching a desired intermediate state the field is taken to zero. The waveform applied to electrodes 60 to reach an intermediate state is discussed in relation to FIGS. 16 and 17 later.

Light ray 1401 incident on electrophoretic cell 301 is transmitted through an aperture 1006 defined by a section of protrusion 1 and exits the cell 301 substantially free of attenuation or light scattering. Outside the aperture area a protrusion's surface is covered by particles 10 as is the space between protrusions. Light ray 1402 incident on cell 301 is absorbed by the particles 10 that cover the surface of protrusions 1 in an intermediate light state.

The intermediate state shown in FIG. 1B has an aperture 1006 that is smaller than the corresponding aperture in a second light state (see FIG. 1C). The sum of aperture 1006 areas when in an intermediate light state can be expressed as a fraction of a face area of an electrophoretic cell 301. This fraction is transparent to specular light and corresponds to an intermediate light transmittance level. The aperture fraction provides visual access proportional to its value.

In some embodiments when aperture 1006 is small relative to its size in a second light state an embodiment appears as a black, marginally transparent (i.e. having a low light transmittance level) window. As aperture 1006 increases in size a window appears heavily black tinted and see-through, and as aperture 1006 approaches its size in a second light state the perception of a black tint reduces significantly and transparency increases significantly.

By using a programmable controller 550 (as described in relation to FIG. 18) embodiment 201 can be operated to have several intermediate light states and to provide a variable light transmittance function. Assuming light reflection by particles 10 is negligible, then embodiment 201 (shown in FIG. 1B) provides a variable light attenuation function and is a light attenuator or a light modulator.

As used in this document transmittance and absorptance are defined as:

Transmittance=(intensity of light leaving)/(intensity of light incident)

Absorptance=(intensity incident−intensity leaving)/(intensity incident)

In a second light state (i.e. the transparent state) embodiment 201 transmits specular light through its electrophoretic cell 301 substantially free of haze when the refractive index of the suspending fluid 19 used in electrophoretic ink 29 matches the refractive index of the polymer structural elements used in an electrophoretic cell 301 (e.g. polymer 50 and protrusions 1). Matching refractive indices are preferably within 0.01 of each other, more preferably within 0.005 and most preferably within 0.002. In embodiment 201 haze does not increase with viewing angle because the materials in the cell 301—the suspending fluid 19 and the polymer elements 50 and 1—are optically isotropic.

The different elements in the electrophoretic cells of embodiments are drawn in the figures with a line at their surface or border (i.e. at interfaces) even though no such line exists at the interface between refractive-index-matched, transparent materials.

FIG. 1D shows an alternative first light state for embodiment 201. In this case positively-charged, black particles 10 are randomly dispersed in electrophoretic ink 29. The diameter of particles 10 is sufficiently large to strongly interact with visible light and preferably is about 300 nm to 1 micron. Light ray 1399 incident on electrophoretic cell 301 is absorbed by particles 10. An Alternating Current (AC) electrical field 1009 (e.g., at 50 or 60 hertz) can randomly disperse charged particles in an electrophoretic ink over time. But in embodiments the thickness of an electrophoretic ink in the z-axis is not constant; it is a maximum in the spaces between protrusions 1 and a minimum over domes of protrusions 1. Consequently, the density in the z-axis of charged particles 10 is not uniform in a first light state of FIG. 1D, and it follows that the light absorptance level will not be uniform. For this reason a first light state based on randomly dispersed charged particles (as shown in FIG. 1D) is not favoured in embodiments. A first light state as shown in FIG. 1A has substantially uniform light absorptance in the z-axis and is the preferred first light state of embodiments.

The light states in subsequent embodiments are constructed similar to that described for embodiment 201 in FIGS. 1A to 1C. The description of terms such as aperture 1006 and aperture fraction and its relationship to transmittance level is equally applicable unless otherwise noted. Consequently, the description of each subsequent embodiment will describe aspects that are different to previous embodiments.

In FIGS. 2A to 2D four light states for embodiment 202 are shown: FIG. 2A shows the first light state, 2B the second light state, 2C shows an intermediate light state in a first set of intermediate light states, and 2D shows an intermediate light state in a second set of intermediate light states. FIGS. 2E to 2G show embodiment 202 in exploded views and describe three ways to change light transmittance in a first set of intermediate light states without causing a momentary flash (i.e. light states appear to change seamlessly). FIG. 2E shows an intermediate light state in a first set being progressively changed to increase light transmittance without causing flashing. FIG. 2F shows an intermediate light state in a first set being changed to a less light transmissive state in a second set without causing flashing. FIG. 2G shows an intermediate light state in a first set being regressively changed to a less light transmissive state in a first set without causing flashing. FIGS. 2E to 2G are described in more detail later in relation to the section describing how to operate embodiments.

In FIGS. 2A to 2G embodiment 202 has an electrophoretic ink 30 in an electrophoretic cell 302. The latter is indicated by an arrow in FIG. 2B and in embodiments includes all of the elements sandwiched between top and bottom electrodes 60. Ink 30 has charged particles 11 in a transparent, isotropic suspending fluid 20. The charged particles 11 have a negative charge and are black.

Polymer balls (i.e. microspheres or micro particles) 2 and 3 are a type of protrusion 1 as referred to in FIGS. 1A to 1D. Polymer balls 2 are near monodisperse and accounts for >90% of the balls, and polymer balls 3 are monodisperse and account for the remaining balls. Polymer balls 3 act as cell-gap spacers by setting the thickness of the cell 302 (together with the thickness of an optical clear adhesive layer 45). Polymer balls 3 also ensure that electrophoretic ink 30 is free to surround or engulf polymer balls 2 in the electrophoretic ink layer 1202 and that particles 11 can spread over polymer balls 2 unobstructed in the first light state.

Similar to embodiment 201, polymer balls 2 and 3 project into the electrophoretic ink 30's volume and partially fill electrophoretic layer 1202 that otherwise indicates the volume filled with electrophoretic ink 30. The polymer structure 1302 indicates a non-planar structure bonded to optical-clear-adhesive 45 and adjacent the bottom electrode 60 within cell 302. It comprises polymer 50 and polymer balls 2 and 3. Polymer 50 fills the space between polymer balls 2 and 3 and the plane of its interface surface with electrophoretic ink 30 is indicated by 1003. In exploded view 1100 plane 1003 coincides with an equator plane, and in exploded view 1101 plane 1003 is below an equator plane 1001. The latter permits a volume of concentrated particles 11 to be centred about the equator plane 1001 to minimize the (projected) face area occupied by particles 11 in a second light state (i.e. the transparent state). In the face view of FIG. 2B polymer balls 2 and 3 are arranged tightly in a monolayer and are described as having random close packing.

Electrophoretic cell 302 contains additional elements compared to cell 301 in FIGS. 1A to 1D. On one side (shown as the bottom side) cell 302 includes an optical clear adhesive (OCA) layer 45 and on the other side includes an insulating layer 95. The OCA 45 forms a strong bond with an electrode 60 on one side and polymer balls 2 and 3 and polymer 50 on the other side, see exploded view 1100 in FIG. 2B. The electrophoretic cell 302 is sandwiched between electrodes 60 and in turn between transparent substrates 90.

The substrates 90 can be any suitable transparent sheet material such as glass or polymer and can be rigid or flexible. For example, a substrate can use float glass, or heat treated float glass, or polished glass, or tinted/coloured glass, or heat absorbing/reflecting glass, or flexible glass (e.g., 50 micron or 100 micron glass from Nippon Electric Glass Co. Ltd.), or an active matrix glass, or a polymer such as PET (i.e. polyethylene terephthalate), PEN (i.e. polyethylene napthalate), PES (i.e. polyether sulfone), PC (i.e. polycarbonate), PI (i.e. polyimide), or FRP (i.e. fiber reinforced plastic).

Electrodes 60 are any suitable transparent conductor. For example, ITO (i.e. indium tin oxide), carbon nanotubes, silver nanowires, or a conductive polymer such as PEDOT (i.e. poly(ethylenedioxythiophene). Silver nanowires or PEDOT can be printed or coated as a conductive ink onto a substrate. A top electrode 60 can be one type such as ITO and a bottom electrode 60 another type such as silver nanowires. Silver nanowires suspensions/dispersions (i.e. in a carrier fluid) are available from Cambrios Technology Inc. or Seashell Technology (www.seashelltech.com). Silver nanowires coated PET substrates are available from Toray Advanced Film Co. Ltd (JP), and ITO coated PET substrates (e.g., OC series) are available from Solutia Inc. (see www-.solutia.com).

In embodiments the sheet resistivity of an electrode (e.g., ITO or silver nanowires) must be sufficiently low to apply driving waveforms without significant signal distortion: preferably 250 ohms square or less, more preferably 200 ohms square or less, and most preferably 150 ohms square or less. Colour-neutral, transparent electrodes are preferred for embodiments that require high optical quality (i.e. avoidance of the slight colour tint characteristic of ITO films and/or having maximum visible light transmission). For example, the Flexvue range of ITO electrode from Solutia, or silver nanowires are particularly preferred.

Insulating layer 95 is optional and can be any suitable transparent dielectric such as a polymer layer, an adhesive layer, a silicon oxide layer (i.e. SiOx) or a nitride layer, or $MgF_2$, or $CaF_2$. Optional layer 95 prevents electrical contact between an electrophoretic ink 30 and an electrode 60. However, depending on how the walls 70 of cavities 80 are formed the cavity forming process can form a thin polymer wall 70 adjacent top electrode 60 (not shown in FIGS. 2A to 2D but shown in FIG. 21) that completes the encapsulation of a discrete volume of electrophoretic ink 30. In this latter case an insulating layer 95 is redundant. This is discussed in more detail later.

Movement of charged particles 11 in the z-axis is limited by the inner surface of the top electrode 60, or insulator layer 95 if present, and the surface of polymer 50 indicated by 1003 in exploded views 1100 and 1101. Similar to embodiment 201, particles 11 concentrate in the second light state about midway through the electrophoretic cell 302 in the z-axis, see FIG. 2B.

FIG. 2A shows embodiment 202 in the first light state and represents a maximum spreading or distribution of charged particles in a plane adjacent the top electrode. Negatively charged black particles 11 are near uniformly spread planar with the top electrode 60 in response to an electrical field that establishes a positive potential between the top and bottom electrodes 60. Light ray 1405 incident on cell 302 is strongly absorbed by particles 11 and a front face of embodiment 202 appears black (see the face view in FIG. 2A). Black particles 11 uniformly absorb visible light wavelengths.

In a first light state of embodiments having black particles 10 or 11 light is strongly absorbed resulting in a minimum light transmittance, at least <20%, preferably <10%, more preferably <5%, and most preferably <3%.

FIGS. 2A to 2D shows polymer walls 70, and these walls define a cavity 80 (see FIG. 2B) that divides electrophoretic ink 30 into discrete or semi discrete volumes or regions within electrophoretic cell 302. A semi discrete volume refers to when neighbouring cavity walls 70 have interpenetrating regions (i.e. holes) allowing ink 30 from one to mix with ink 30 from another. The cross sectional views show walls 70 as predominantly vertical (i.e. in the z-axis of cell 302) and extending from the surface of polymer balls 2 and 3 to the insulator layer 95, or top electrode 60 if the insulator is not present. The walls 70 serve three purposes: the first is to divide the electrophoretic ink 30 into discrete or semi discrete volumes to enhance the stability of the ink 30 over time as is known in the prior art of electrophoretic display devices; the second is to provide a solid structure for the cell 302, and the third is to effectively self-seal electrophoretic ink 30 in an electrophoretic cell 302.

The second purpose of polymer walls 70 refers to polymer structural elements that effectively hold embodiment 202 together. In embodiment 202 polymer walls 70 are bonded to the insulator layer 95 at one side and polymers balls 2 and 3 at the other side of cell 302, and these elements are in turn bonded to other elements including substrates 90. An axis of cavity 80 in the plane of cell 302 is from 10 to 90 micron providing polymer walls 70 at a fine spacing/pitch. The resulting structure that bonds embodiment 302 together is a web-like network of polymer walls at 10 micron to 90 micron spacing and provides peel adhesion when the substrates are peeled apart (see walls 70 in the face view of FIG. 2A). By contrast, embodiment 201 shown in FIGS. 1A to 1D does not have structural elements that hold it together other than an edge seal (not shown in FIGS. 1A to 1D), and other than provided by an edge seal has no peel adhesion.

The third purpose of polymer walls 70 is to effectively self-seal the electrophoretic ink 30 in the cell 302 allowing a flexible embodiment 202 to be cut to any shape and size. Only ink 30 from a ruptured cavity 80 at an edge can leak, and this represents no more than a 90 micron border for a cut shape.

In embodiment 202 the polymer walls 70 are formed by a polymer induced phase separation process (known as PIPS in the prior art). This will be described in more detail in relation to FIG. 21. To minimize (or avoid) haze in a second light state the refractive index of polymer walls 70 matches the indices of polymer 50, polymer balls 2 and 3, and the suspending fluid 20.

FIG. 2B shows embodiment 202 in a second light state and represents a maximum concentrating of charged particles 11 in a non-planar structure adjacent a bottom electrode. Negatively charged black particles 11 are concentrated in the space between polymer balls 2 and 3 in response to an electrical field that establishes a negative potential between the top (i.e. adjacent insulating layer 95) and bottom (i.e. adjacent optical clear adhesive 45) electrodes 60. Each polymer ball 2 or 3 defines an aperture 1006 that is substantially free of particles 11, is transparent to specular light, and provides visual access to objects lying in view behind embodiment 202. Light ray 1406 incident on the cell 302 is transmitted through an aperture 1006 defined by a polymer ball 2 and exits the cell 302 substantially free of attenuation or light scattering.

In embodiments preferably the maximum separation between neighbouring polymer balls 2 at their equator plane 1001 (i.e. the space that concentrated particles 11 occupy in the second light state) does not exceed the minimum resolution of a typical viewer's eye at a given viewing distance to avoid a viewer being able to resolve such an area as a black spec. or optical defect. In embodiments the maximum separation is less than 250 microns, and preferably less than 150 micron for isolated defects (i.e. not repeated in neighbouring spaces). Conversely, apertures 1006—defined by polymer balls 2 in the second light state—have a maximum spacing apart of their centres of no more than 250 micron in isolated instances to avoid a perceivable optical defect.

In embodiments light states have a perceivable black tint (i.e. when an electrophoretic ink has black charged particles). An aspect of the present invention is that a viewer's perception of tint is one of a uniform tinting due to the micron scale, discrete distribution, and dense distribution of apertures 1006 (defined by polymer balls 2) in surrounding contiguous black space (i.e. particles 11 in their concentrated state). The tint in the second light state is comparable to the black tint in the windshield of a vehicle having tinted glass.

FIG. 2C (and exploded view 1102) shows embodiment 202 in an intermediate light state resulting from particles 11 moving from a first light state (FIG. 2A) to an intermediate light state, and such a light state is referred to as belonging to a first set of intermediate light states.

Movement within this first set of intermediate light states is unidirectional in an electrical field; charged particles are driven to move along the paths from adjacent the planar surface of a top electrode in a first light state to being progressively concentrated in intermediate light states by moving over the surface of protrusions within the non-planar structure 1302 provided adjacent the bottom electrode. It will be appreciated that on applying an opposite electrical field direction the charged particles leave the surface of protrusions and move toward to the planar surface adjacent to the top electrode.

Conversely, FIG. 2D (and exploded view 1105) shows an intermediate light state resulting from particles 11 moving from a second light state (FIG. 2B) to an intermediate light state, and such a light state is referred to as belonging to a second set of intermediate light state. Particles 11 initially move substantially orthogonally from being concentrated in a second light state to having a corresponding concentration adjacent a top electrode, and then particles 11 progressively spread in intermediate light states on the planar surface adjacent the top electrode until a first light state is reached. Movement within this second set of intermediate light states is unidirectional in an electrical field; it will be appreciated that on applying an opposite electrical field direction the particles 11 leave the planar surface adjacent the top electrode and move toward the non-plane structure 1302 adjacent the bottom electrode.

In FIG. 2C a negative potential causes negatively charged particles 11 to transition from a first light state and move orthogonal to the plane of the electrodes 60 until they reach the surface of polymer balls 2 forcing the particles 11 to deflect over the surface of the balls 2 as indicated by the arrow 1000. Together, the deflection caused by the solid surface of polymer balls 2 and the electrical field drive particles 11 to concentrate in the space between polymer balls 2 until the electrical field is removed (i.e. zero volts applied). A suitable electrical field can be applied by a pulse width modulation or an amplitude modulation technique (see FIGS. 16 and 17) to reach the desired intermediate light state.

Light ray 1407 (shown in exploded view 1102 in FIG. 2C) incident on the cell 302 is transmitted through an aperture 1006 defined by a section of polymer ball 2 and exits the cell 302 substantially free of attenuation or light scattering. Outside the aperture area a polymer ball's surface is covered by particles 11 as is the space between balls 2. Light ray 1408 incident on the cell 302 is absorbed by particles 11 that cover the surface of polymer balls 2 in a first set of intermediate light states. A first or initial intermediate light state in a first set of intermediate light states is reached by transitioning from a first light state, and this set of intermediate light states are unidirectional and provide a range of variable light transmittance levels that appear as having decreasing levels of black tint as the second light state is approached. Once any intermediate light state in a first set (of intermediate light states) is established in this way, subsequent changes to intermediate light states in a first set can be made as described later (the methods used are illustrated in FIGS. 2E to 2G).

An aspect of intermediate light states of a first set of intermediate light states (see FIGS. 2C and 2E) is that apertures 1006 widen depending on the desired state and parallels can be drawn with the opening of a mechanical iris (i.e. diaphragm). In this context an aperture 1006 is an iris, and embodiments can be said to function as an array of irises in the intermediate light states.

FIG. 2D shows an intermediate light state resulting from particles 11 moving from a second light state (FIG. 2B) to an intermediate light state, and such an intermediate light state is referred to as belonging to a second set of intermediate light states. FIG. 2D is also useful in describing how the first light state in embodiments is reached. A positive potential causes negatively charged particles 11 to transition from a second light state (where they have the highest level of concentration) and move orthogonal to the plane of the electrodes 60 until they reach the planar surface of insulator 95 (or top electrode 60 if insulator 95 is not present) forcing the particles 11 to spread outward over the planar surface of insulator 95 until the electrical field is removed (i.e. zero volts applied). The shape of the spread of particles 11 is irregular (see face view of FIG. 2D) and derives in a first instance from the shape of the concentrated volumes of particles 11 in the second light state. An aperture 1006 appears polygonal as particles 11 spread on the face of insulator 95 as shown in the face view of FIG. 2D. Otherwise the apertures 1006 in FIG. 2D have similar properties to those described in relation to FIG. 2C and earlier for FIG. 1B.

Light ray 1410 (shown in exploded view 1105 in FIG. 2D) incident on electrophoretic cell 302 is transmitted through an aperture 1006 defined as a discrete area within a contiguous area of spreading particles 11 at the face of (or in a plane parallel to) insulator 95. Light ray 1410 exits the cell 302 substantially free of attenuation or light scattering. Light ray 1409 incident on the cell 302 is absorbed by particles 11 spread on the face of insulator 95. A first or initial intermediate light state in a second set of intermediate light states is reached by transitioning from a second light state, and this set of intermediate light states are unidirectional and provide a range of variable light transmittance levels that appear as having increasing levels of black tint as the first light state is approached. Once any intermediate light state in a second set (of intermediate light states) is established in this way, subsequent changes to intermediate light states in a second set can be made as described later (the methods used are similar to those illustrated for a first set in FIGS. 2E to 2G).

When maintained for a suitable interval (or continuously) an electrical field spreads particles 11 on the face of insulator 95 (or top electrode 60 if insulator 95 is not present) until the particles 11 cover completely its face (i.e. lie in a plane parallel to insulator 95) within a cavity 80 in the first light state. Over time particles 11 spread to an approximately uniform thickness without apertures and achieves the strongest light absorption possible in a first light state. This description is equally applicable to the first light state of embodiment 201 shown in FIG. 1A and other embodiments herein unless otherwise noted.

In intermediate light states of embodiments the majority of particles in a cell are adjacent a solid surface (reached by being deflected or spread in an electrical field), preferably a polymer surface, and interact with such a solid surface by van der Waals interaction. In embodiments metastability (i.e. the stability or persistence of intermediate light states on removing power) is enhanced by van der Waals interaction between charged particles and an adjacent (outer) surface of a protrusion or adjacent (inner) wall surface of a cavity or adjacent (interface) surface of an insulating layer 95. This contrasts with prior art electrophoretic display devices where intermediate states (opaque in this case) involve the vertical movement of charged particles within a cavity where they are surrounded by suspending fluid and have negligible interaction with the solid surfaces that define a cavity.

In the preceding description of embodiments having intermediate light states the apertures 1006 were described as being largely free of particles 10 or 11. In some embodiments an aperture 1006 refers to a discrete area having a low density of particles 10 or 11 so that significantly more light is transmitted in such an aperture 1006 than in surrounding areas having a higher density of particles 10 or 11 and corresponding to particles in the concentrated state. In addition, the edge of an aperture 1006 is not a sharp step from one level of particle density to another, rather particle density declines with a gradient or slope from a high density in a particle concentrated area to a low density in the centre of an aperture. Such considerations arise because the response of charged particles in an electrical field is dependent on a number of factors and is not necessarily uniform. For example, particles 10 or 11 can have different charge mobilities leading them to move with different velocities in an electrical field.

FIG. 3 shows the outcome of a process step in the construction of embodiment 202, the process steps (and FIG. 3) are described in more detail in the manufacturing section later. Protrusions 2 are discrete, and prior to being used to coat a substrate they are in the form of a powder or suspension. A transparent substrate 90 has a transparent conducting electrode layer 60 and a transparent optical clear adhesive (OCA) layer 45. Monodisperse polymer balls 2 (i.e. microspheres) adhere to the OCA 45 on contact. The face view of FIG. 3 is a copy of a micrograph: polymer balls 2 were applied to an OCA 45 by spraying them with an electrostatic gun and then blowing off stacked balls 2 with an air nozzle (30 psi) to reveal a monolayer of balls 2.

The face view of FIG. 3 shows a local area 1030 that has random close packing of polymer balls 2, and another local area 1031 that has hexagonal close packing of balls. In embodiments a random close packing of monodisperse polymer balls in a monolayer results in a sum of sectional areas of polymer balls 2 in the equator plane (i.e. a plane parallel to a face of an embodiment and through the centres of balls) of about 60 to 74% of the surface area of a face depending on the degree of packing. As discussed earlier, the sectional area of a polymer ball in the equator plane corresponds to a maximum area of an aperture 1006 in the second light state. The sum of sectional areas of polymer balls in the equator plane corresponds to the maximum sum of aperture 1006 areas in the second light state, and this corresponds to a maximum light transmittance for a cell in an embodiment in the second light state. Furthermore, it corresponds to the maximum area in the second light state that is substantially free of particles 11, is transparent to specular light, and provides visual access to objects lying in view behind an embodiment. It follows that in embodiments the maximum light transmittance of a cell in the second light state is directly related to the degree of close packing of polymer balls.

A highly ordered close packing in a hexagonal lattice (as shown in detail 1031 in FIG. 3) results in a maximum sectional area in the equator plane of 90% of the face area. As discussed, this percentage corresponds to the maximum sum of aperture 1006 areas in a second light state. For example, when an electrophoretic cell 302 has hexagonal close packing its maximum sum of aperture 1006 areas is 90% of the total face area in a second light state assuming that particles 11 can be concentrated into just 10% of the face area. Embodiments in a second light state use the degree of close packing of protrusions to optimize the trade-off between areas corresponding to apertures 1006 and the area corresponding to concentrated particles 11 in a contiguous concentrated area.

Figure 4:
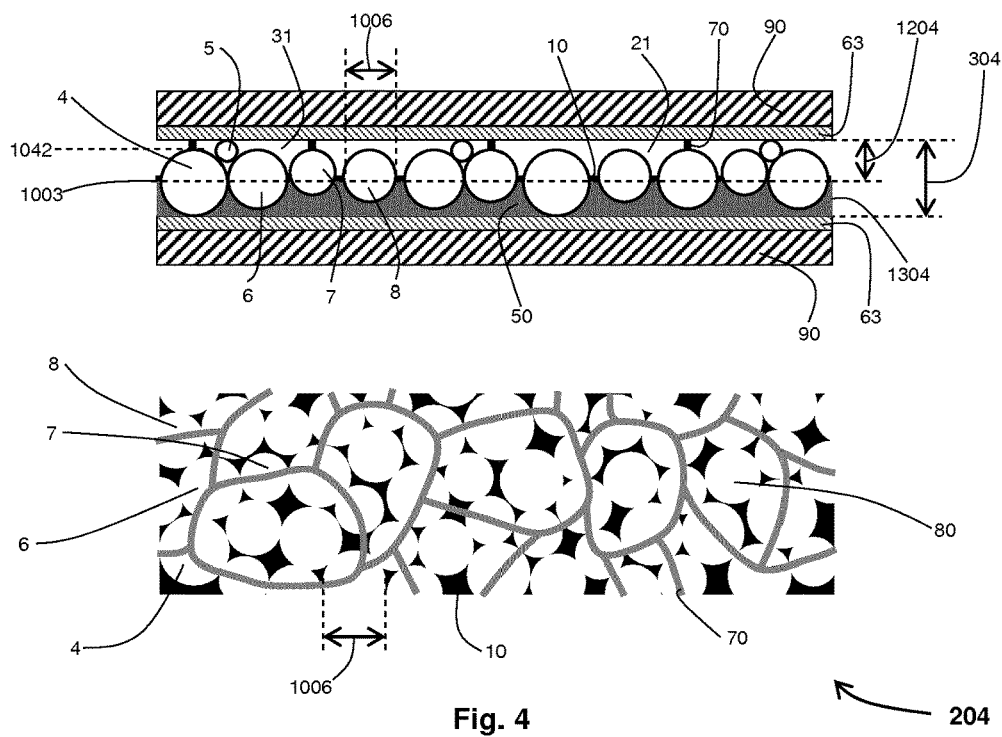
FIG. 4 shows an electrophoretic embodiment 204 in a second light state. In constructing this embodiment a sacrificial adhesive layer was used.

Embodiment 204 shown in FIG. 4 does not have an adhesive layer in its electrophoretic cell 304 unlike embodiment 202, and its polymer balls have a number of different sizes. Embodiment 204 is shown in a second light state. An aperture 1006 corresponds approximately with the sectional area at the equator plane of a polymer ball in a second light state.

Positively charged, black particles 10 are suspended in a suspending fluid 21 and their associated electrophoretic ink is 31. Similar to previous embodiments the layer occupied by an electrophoretic ink (31 in this case) is indicated by 1204, and the solid polymer structure within an electrophoretic cell 304 is indicated by 1304 and it includes the polymer balls 4, 6, 7 and 8 as well as space filling polymer 50. But in this embodiment the centres of the polymer balls do not lie on the same plane and polymer 50 is filled to a plane 1003 that approximates an equator plane or polymer 50 is filled up to or below a plane through the centre (in the z-axis) of the cell 304. In embodiment 204 the top and bottom electrodes 63 are silver nanowires but any transparent electrode is suitable.

Embodiment 204 is an example of where protrusions have a number of different sizes. In embodiments, a random close packing of polymer balls having a number of different diameters results in a higher level of close packing than when balls are monodisperse, and the corresponding sectional area in an equator plane is from 65 to 85% (of the face area) depending on the degree of close packing. In embodiments having spherical polymer balls (i.e. protrusions) the main distribution of balls (i.e. balls other than cell-gap spacer balls) has a minimum diameter of about half the thickness of an electrophoretic ink cell and a maximum diameter of less than the thickness of a cell. In FIG. 4 the main distribution of polymer balls (i.e. protrusions) is of types 6, 7 and 8. These represent 90% or more of balls by mass in electrophoretic cell 304.

In embodiment 204 polymer balls 4 acts as a first spacer and polymer balls 5 acts as a second spacer; together they determine the cell gap (i.e. the height in the z-axis) of electrophoretic cell 304. The plane that is tangential to polymer balls 4, 6, 7 and 8 is indicated as 1042 in FIG. 4. The height (in the z-axis) of this plane above the bottom electrode 63 is determined by the diameter of polymer balls 4 (i.e. the first type of spacer ball). The second spacer, polymer balls 5, stacks on the other polymer balls as shown in the sectional view of FIG. 4 and ensures that particles 10 in electrophoretic ink 31 are free to spread in a plane parallel to the face of top electrode 63 in a first light state (i.e. it spaces the inner most layer on top substrate 90—electrode 63 in the figure—apart from the tangential plane 1042 ensuring that the polymer balls 4, 6, 7 and 8 do not bridge the electrophoretic ink layer 1204).

Electrophoretic cell 304 does not have the optional insulator layer 95 shown in FIGS. 2A to 2D. This is because cavities 80 and associated polymer walls 70 have a thin polymer wall isolating an electrophoretic ink's 31 volume from a top electrode 63 (not shown in FIG. 4). This is discussed in more detail in relation to FIG. 21.

Embodiment 204 is an example of an embodiment that can be made without the need to have an adhesive layer 45 in an electrophoretic cell (unlike 202 in FIGS. 2A to 2D). To prepare embodiment 204 polymer balls 4, 6, 7, and 8 are sprayed by an electrostatic gun onto a reworkable adhesive layer on a sheet or carrier such as a PET sheet. The reworkable adhesive and sheet are sacrificial materials that are peeled away in a subsequent process step to minimize the thickness and consequently operating voltage of electrophoretic cell 304. The differences in processing steps to construct embodiment 204 versus 202 are described later.

In embodiment 204 preferably the dielectric constant of the suspending fluid 21 matches the dielectric constant of the polymer 50 and polymer balls 4, 5, 6, 7, and 8 to enhance the uniformity of an electrical field in an electrophoretic cell 304. A low level of a polarizable dielectric material is preferably added to a suspending fluid (i.e. <35% of the overall mass) and solubilized by the suspending fluid to sufficiently match the dielectric constant of the suspending fluid in an electrical field to the dielectric constant of the polymer elements in a cell. Preferably said matching is within 0.3 of each other in an electrical field, more preferably within 0.2, and most preferably within 0.15. Preferably a liquid crystal material is used as the polarizable dielectric additive. A liquid crystal material can also be used as an additive to raise the refractive index of a suspending fluid. In embodiments that use a liquid crystal material as an additive to a suspending fluid the level is sufficiently low that a resulting suspending fluid remains isotropic (i.e. does not possesses a liquid crystal phase and has negligible birefringence).

Figure 5:
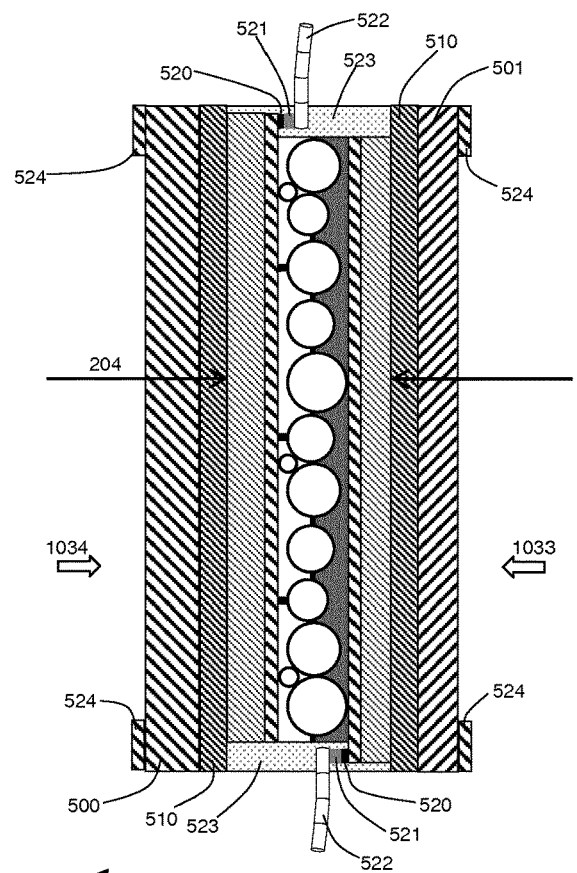
FIG. 5 shows a glass laminate embodiment 205 (i.e. an electrophoretic, smart-glass, window pane) that incorporates embodiment 204.

Embodiment 205, shown in FIG. 5, incorporates embodiment 204 (FIG. 4) in a monolithic, glass laminate and is an embodiment of a smart glass pane, or an active glass pane, or a dynamic window pane. A pair of panes 500 and 501 is laminated to embodiment 204 using optical adhesive sheets or resin known as interlayers (see 510). Each glass pane is one of the following: clear float glass, tinted/coloured glass, solar glass (i.e. infrared absorbing/reflecting glass), self-cleaning glass (e.g., Pilkington Activ), low-reflectivity glass (e.g., Pilkington Optiview), high-grade thin glass (e.g., Pilkington Microfloat), or a high optical purity glass (e.g., Pilkington Optiwhite). An example of a solar glass is green glass that has a visible light transmittance of 75% (or more) and absorbs about 35% of infrared in the wavelength band 0.9 to 1.3 micron. In some embodiments an outer pane 500 can be one type such as solar glass and an inner pane 501 another type such as clear glass. The outside environment is indicated by 1034 and the inside environment by 1033. Film 204 can have the orientation shown with respect to an outside environment or the reverse orientation.

Panes 500 and 501 can be curved and in this case an electrophoretic film 204 conforms to the curvature without apparent stress related artefacts. Glass laminate 205 is shown comprising a single electrophoretic film 204 that substantially covers its face area, but film 204 can also cover just a part of laminate 205 and the uncovered area can have an extra interlayer(s) or a PET sheet to create a uniform thickness between panes 500 and 501. In some embodiments an interlayer has a cut-out area that accommodates an electrophoretic film and in this case the glass laminate has three or more separate interlayer sheets in a sandwich ahead of lamination. Furthermore, a glass laminate 205 can have multiple films 204 distributed in a tiled or zoned manner (i.e. not overlapping).

An interlayer 510 can be polyvinyl butyral (PVB), ethylene-vinyl acetate (EVA) or polyurethane (PU), and advantageously incorporates a UV filtering function that absorbs 99% or more of incident UV light. Preferably, an EVA interlayer is used as these have the lowest maximum processing temperature and excellent adhesion to PET substrates. A vacuum-bag glass laminating process is preferred over an autoclave. Suitable interlayer films for use with the present invention include EVASAFE from Bridgestone Corporation, Japan, and S-LEC EN from Sekisui, Japan. Process guidelines for laminating PET films to glass are available from both suppliers. The resultant glass laminate embodiments produced according to the present invention can be free of discernible glass laminating related defects, do not suffer any objectionable optical degradation as a consequence of glass lamination, and possess suitable robustness in all window sizes.

An interlayer can be used in glass laminate embodiments to add functionality such as one or more of the following: UV filtering (>99%), safety and security (w.r.t. breakage and penetration), sound insulation, fire protection, and decoration or coloration.

On opposing substrates (i.e. opposing electrodes 63), connection ledges are prepared: a power or signal lead 522 is soldered to a copper tape 521 or other highly conductive flexible material that in turn is bonded to the silver nanowire electrode surface 63 via a conductive adhesive or conductive ink 520. The four edges of the glass laminate are sealed with suitable silicon or other sealant 523.

An embodiment 205 can have a mask 524 that is enamelled or silk-screen printed by a vitrified process (e.g., EN 1863-1, EN 12150-1, EN 14179-), or mask 524 can be painted with a high performance automotive paint (i.e. a paint having excellent light fastness). In addition mask 524 can be one or more frame elements such as a 'U' shaped frame element (i.e. 'U' shaped cross section) that protects the glass edges, incorporates a sealant and can also incorporate the power leads 522 thereby providing strain relief for the leads.

An embodiment 205 can incorporate embedded LEDs. In this case one of the glass panes 500 or 501 has a patterned conductive coating and the LEDs make an electrical connection to tracks on the conductive coating. The LEDs can be monochrome or RGB and used for night time lighting effects or to create an image. This night time functionality complements the day time functionality provided by an embodiment's electrophoretic cell in the glass laminate. Embodiments that provide a privacy function also have night time functionality, as do embodiments that reduce glare from artificial lighting such as a vehicle's headlights.

While FIG. 5 uses embodiment 204 (FIG. 4), it is equally applicable to other electrophoretic embodiments such as 202, 206, 210, 211, or 214.

Figure 6:
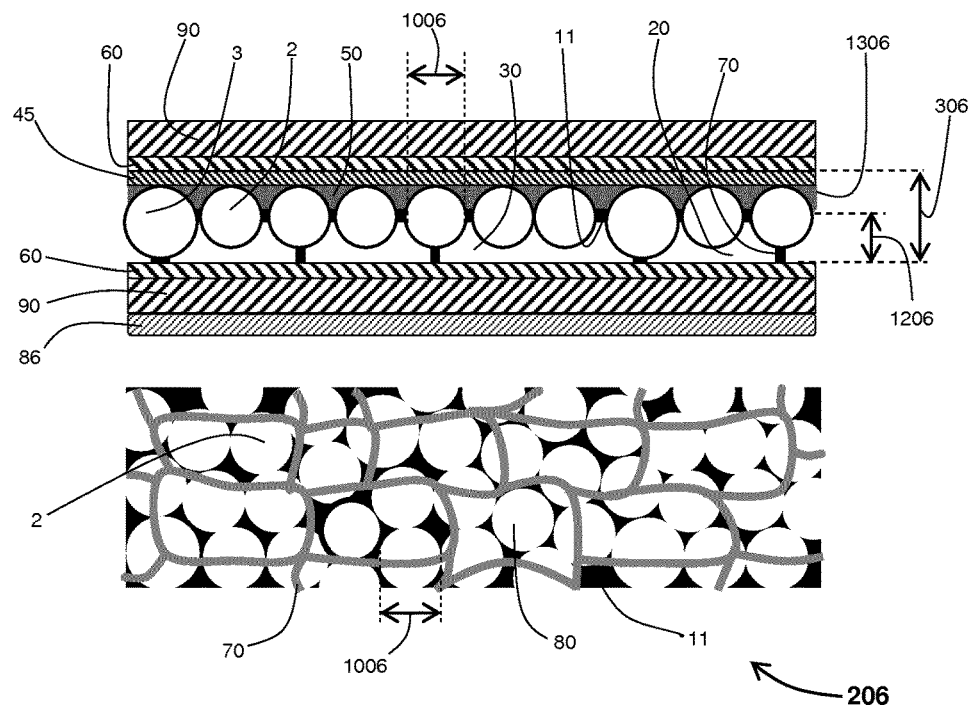
FIG. 6 shows an embodiment 206 of an electrophoretic, dimming mirror in a second light state.

FIG. 6 shows an embodiment 206 that is a smart glass mirror or active mirror and can be used as a rearview mirror in a car. Electrophoretic cell 306 is similar to cell 302 in FIGS. 2A to 2G except the optional insulator layer 95 has been left out; otherwise layer 306 is shown inverted with polymer structure 1306 adjacent the top electrode 60. Preferably the electrophoretic ink layer 1206 is adjacent the specular reflector 86 in a mirror embodiment. Preferably, electrode 60 is a specular reflector layer or has a specular reflector layer just underneath (not shown in FIG. 6).

In mirror embodiment 206 a second light state permits normal viewing of a scene in a mirror. Intermediate light states permit viewing with the light level attenuated to protect a viewer's eyes from glare such as when driving at night. Preferably the second set of intermediate light states (as shown in FIG. 2D) are favoured in mirror embodiments. Preferably a first light state in an electrophoretic cell of a mirror embodiment is still transparent (i.e. not opaque) and corresponds to a highly attenuated light transmittance level. The level of black particles 11 can be about half or less the level used in smart glass embodiment 202 because in a first light state any incident light not absorbed by particles 11 in a first pass will be reflected by specular reflector 86 towards particles 11 where it can be further attenuated in a second pass.

Figure 7:
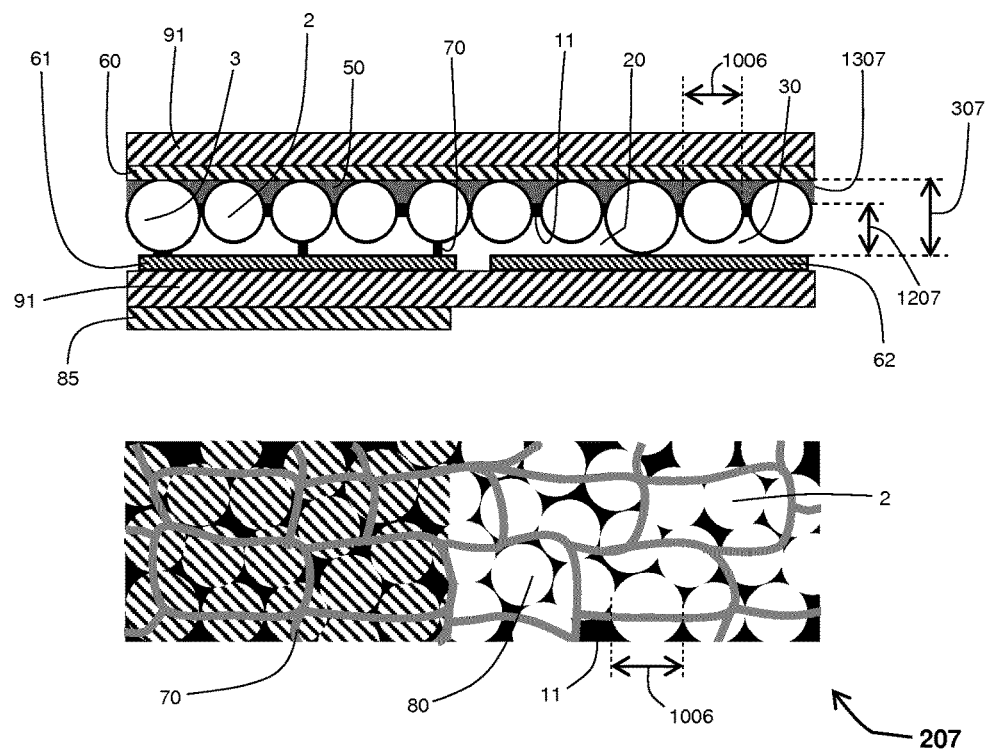
FIG. 7 shows an embodiment 207 of an electrophoretic, dimming mirror that can display an illuminated icon 85.

FIG. 7 shows an embodiment 207 that is also a smart glass mirror or active mirror. Electrophoretic cell 307 is similar to cell 306, and the electrophoretic ink layer 1207 is adjacent the specular reflector and polymer structure 1307 is adjacent the top electrode 60. The substrates 91 are glass. In embodiment 207 the bottom electrode area is patterned into a single background electrode area 62 (the majority of the surface area) and an icon area 61. Electrode 62 reflects specular light and so a separate specular reflector 86 is not necessary. Electrode 61 is transflective and reflects specular light as well as allowing a suitable level of light to be transmitted when illuminated from behind. In embodiment 207 a transflective, segment-electrode-area 61 is operated in the second light state to display an icon (i.e. graphic), and preferably an icon is strongly backlit or emits light. For example, a warning icon (e.g., a fasten seat belts icon) can be displayed in a rear view mirror embodiment by applying a second light state waveform to electrode 61 and leaving the background area corresponding to electrode 62 in a desired intermediate light state.

In some embodiments an electrophoretic device can have visible light states based on charged particles that have a colour other than black. In such embodiments the charged particles use colourant and based on choice of colourant different functionality can be realised. Embodiments that use coloured dye in the charged particles of its electrophoretic ink can transmit specular coloured light, whereas embodiments that use coloured pigment in charged particles diffusely reflect and transmit coloured light.

Embodiments that use coloured dye in charged particles provide a range of variable, coloured, light transmittance levels equivalent to a colour filter having a variable colour density. In an example an embodiment has dyed, charged particles that absorb the short visible wavelengths (i.e. blue) and transmit longer visible wavelengths so that objects viewed through an embodiment appear to have a yellow or golden tint in a first light state. Such an embodiment is suited to controlling an environment sensitive to short wavelength light such as a production environment using visible photo initiators. In a first light state sunlight is filtered to transmit longer visible wavelengths and protect elements sensitive to short visible wavelengths. In a second light state visible light is transmitted unfiltered to illuminate objects in view with white light. Dye is dispersed within charged particles at molecular level and particles are refractive index matched to the suspending fluid and the polymer structure elements in an electrophoretic cell to ensure coloured light is specularly transmitted (i.e. without haze due to light scattering) in a second light state.

In embodiments that have pigment colourant in its charged particles the functionality provided is different: charged particles that have pigment dispersed in their core, or that have a pigment core, diffusely reflect light as well as diffusely transmitting (i.e. scattering) light. For example, charged pigment particles can be white particles made from titanium dioxide (i.e. titania) and diffusely reflect about 50% of incident light and transmit the rest as scattered light. Colour pigment particles absorb some visible wavelengths and diffusely reflect or diffusely transmit the rest. In a first light state an embodiment having pigment particles can appear opalescent or translucent (depending on the pigment) but not transparent, and in a second light state the colour density is significantly lower and can appear transparent opalescent or slightly translucent. Such embodiments use intermediate light states to provide a range of variable translucency levels equivalent to frosted or colour pigmented glass.

Embodiments 208 and 209 are active-matrix addressed, display devices and their electrophoretic cells 308 and 309 are similar to cell 304 described earlier in relation to embodiment 204 (see FIG. 4). Electrophoretic cell 304 is favoured over electrophoretic cell 302 for active matrix embodiments because it does not have an optical clear adhesive layer 45 in the resultant device thereby avoiding a significant voltage drop across such a layer in use. Embodiment 208 is shown in FIG. 8 and is a see-through (i.e. transparent), monochrome electrophoretic display. Its electrophoretic ink layer 1208 is adjacent the top electrode 60 and optional insulating layer 95 and its polymer structure 1308 is adjacent an active matrix substrate 99. The bottom substrate 99 can be either a transparent, active-matrix, glass substrate or a transparent, active-matrix, film substrate. The active-matrix creates a matrix of pixels by patterning a bottom electrode into a matrix of pixel electrodes. The top electrode 60 is referred to as a common electrode. In active-matrix embodiments each pixel is independently addressed and can have the same functionality as described in relation to light attenuator embodiments, and in particular with respect to the functioning of first, second, and intermediate light states. In FIG. 8 the face area defined by pixel electrode 57 is in a first light state and the face area defined by pixel electrode 58 is in a second light state. It will be appreciated that pixels operated in a second light state maximize visual access through embodiment 208, while those operated in a first light state create an image.

Embodiment 209, see FIG. 9, is a colour-filter, active-matrix, electrophoretic display. It is sunlight readable and reflective. Colour filter 400 comprises a matrix of red 404, green 403, blue 402, and white 401 (RGBW) light transmitting areas that correspond with subpixel electrodes 65 on active matrix substrate 99. Light transmitting colour filter 400 is placed above electrophoretic cell 309, but if the colour filter is light reflecting then it is placed below an electrophoretic cell. While the colour filter shown uses RGB a CMY based scheme can also be used. In an RGBW colour scheme the colour fraction of a block primary colour is 25% of the viewing surface and equates to the absolute maximum colour reflectivity for the saturated colour; the absolute maximum (white) reflectivity is 50%. The white subpixel is used to boost the spectral power distribution of a colour as is known in the prior art of colour filter design and from colour Liquid Crystal Displays.

In embodiment 209 a white diffuse reflecting layer or coating 87 is placed over the active-matrix pixel electrodes 65, the latter are preferably light reflective (i.e. mirror-like). The diffuse reflector 87 can be in direct contact with the electrophoretic layer 1209 if its surface is electrically isolating. Such an embodiment can be used in an ebook or ereader display for example. When all a pixel's subpixel electrodes are in a second light state (as shown in FIG. 9) a viewer sees white diffuse light reflected by the reflective layer 87; by contrast in prior art electrophoretic displays, the white state is formed by reflection from white-pigment, charged particles. In a first light state, black charged particles absorb incident light falling on a subpixel's face and the particles also absorb any reflected light by layer 87. In this regard the orientation of electrophoretic cell 309 shown in FIG. 9 is more favourable (i.e. polymer structure 1309 is adjacent common electrode 60) than the orientation shown in FIG. 8 because in a first light state black charged particles directly mask the white diffuse reflective surface. It will be appreciated that embodiment 209 can be operated without a colour filter and without subpixels, in which case it is a monochrome, active matrix display with an absolute maximum white reflectivity equivalent to the aperture fraction of its second light state (e.g. about 70 to 85%). In active-matrix embodiments intermediate light states are equivalent to grey-scale light states.

In reflective display embodiments the second and intermediate light states reflect light using a rear reflector such as diffuse reflector 87 in FIG. 9. The optical properties or design of the reflector can be selected to meet the requirements of an application. Lambertian reflectance provided by a rear diffuse reflector suits wide-angle, outdoor viewing. Directional reflectance provided by a rear retroreflector suits narrow angle viewing and especially viewing from the same direction as illumination. Partial reflectance and partial transmittance provided by a rear transflector and backlight suit day-time and night-time, wide-angle viewing. The latter is particularly attractive for outdoor billboard embodiments.

Figure 10C:
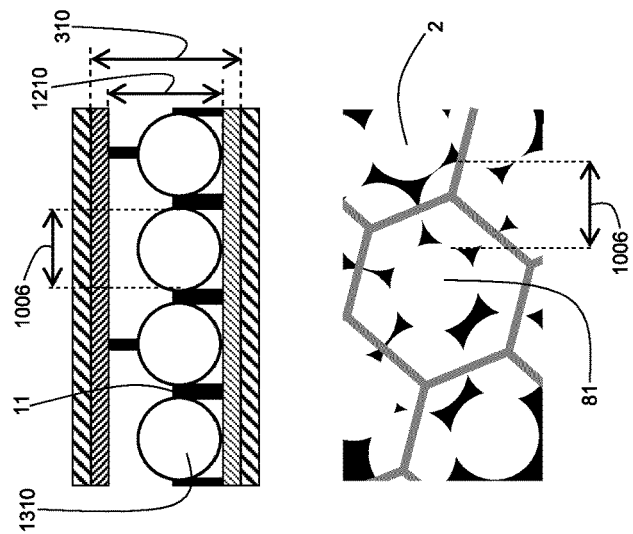
FIG. 10C shows a second light state.
Figure 10B:
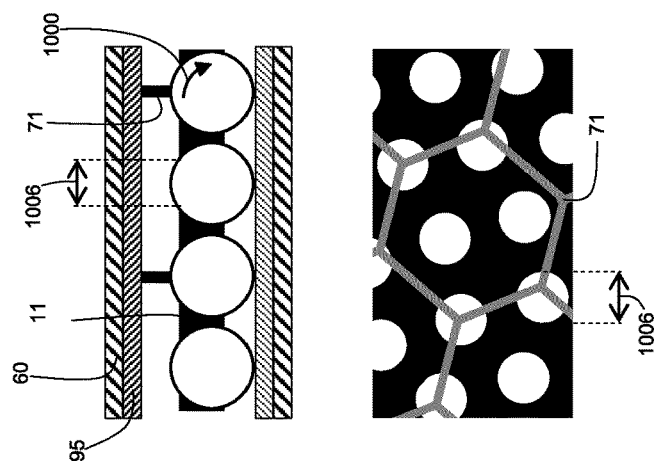
FIG. 10B shows an intermediate light state (of a first set of intermediate light states).
Figure 10A:
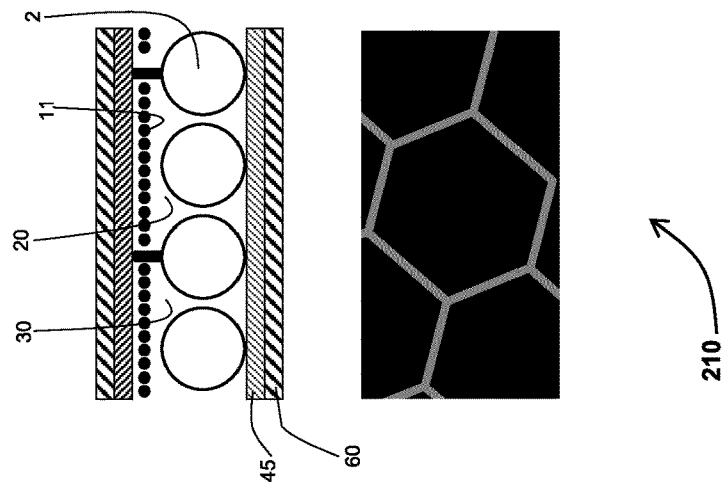
FIG. 10A shows an embodiment 210 in which black charged particles 11 are free to move from adjacent a top electrode 60 to adjacent a bottom electrode 60. Embodiment 210 is in a first light state.
Figure 11C:
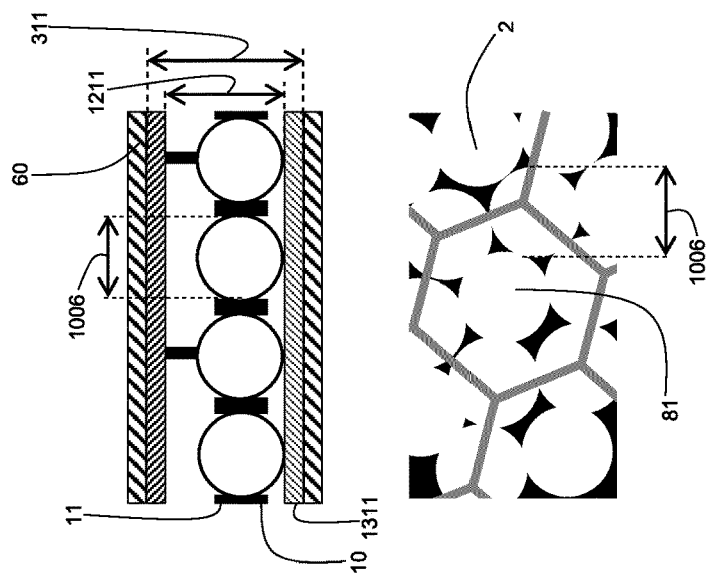
FIG. 11C shows a second light state.
Figure 11B:
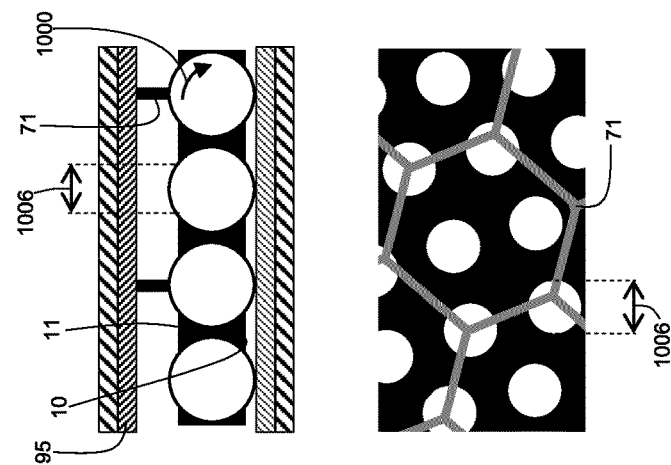
FIG. 11B shows an intermediate light state (of a first set of intermediate light states).
Figure 11A:
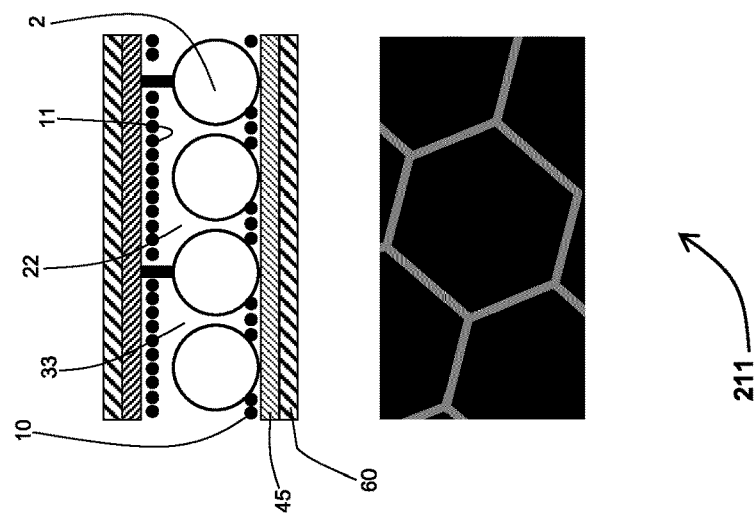
FIG. 11A shows an embodiment 211 in which an electrophoretic ink 33 has both black, positively-charged particles 10 and black, negatively-charged particles 11. Embodiment 211 is in a first light state.

Embodiment 210 shown in FIGS. 10A to 10C and embodiment 211 shown in FIGS. 11A to 11C have a simplified electrophoretic cell when compared to previous embodiments in that a space filling polymer 50 is not used.

Embodiment 210 is shown in different light states in FIGS. 10A, 10B and 10C. Its electrophoretic ink layer 1210 spans the cell 310 apart from insulating layer 95 (when present) and OCA layer 45. The method of construction of embodiment 210 is similar to that described earlier in relation to FIG. 3 except ink 30 is laminated with the top substrate to the polymer balls film (as shown in FIG. 3) without a preceding space filling polymer 50 process step. In FIGS. 10A, 10B and 10C a photolithographic process is used to form walls/ribs 71 and cavities 81. A PIPS process could also be used in this embodiment. In embodiment 210 the non-planar, polymer structure 1310 comprises a monolayer of polymer balls 2 bonded to OCA layer 45.

In FIG. 10A a first light state is similar to previous embodiments except that either a positive (as shown in FIG. 10A) or negative electrical field of sufficient pulse duration obtains a first light state (the latter spreads particles 10 on the bottom electrode 60). In FIG. 10B an intermediate light state (of a first set of intermediate light states) is shown and it too is similar to previous embodiments except that as particles 11 are deflected by polymer balls 2 (as indicated by arrow 1000) they do not encounter a solid surface between polymer balls. Instead they achieve a maximum concentration by passing between polymer balls 2 and afterwards are no longer deflected. The particles 11 then move in concentrated form in the direction of the electrical field (i.e. orthogonal to the electrodes 60) until an electrical field is removed or the particles reach the bottom electrode (having started from a top electrode). FIG. 10C shows the second light state (after transitioning from a first light state). Most particles 11 have been concentrated by being forced to pass between polymer balls 2 and some particles have reached the opposite electrode (or the OCA layer 45) before the electrical field was removed. An aperture 1006 corresponds with its description in previous embodiments.

Embodiment 211 is shown in FIGS. 11A, 11B and 11C in different light states. It is similar to embodiment 210 (FIGS. 10A, 10B and 10C) in that it does not have a space filling polymer 50. Embodiment 211 has positively-charged, black particles 10 and negatively-charged, black particles 11, and both particle types are in the same electrophoretic ink 33 and suspending fluid 22. Similar to embodiment 210, the electrophoretic ink layer 1211 spans the cell 311 apart from the insulating layer 95 and OCA layer 45 when present, and the method of construction of embodiment 211 is similar to 210. In embodiment 211 the non-planar, polymer structure 1311 comprises a monolayer of polymer balls 2 bonded to OCA layer 45.

In FIG. 11A a first light state is achieved with a positive electrical field—negatively charged particles 11 are spread over the face of insulator layer 95 and positively charged particles 10 are spread over the face of OCA layer 45. In FIG. 11B an intermediate light state (of a first set of intermediate light states) is shown; as particles 10 and 11 are deflected by polymer balls 2 they encounter each other in concentrated form about the equator plane of the polymer balls causing congestion and assisting in concentrating the particles 10 and 11 about the equator plane.

The second light state of embodiment 211 is shown in FIG. 11C; most particles 10 and 11 have been concentrated by being deflected by polymer balls 2 and encounter each other in concentrated form about the equator plane of the polymer balls causing congestion and assisting in concentrating the particles 10 and 11 about the equator plane. Particles 10 or 11 are less likely to have reached an electrode 60 when an electrical field is removed when compared with embodiment 210 because the mass of each particle type is half or less compared to the mass of particles 11 in embodiment 210 and due to the positive and negative particles congesting about the equator plane. An aperture 1006 corresponds with its description in previous embodiments.

Figure 12:
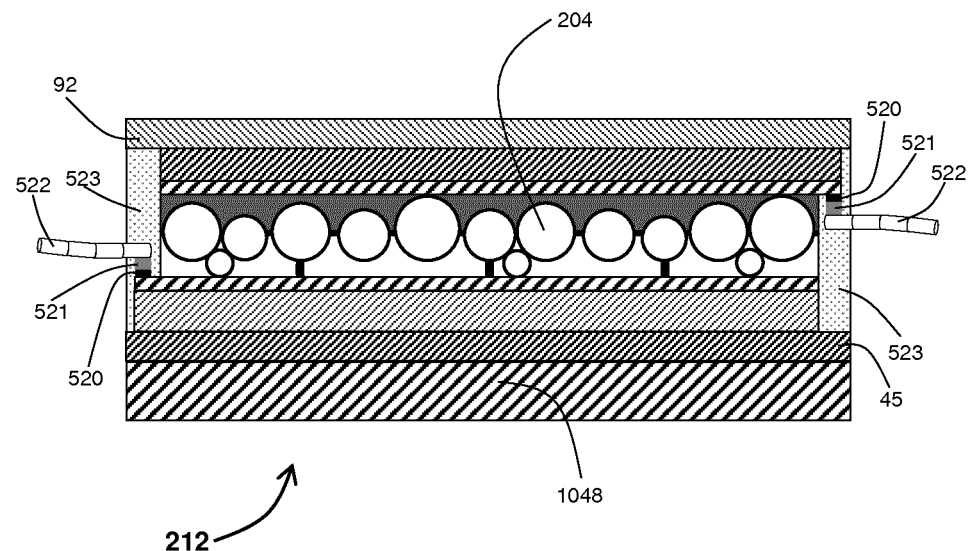
FIG. 12 shows an embodiment 212 that acts as an electrophoretic skin or electrophoretic paint layer that in use covers an underlying opaque surface.

Embodiment 212 shown in FIG. 12 is secured to an underlying opaque surface 1048 when in use (as opposed to being a window in an opening). Device 212 uses embodiment 204 (FIG. 4) as its electrophoretic device. A top substrate of embodiment 204 has an optional hard coat 92 or an anti-reflection layer. In use the bottom substrate of device 204 is bonded to an underlying surface 1048 that is not transparent using an OCA layer 45 or similar. In some embodiments layer 45 is not necessary and embodiment 212 can be secured to an opaque surface 1048 but not bonded to it. In use embodiment 212 can be bonded to one or more faces of a product; in a first light state a product's face can appear black similar to a black paint or skin and in a second light state a product's underlying surface 1048 is revealed resulting in a visually appealing change of colour or texture or image depending on the surface finish of the product. In another example embodiment 212 can be fixed to part of a product's face; in a first light state this area can be black and in a second light state a product's logo (or other graphic) can be revealed. In yet another example embodiment 212 covers a functional area of a product's surface/face; in a first light state this area is black to conceal some functional aspect of a product and in a second light state this functional aspect is revealed.

In summary, embodiment 212 acts as an electrophoretic skin or electrophoretic paint layer when secured to an underlying opaque surface 1048 and hides it from view (with black particles) in a first light state and reveals it in a second light state.

Figure 13:
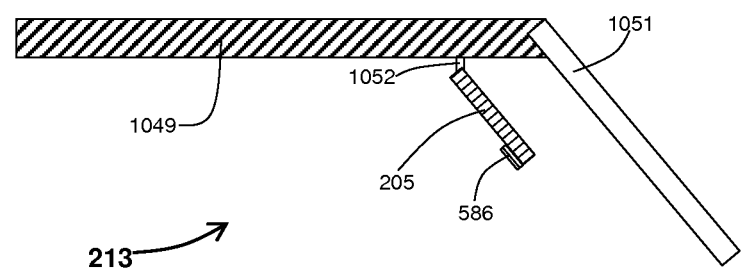
FIG. 13 shows an embodiment 213 of an electrophoretic sun visor for a vehicle.
Figure 15:
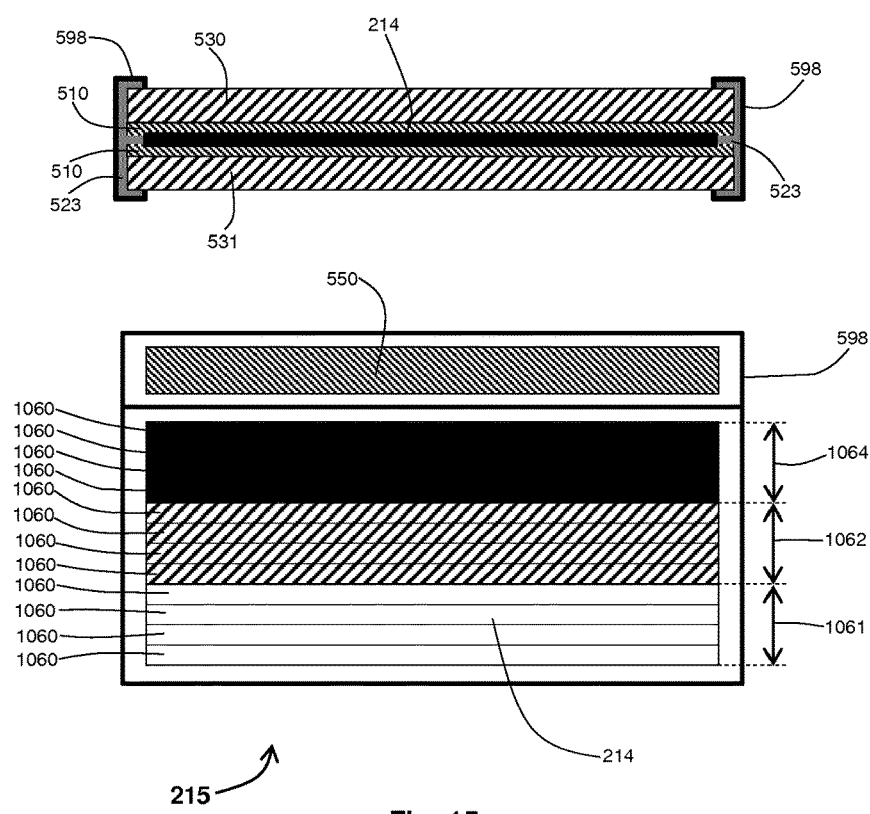
FIG. 15 shows an embodiment 215 of an electrophoretic sun visor that has independently addressable block/stripe areas.

Embodiment 213 shown in FIG. 13 is a sun visor for a vehicle and is shown in use attached to the inside of a vehicle's roof 1049. It uses embodiment 205 as its electrophoretic device and user interface 586 is near or at an edge area in use allowing a vehicle's occupant change light states by touching the visor. The electrophoretic device 213 is mounted to a vehicle's roof 1049 by a hinge mechanism 1052. Glare from a rising or setting sun can be eliminated or greatly reduced by introducing an electrophoretic visor 213 into an occupant's line of sight by moving it towards windscreen/windshield 1051 similar to prior art mechanical visors. Embodiment 213 reduces or eliminates glare from the sun by strongly attenuating light in intermediate light states or in a first light state. Advantageously, it also permits partial visual access by retaining transparency (i.e. a low level of light transmittance) unlike prior art mechanical visors. Preferably visor 213 uses polymer sheets (e.g., polycarbonate) for 500 and 501 instead of glass (see FIG. 5). A controller 550 generates signals for electrophoretic visor 213 as described in embodiment 218 shown in FIG. 18. The controller 550 can be housed in a roof area (not shown in FIG. 13) or in part of a frame area for a visor as shown in FIG. 15. While electrophoretic visor 213 is shown as a replacement for a mechanical visor it can alternatively occupy a top part (i.e. a horizontal stripe or block) of a windshield 1051 in use (i.e. laminated within a windshield as a monolithic laminated glass), or alternatively it can be secured to the inside face of a windscreen 1051. In this latter embodiment an electrophoretic device replaces a black enamelled area at the top of prior art windshields. In use light attenuation in embodiment 213 can be manually controlled by a user, or automatically controlled by a controller 550 using a forward facing camera or light sensor. It will be appreciated that the sensor scheme used to automate glare elimination in rearview mirrors can be applied to the visor embodiment herein to automate sun glare elimination.

In summary, embodiment 213 is an electrophoretic sun visor for a vehicle and can retain partial transparency while eliminating glare from the sun. It can be a standalone electrophoretic sun visor, or used in a windshield laminate, or secured to a windshield's inner face. Glare can be manually or automatically controlled.

Figure 14:
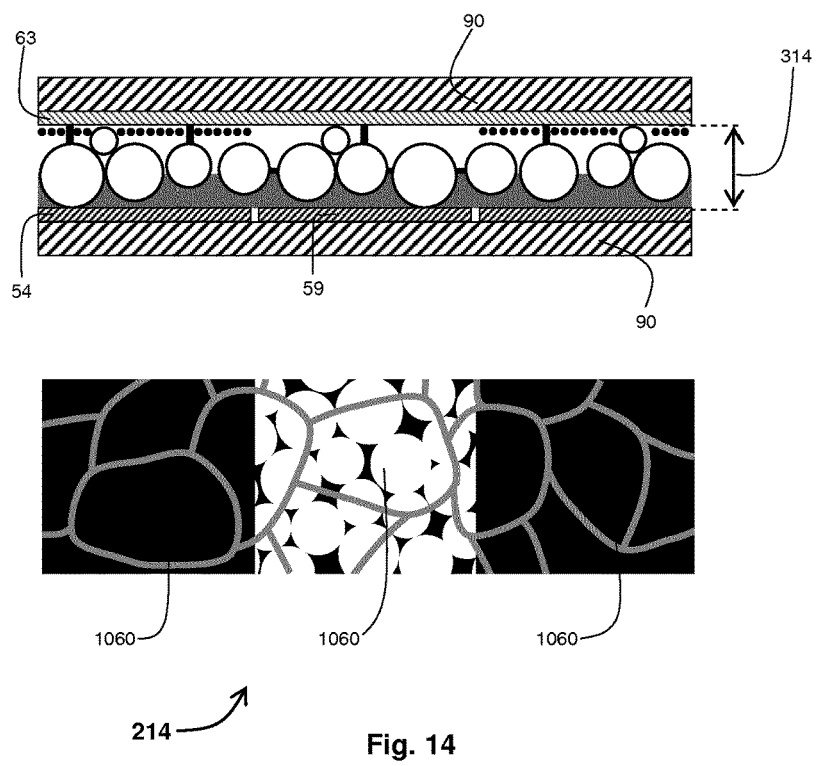
FIG. 14 shows an embodiment 214 of an electrophoretic cell that has independently addressable block areas.

In embodiment 214 shown in FIG. 14 an electrophoretic cell 314 is divided into block areas 1060 using segment-type, patterned electrodes (i.e. as opposed to active-matrix, patterned electrodes). Cell 314 is similar to cell 304 in FIG. 4. A block area 1060 on a face of device 214 can be independently addressed; the block area defined by segment electrode 54 is shown in a first state and the area defined by segment electrode 59 is shown in a second light state in FIG. 14. A block area 1060 can be any shape. Segment-type, patterned electrodes can be used with any of the embodiments described up to now. For example, a window embodiment has independently addressable block areas 1060 that appear as vertical columns or stripes (or horizontal rows) and correspond to a window blind function. In a face view of such an embodiment in use a number of left and right block areas 1060 can be operated in a first light state (i.e. black) to reduce the width of a centre area (comprising numerous block areas 1060) operated in a second light state (i.e. transparent). In another example, an embodiment similar to 212 (FIG. 12) has independently addressable block areas 1060 (using a patterned electrode, not shown in FIG. 12). This embodiment allows parts of an underlying surface to be hidden (first light state) while other parts are revealed (second light state).

In summary, embodiment 214 uses patterned electrodes 62 to allow block areas 1060 on the face of an electrophoretic device to be independently addressed in first, second and intermediate light states. In a related embodiment block areas 1060 divide a face of an electrophoretic device into parallel stripes. In another related embodiment a block area 1060 corresponds to an underlying surface that has significantly different visual properties or functions from a surface underlying another block area 1060.

Embodiment 215 shown in FIG. 15 is an electrophoretic sun visor for a vehicle similar to embodiment 213 already described except that in this case the electrophoretic device is 214 (see FIG. 14). In use a face area of embodiment 215 is patterned into numerous block areas 1060 that correspond to horizontal, independently-addressable stripes.

A cross sectional view of embodiment 215 in the area indicated as 1064 in FIG. 15 shows a 'U' shaped frame 598 that covers some or all the edges of device 215. An edge sealant 523 is at the interface between an electrophoretic laminate and its frame. The electrophoretic laminate incorporates embodiment 214 and preferably has polycarbonate or PMMA (i.e. poly methyl methacrylate) panes 530 and 531. A controller 550 (see FIG. 18) can be inside a frame 598 of a visor embodiment 215, or elsewhere in housing within a vehicle. User interface 586 is not shown but it can be incorporated into frame 598 or cover/overlap a face area of device 215.

In use embodiment 215 allows a vehicle's occupant to vary not just the degree of light blocking/attenuating of an electrophoretic visor device (as described in relation to embodiment 213) but also to vary the width of a top area 1064 that has a high degree of light blocking/attenuating (i.e. a first light state) and a bottom area 1061 that is transparent (i.e. a second light state). With respect to the latter embodiment 215 can be operated without intermediate light states as the width of strongly light attenuating area 1064 can be varied (in increments of block areas 1060) by a user so that this area is in his/hers line of sight of the sun. This permits a simplified user control of embodiment 215 and is equivalent to adjusting the position of a mechanical visor.

In embodiment 215 shown in FIG. 15 horizontal stripe areas 1060 are combined to form three areas 1064, 1062 and 1061. Area 1064 is operated in a first light state to strongly attenuate/block glare from the sun; area 1062 is optional, when present it is operated in one or more intermediate light states to provide a single or stepped graduation to an area 1061. The latter is operated in a second light state to provide visual access through an electrophoretic visor and preferably at a light transmittance level similar to automotive standards for a windshield (e.g. about 70%). A vehicle's occupant uses a down button/function on a user interface 586 to increase the width of area 1064. At an extreme the entire face area of device 215 can be area 1064. Similarly, an up button/function decreases the width of area 1064.

In embodiment 215 a face area of electrophoretic device 215 is divided into horizontal stripes/blocks 1060 using patterned electrodes (as shown in FIG. 14). Each patterned electrode is independently connected to controller 550 (see FIG. 18) using a flexible connector that routes connections on device 214 (see FIG. 14) to a printed circuit board (PCB) that in turn connects to controller 550 (not shown in FIG. 15). Alternatively, the different functional blocks of controller 550 can be divided between two or more PCBs, and one PCB connects to device 214 using a flex connector, and this PCB is housed in frame 598 at the connecting side and can wrap around a pane of the electrophoretic laminate. A suitable flex connector can be a Heat Seal Connector (HSC) or other connecting means from the prior art of display devices. Preferably a connection area between electrodes on device 214 and a flex connector is laminated between outer panes (530 and 531) to provide a strain relief. Preferably high voltage output stages 1028 (see FIG. 18) on controller 550 are provided using a high voltage driver IC that has multiple channels/outputs.

In a related embodiment electrophoretic visor 215 is built into a windshield by laminating it between a windshield's glass panes, or securing visor 215 to the inside face of a windscreen. Electrophoretic visor 215 occupies a top part of a windshield consistent with using a separate mechanical visor. As discussed earlier in relation to FIG. 13, in this latter embodiment an electrophoretic device replaces a black enamelled area at the top of prior art windshields. Such a sun visor embodiment provides a windshield with a top face area that has a variable light transmittance and a variable width. Electrophoretic visor 215 can also correspond to a window in a ship's bridge or a window in an aircraft's cockpit or a window in a rail transport carriage.

In a related embodiment visor 215 is a passenger window in an aircraft and its face area corresponds to a window opening. In a first light state the light attenuation is sufficiently high to eliminate glare from the sun, and preferably has negligible light transmittance consistent with a mechanical blind. In use a passenger can increase the width of area 1064 similar to drawing down a mechanical blind. This avoids glare from the sun in window area 1064 while allowing sunlight transmitted by area 1061 to illuminate the cabin. When area 1061 (or the entire face area of an embodiment) is operated in intermediate light states these states provide variable sunlight illumination or brightness of an internal space.

In summary, embodiment 215 is an electrophoretic sun visor that has patterned electrodes. A face is operated to have two or more areas that each comprise of (independently addressable) horizontal stripe areas 1060 operated in a common light state. One such area of a face is operated in a strongly light attenuating state to avoid glare from the sun and another area is operated in a light transmitting state to allow visual access, and in use the relative widths of such areas can be varied by a user.

Most of the embodiments described up to now had a single particle type or set in an electrophoretic ink. But all the embodiments described can readily be adapted to have more than one particle type or set within their respective electrophoretic inks. In some embodiments a black, electrophoretic ink can have charged particles that have a different function added, and these added particles have the same charge (and charge mobility) as the black particles and preferably distribute uniformly with the black particles in the different light states. For example, a black ink can contain a few percent of white charged particles (e.g., titanium dioxide) that have the same charge (and charge mobility) as an ink's black particles. In this example the white particles scatter light to help with overall light absorption by the black particles and in particular to block visual access (i.e. obscure) in a first light state.

In some embodiments a black, electrophoretic ink can have charged particles that have a different function added, and these added particles have the opposite charge to the black particles so that when particles of one polarity are in a first light state those of the opposite polarity are in a second light state. For example, a black ink can contain a low level of coloured-dye, charged particles that have the opposite charge (and charge mobility) to an ink's black particles. In this example an embodiment appears black in a first light state (w.r.t. the black particles) and colour tinted but transparent in a second light state.

The prior art for electrophoretic display devices describe useful charged particles for visible light states. In addition, the prior art for electrophoretic displays describes useful suspending fluids, charge agents, and additive components for electrophoretic inks. These can be adapted for use in the embodiments described in the current invention. For example, copper chromite, black, charged particles are described in E Ink's U.S. Pat. No. 7,002,758 and white charged particles are described in Merck's WO/2011/154104. The preparation of black, white and coloured charged particles, and suspending fluids and additives are described in Xerox's U.S. Pat. No. 7,417,787. Further lists of materials and additives for the suspending fluid are available in Sipix' U.S. Pat. No. 7,951,938 or Brown, Boveri & Company's U.S. Pat. No. 4,298,448.

To promote the uniform spreading of charged particles adjacent a top electrode face in a first light state of embodiments charged particles are preferably spherical and preferably the particle mean is less than two microns. It has been found that the smaller the charged-particle mean the more liquid-like (i.e. uniform) spreading of particles becomes in a first light state of embodiments. More preferably, charged particles are 1.25 micron or less, and most preferably 800 nm or less.

As previously described, in some embodiments a suspending fluid is isotropic, colour-less, transparent to visible light, refractive index matched to polymer elements in an electrophoretic cell, and dielectric constant matched to polymer elements in an electrophoretic cell. Furthermore, in embodiment's, a suspending fluid has no solubilizing capability with respect to polymer elements in an electrophoretic cell that it is in contact with. Preferably, polymer elements (i.e. protrusions, space-filling-polymer 50, and cavity walls) are crosslinked and insoluble in a suspending fluid, and more preferably polymer elements lack compatibility with a suspending fluid's chemistry. In particular, polymer protrusions are preferably highly crosslinked, and more preferably made from substantially crosslinking monomer (i.e. monomers having a functionality of two or more). Preferably a suspending fluid's dominant functionality is provided by a fluorocarbon (i.e. a fluorinated oil), a perfluorinated compound, or a polymerized siloxane (i.e. a silicone oil).

A suitable suspending fluid is preferably a blend of two or more fluids. A suitable suspending fluid has a conductivity from 0 pS/cm to 5 pS/cm, a boiling point of about 200° C. or more, and a vapour pressure of about 0.1 mmHg or less. In some embodiments a fluid can be coloured with non-switching (i.e. does not exhibit electrophoresis) ultra-fine (i.e. 5 nm to 50 nm) suspended pigment. For example, a slight colour tint can be added to a suspending fluid to compensate for an undesirable colour tint caused by ITO electrodes.

In the next section, a method to operate embodiments is described. FIGS. 16A and 16B show net-DC, driving waveforms (i.e. waveforms that are not AC balanced) that can be generated by a controller such as shown in FIG. 18 to select bistable first and second light states in embodiments or select a metastable intermediate light state by passing through one of the first or second light states. FIGS. 16C and 16D show three waveform (i.e. signal) types for changing from one intermediate light state to another seamlessly while remaining within a range of light transmittance defined by these two intermediate light states to avoid flashing. FIG. 17 shows how net-DC waveforms (i.e. from FIGS. 16A to 16C) can incorporate alternating current (AC) reversal to provide AC balanced driving waveforms for applying to embodiments.

Electrophoretic embodiments can be bistable or metastable, and embodiments operated by a controller to provide variable light transmittance using intermediate light states must be metastable in order to use the waveforms described herein. Bistable embodiments have stable first and second light states in the absence of power and only require a pulse of suitable duration, amplitude and polarity to change state, and following the pulse the voltage on the cell is taken to zero. The power requirement is zero to retain a state (at least for a short duration). In metastable embodiments the intermediate light states, and the first and second light states, are stable in the absence of power (i.e. zero volts applied to the cell). By contrast, prior art liquid crystal and suspended particle devices are not bistable or metastable and require a continuous electrical field to maintain a transparent state or intermediate state. Similarly, commercially available electrochromic windows are not stable in the absence of power (they require a continuous holding voltage to maintain an intermediate light state). It is particularly advantageous that embodiments are metastable as this uses the least power (only when changing light state or refreshing an existing state) and enables embodiments to be battery powered or powered by a solar cell element in a glazing application. In an automotive application a side window embodiment will retain its level of transparency (i.e. its light state) with zero power when a vehicle is switched off and parked for a period of time.

In particular, a method to change intermediate light states is described that avoids a perceivable (i.e. momentary) flash while changing. In the prior art of conventional electrophoretic displays (these devices cannot provide a transparent light state) it is known to change grey states by driving charged particles in a first part to a known state such as one of two extreme light states (usually a maximally white state) and then drive them to a new grey state in a second part. But the first part causes a perceivable display flash (or blank) and this can readily be seen on screen updates of commercially available electrophoretic ebook readers. This flashing while updating is undesirable. As used herein flashing is interchangeable with blanking. The flashing addressing issue is discussed in the article 'Drive Waveforms for Active Matrix Electrophoretic Displays' by Robert Zehner (and others) in SID 03 Digest on pages 842 to 845.

In a smart glass embodiment a window can measure up to 1.2M by 3M and so flashing each time a small change in light transmittance (e.g., the difference of one intermediate light state) is made can be disconcerting to a user. In a display embodiment frequent updating or animation requires seamless changes to light states without flashing. With the present invention, embodiments can be updated seamlessly and avoid flashing; they change from one intermediate light state to another and avoiding passing through a reference light state (or reset or initialization light state) such as a first or second light state.

In embodiments, light transmittance when changing from a current intermediate light state to a selected intermediate light state remains within the light transmittance range defined by these two extreme light states. Furthermore, light transmittance either increases or decreases from the current intermediate light state to reach the selected intermediate light state. Even with a purposely slowed change of light transmittance, a user perceives a gradual, seamless change, and the avoidance of passing through a reference light state outside the range defined by these two states avoids a perceivable flash. Implementing variable intermediate light states that can change direction with respect to increasing or decreasing light transmittance from state to state relies on driving charged particles at a non-planar surface to concentrate them and increase light transmittance, or at a planar surface to spread them and reduce light transmittance.

FIGS. 2E to 2G show embodiment 202 in exploded views (see also the earlier description of FIGS. 2A to 2D) and describe increasing light transmittance in FIG. 2E, or decreasing light transmittance in FIGS. 2F and 2G in a first set of intermediate light states while remaining within the light transmittance range defined by the current and selected intermediate light states. In FIG. 2E an intermediate light state in a first set (see view 1110) is progressively driven to seamlessly increase light transmittance and avoid flashing. Waveform 1018 in FIG. 16C provides a negative electrical field that drives negatively charged particles 11 in the direction of the non-planar, polymer structure 1302 causing them to be further concentrated by being deflected by polymer balls 2; after a time T3 the negative field is removed (i.e. taken to zero volts) and particles 11 remain stable in a newly selected intermediate light state that has a larger aperture 1006 (as shown in view 1111) and increased light transmittance. As shown in FIG. 16C the electrophoretic cell has zero volts applied before changing the current intermediate light state to the selected state with a pulse of duration T3, and zero volts is applied after reaching the selected state. It will be appreciated that an embodiment can be progressively driven in one direction only with pulses having the same polarity, and in a first set of intermediate light states this means the available intermediate light states for progressive driving are those lying between the current intermediate light state and the second light state (highest light transmittance). Similarly, a second set of intermediate light states can be progressively driven using waveform 1021 in FIG. 16D to seamlessly change a current intermediate light state to one of those intermediate light states lying between it and a first light state (very low light transmittance).

When a change to a current intermediate light state in a first set of intermediate light states requires light transmittance to change direction, going from increasing to decreasing (i.e. a reversal), then the progressive driving method shown in FIG. 2E cannot be used as it can only implement increasing light transmittance in a first set of intermediate light states. In the method shown in FIG. 2F a change in direction for light transmittance causes a swap from operating with a first set of intermediate light states to operating with a second set—for convenience this method will be called the swap method herein. To reduce light transmittance in FIG. 2F negatively charged particles 11 are driven substantially orthogonally from a first set of intermediate light states in view 1112 to a second set in view 1113 using waveform 1019 in FIG. 16C and spread on the planar surface adjacent the top electrode until the selected intermediate light state in a second set is reached as shown in view 1114. Time T5 of waveform 1019 includes both the time for charged particles to reach the planar surface adjacent the top electrode and the time for particles to spread and reach the reduced light transmittance of the selected intermediate light state. In view 1114 the aperture 1006 is smaller than the corresponding aperture in view 1112 demonstrating that light transmittance has reduced. Once a change of direction has been implemented using the swap method, the selected intermediate light state in the second set becomes the current state and subsequent progressive driving (as discussed already in relation to FIG. 2E) then reduces light transmittance as intermediate light states approach a first light state.

Similarly, changing direction in a second set of intermediate light states, in this case from progressively decreasing light transmittance to increasing light transmittance, can use the swap method; a current intermediate light state in a second set of intermediate light states is swapped to an intermediate light state in a first set using waveform 1022 (FIG. 16D) and negatively charged particles 11 are concentrated by the non-planar surface adjacent the bottom electrode to increase light transmittance until the selected intermediate light state in a first set is reached. It will be appreciated that when reversing the direction of light transmittance using the swap method light transmittance remains within the range defined by the current intermediate light state in one set of intermediate light states and a selected intermediate light state in the other set to ensure seamless changing of light transmittance and avoid flashing.

As described the swap method implements a change of direction for light transmittance by swapping (or switching) from one set of intermediate light states to the other set. In an alternative direction-reversing method shown in FIG. 2G the current and selected intermediate light states both belong to the same set of intermediate light states and the method is referred to as the regressive method herein for convenience as it can be thought of as the opposite to progressing driving (as described earlier in relation to FIG. 2E).

Using the regressive method light transmittance can be reduced in going from a current intermediate light state in a first set of intermediate light states to a selected intermediate light state also in a first set. In the regressive method shown in FIG. 2G a change in direction for light transmittance is implemented in a first part along the lines of the swap method whereby swapping (or switching) the current intermediate light state to an intermediate light state in a second set of intermediate light states allows light transmittance to be reduced to the required level, and then in a second part this new intermediate light state is swapped again to return it to a corresponding (i.e. one having similar reduced light transmittance) intermediate light state in a first set. In FIG. 2G to reduce light transmittance of a current intermediate light state in a first set of intermediate light states (as shown in view 1115) negatively charged particles 11 are driven substantially orthogonally from the surface of the non-planar structure adjacent the bottom electrode toward (or at) the planar surface adjacent the top electrode using a first part of waveform 1020 (FIG. 16C), and particles 11 go on to spread on the planar surface adjacent the top electrode until the required reduced light transmittance is reached corresponding to time T6. Time T6 of waveform 1020 includes both the time for charged particles to reach the planar surface adjacent the top electrode and the time for particles to spread and reach the reduced light transmittance required.

Subsequently particles 11 are driven substantially orthogonally onto the surface of the non-planar structure adjacent the bottom electrode using a second part of waveform 1020 comprising an opposite polarity to the first part to become an intermediate light state in a first set having the required reduced light transmittance (see view 1117). In waveform 1020 time T7 corresponds to the time to swap or return charged particles from an intermediate light state in a second set as shown in view 1116 to a similar light transmittance in an intermediate light state in a first set as shown in view 1117. In view 1117 the aperture 1006 is smaller than the corresponding aperture in view 1115 demonstrating that light transmittance has reduced. Once a change of direction has been implemented using the regressive method, the newly-selected, intermediate light state in the first set becomes the current state and subsequent progressive driving (as discussed already in relation to FIG. 2E) once again increases light transmittance as intermediate light states approach a second light state.

Similarly, changing direction in a second set of intermediate light states, in this case from progressively decreasing light transmittance to an intermediate light state having increased light transmittance, can use the regressive method; it is implemented in a first part by swapping (or switching) the current intermediate light state in a second set of intermediate light states to an intermediate light state in a first set using the first part of waveform 1023 (FIG. 16D) where the non-planar structure adjacent a bottom electrode concentrates particles 11 causing light transmittance to increase to the required level over time T6, and then in a second part this new intermediate light state is swapped again to return it to a corresponding (i.e. one having similar increased light transmittance) intermediate light state in a second set using a reverse polarity to the first part and a time T7 (see waveform 1023 in FIG. 16D). It will be appreciated that when reversing the direction of light transmittance using the regressive method light transmittance remains within the range defined by the current intermediate light state in one set of intermediate light states and a selected intermediate light state also in the same set to ensure seamless changing of light transmittance and avoid flashing.

Advantageously the progressive (e.g. FIG. 2E) and regressive methods (e.g. FIG. 2G) provide increasing or decreasing light transmittance using a given set of intermediate light states so that the current intermediate light state and a selected intermediate light state both belong to the same set permitting an electrophoretic device's operation and metastability to be optimized for that set of intermediate light states. If the first set of intermediate light states is used in an embodiment then as described earlier metastability is enhanced by van der Waals interaction between charged particles and the surface of an adjacent, non-planar structure comprising protrusions 1 and space-filling-polymer 50, and the use of spherical protrusions 1 increases surface area of the non-planar structure by a factor of about 1.4 (assuming a mono layer of protrusions covers 70% of the non-planar surface) with respect to a planar surface thereby enhancing van der Waals interaction by up to that amount with respect to a comparable intermediate light state in a second set of intermediate light states (where particles interact with a planar surface).

Waveforms 1010, 1011, and 1012 in FIG. 16A select a first light state when an electrophoretic ink has negatively charged particles, and the corresponding waveforms 1014, 1015, and 1016 select a second light state. For example, waveform 1010 drives negatively charged particles substantially orthogonally to a planar surface adjacent a top electrode where in a first light state they spread (i.e. distribute) maximally over a time T1. The corresponding waveform 1014 drives negatively charged particles substantially orthogonally (to an electrode face) to a non-planar, polymer structure whose surface is shaped to interact with charged particles within an electrical field causing particles to be maximally concentrated over a time T1.

The waveforms 1013 and 1017 in FIGS. 16A and 16B can be used to select an intermediate light state in either a first or second set of intermediate light states but unlike the waveforms in FIGS. 16C and 16D these waveforms drive particles to a reference or reset level in a first part and to a selected intermediate light state in a second part. In waveforms 1013 and 1017 the reference state is either a first light state (e.g. FIG. 2A) or a second light state (e.g. FIG. 2B) depending on the charge polarity of an electrophoretic ink's particles. For example, in a first part waveform 1013 drives negatively charged particles 11 to a planar surface adjacent a top electrode where they spread maximally to achieve a first light state for time T1 and then an opposite polarity in a second part drives the charged particles 11 substantially orthogonally (to an electrode face) to the non-planar surface adjacent a bottom electrode until they reach polymer balls 2 and then they are deflected by polymer balls 2 thereby opening an aperture 1006 whose size in an intermediate light state is proportional to the second pulse's width T2, and this intermediate light state belongs to a first set of intermediate light states.

The corresponding waveform 1017 in a first part drives negatively charged particles 11 to a non-planar surface adjacent a bottom electrode where they maximally concentrate to achieve a second light state for time T1, and then an opposite polarity in a second part drives the charged particles 11 substantially orthogonally to the planar surface adjacent a top electrode where the still concentrated particles spread closing an aperture 1006 whose size in an intermediate light state is proportional to the second pulse's width T2, and this intermediate light state belongs to a second set of intermediate light states. Undesirably with waveforms 1013 and 1017 the first pulse of time T1 can cause an electrophoretic device to appear to momentarily flash while transitioning from a current light state to a selected intermediate light state.

In embodiments that have negatively charged particles the waveforms in FIGS. 16A and 16C relate to a first light state or an intermediate light state in a first set of intermediate light states, and those in FIGS. 16B and 16C relate to a second light state or an intermediate light state in a second set of intermediate light states. Conversely, in embodiments that have positively charged particles the waveforms in FIGS. 16A and 16C relate to a second light state or an intermediate light state in a second set of intermediate light states, and those in FIGS. 16B and 16C relate to a first light state or an intermediate light state in a first set of intermediate light states. It follows from these relationships that in describing intermediate light state waveforms for a first set of intermediate light states that a comparison can be made with the polarity of the first light state's waveform, and similarly for the second set with the second light state's waveform.

Waveform 1018 drives charged particles progressively within an intermediate light state set, and is implemented with a pulse (or train of pulses) that has the opposite polarity to waveform 1010; and, waveform 1021 drives charged particles progressively within an intermediate light state set, and is implemented with a pulse (or train of pulses) that has the opposite polarity to waveform 1014. Waveform 1019 drives charged particles from one intermediate light state set to another set and is implemented with a pulse (or train of pulses) that has the same polarity as waveform 1010; and, waveform 1022 drives charged particles from one intermediate light state set to another set and is implemented with a pulse (or train of pulses) that has the same polarity as waveform 1014. Waveform 1020 drives charged particles regressively within an intermediate light state set and is implemented with two pulses (or a train of pulses corresponding to these two), a first pulse has the same polarity as waveform 1010, and a second pulse has the opposite polarity; and, waveform 1023 drives charged particles regressively within an intermediate light state set and is implemented with two pulses (or a train of pulses corresponding to these two), a first pulse has the same polarity as waveform 1014, and a second pulse has the opposite polarity.

The waveforms (i.e. signals) shown in FIGS. 16A to 16D have significant net DC components. In FIG. 17 methods to adjust these waveforms so that they provide balanced AC driving waveforms are described. An AC balancing pulse(s) can cause momentary flashing unless implemented as described herein. Driving waveforms that change from a first light state to a second light state or vice versa can be AC balanced by providing in a first part an AC balancing pulse that confirms the existing light state and so avoids flashing, and in a second part changes light state. Waveform 1024 is equivalent to waveform 1010 (FIG. 16A) except an opposite polarity balancing pulse of duration T1 is applied immediately (or nearly immediately) before a pulse of duration T1 that drives an embodiment to a changed light state. The first pulse confirms or re-establishes the existing light state, and the second pulse changes a light state as described earlier for waveform 1010. For example, if the current light state is the first state then the AC pulse makes no change to this light state and the second pulse changes to the second light state.

The AC balancing method shown in waveforms 1025 and 1026 is less desirable because it can cause momentary flashing. The latter waveform is a more optimized version of the former. Waveform 1025 is equivalent to waveform 1013 (FIG. 16A) except each pulse in waveform 1013 is preceded by an opposite polarity, equal magnitude, balancing pulse in waveform 1025. The second part drives an embodiment to an intermediate state over time T2, but the leading AC pulse will cause an additional momentary flash. Waveform 1026 is equivalent to waveform 1025 except just one AC balancing pulse is provided having opposite polarity to the net DC component of the remaining waveform. In waveform 1026 an AC balancing pulse of time T4 (=T1−T2) precedes waveform 1013, but this shorter leading AC pulse can still cause a momentary flash.

In a preferred scheme for providing balanced AC driving waveforms, momentary flashing is avoided by providing AC balancing pulses having an amplitude or duration less than a threshold value for an electrophoretic device. An AC balancing pulse below a threshold amplitude ensures that particles 10 or 11 do not experience sufficient field strength to cause movement (e.g., overcome their van der Waals interaction with a solid surface) and has sufficiently long duration to ensure a sum of zero for the energies of positive and negative pulses in a waveform. This case is shown in waveform 1038 in FIG. 17, otherwise waveform 1038 is equivalent to waveform 1018 in FIG. 16C. In the example a positive polarity balancing pulse has amplitude of VD/3 (i.e. below a threshold amplitude) and duration of T3×3 to balance the negative polarity intermediate light state pulse. Alternatively, instead of a single balancing pulse a number of short duration pulses can be used where the duration of each is too short to exceed a threshold pulse duration for a given voltage amplitude. Such pulses need to have zero volt periods inserted between pulses. This case is shown in waveform 1039, otherwise waveform 1039 is equivalent to waveform 1021 in FIG. 16D. In the example, five negative polarity balancing pulses have amplitude −VD, duration T3/5, and balance the positive polarity intermediate light state pulse over a time T3×5.

In embodiments AC balancing pulses having an amplitude or duration less than a threshold value for an electrophoretic device can be provided as part of each waveform, either before or after the part that changes a light state, or balancing pulses can be provided periodically having an equal magnitude (i.e. time×voltage) and opposite polarity to the net DC component of the applied waveforms over a period. In some embodiments periodic AC balancing pulses (less than a threshold amplitude or threshold duration for a given electrophoretic ink) are provided at a period of less than one minute, more preferably, less than 10 seconds, and most preferably, less than 3 seconds.

In embodiments an electrophoretic device receives intermittent, quasi-stochastic signals from driving electronics (see FIG. 17 for example) arising from the isolated signal driving of metastable embodiments (a signal is required only when changing light states) and the requirement for balanced AC driving. This contrasts with the continuous, periodic, AC signals used with liquid crystal devices and suspended particle devices.

As used herein a positive potential is applied to an embodiment when the top electrode 60 or 63 (e.g., the one adjacent the electrophoretic ink layer 1201, 1202 or 1204) is at a higher voltage level than the bottom electrode 60 or 63 (e.g., the one adjacent the polymer structure 1301, 1302 or 1304). To apply zero volts both electrodes 60 (or 63) receive the same voltage level. To apply a positive potential of VD as shown in waveform 1010 in FIG. 16A across a cell of an embodiment a high voltage output switch or driver 51 in FIG. 18 is turned on to apply a VD level to a top electrode 60 or 63 and a low voltage output switch S4 in FIG. 18 is turned on to apply a ground or reference level to a bottom electrode 60 or 63. The S2 and S3 switches or drivers remain off. This is summarized in the first row of table 1027 in FIG. 18 (see VD in LHS column of table 1027). The second row of table 1027 in FIG. 18 shows how to apply a negative potential (-VD) to an embodiment.

An embodiment can be controlled by a pulse width modulation technique (e.g., waveform 1010) or an amplitude modulation technique (e.g., waveform 1011), or aspects of both can be incorporated into a driving waveform as shown in waveform 1012 in FIG. 16A. In this latter case a short pulse having increased amplitude VI can be applied to initialize particles 10 or 11 to provide an initial threshold field strength, and then a reduced level VD applied to move particles to one of a first or second light state depending on the polarity of the charge on the particles 10 or 11 as discussed earlier.

In smart glass embodiments pulse width modulation is implemented with a two-state trajectory driver output stage. This is described in more detail in relation to FIG. 18. Amplitude modulation can be implemented in two ways. In a preferred method, amplitude modulation uses a two-state trajectory, driver output stage along with a software programmable high-voltage, power supply. In an alternative method amplitude modulation uses a multiple-state trajectory, driver output stage along with multiple, high-voltage, power supply levels. In the former method, software programs (i.e. modulates) a required voltage level on a high-voltage, power supply and then applies a two-state trajectory pulse (i.e. the programmed level and zero volts) to a cell in an embodiment. For example, to apply waveform 1012 of FIG. 16A to an embodiment, software first programs the power supply to a VI level and outputs this as a first part/pulse to an embodiment, then outputs zero volts while it programs the power supply to VD, and then outputs this reduced amplitude in a second part/pulse to complete the waveform 1012. In this example inserting a zero volt interval between a first and second pulse of waveform 1012 does not alter the resultant light state. One way to implement a software programmable, high-voltage, power supply is to use a digital-to-analog converter IC to provide a reference voltage to a switch-mode-power-supply (SMPS).

In some embodiments a programmable controller 550 (see FIG. 18), has a microprocessor or a microcontroller running software and controls an embodiment using a two-state-trajectory, high-voltage, output stage 1028 that provides intermittent waveforms to an embodiment. FIG. 18 shows an embodiment of a smart glass window system that includes smart glass embodiment 205 and controller 550 comprising a microcontroller 581 and a high voltage output stage 1028 for applying two-state, trajectory waveforms such as those described in FIG. 17 with the exception of waveform 1038 (this latter waveform requires a software programmable power supply as discussed earlier in relation to amplitude modulation).

In embodiment 218 a microcontroller (or microprocessor) 581 has integrated or external RAM and program memory. A software program generates an appropriate driving waveform in response to a stimulus and this waveform is applied to smart glass 205 via a buffer (or opto-isolator) stage 589 and a high voltage output stage comprising several elements and indicated by 1028. A power supply 580 generates at least two DC supply levels: VLOGIC for powering the microcontroller 581 and other logic integrated circuits, and high voltage level VD used in waveforms applied to smart glass 205 when changing a light state. Important external parts of controller 550 are a user interface 586 and/or a wireless remote control 585.

A high voltage output stage 1028 has two output channels 593 and 594 and the leads 522 of smart glass 205 are connected to them. Each channel has two switches and up to three snubber circuits: S1, S2, 590, 591 and 592 for channel 593 and their equivalent S3, S4, 590, 591, and 592 for channel 594. Switches S1 and S3 are any suitable type such as p-channel MOSFETs and S2 and S4 can be n-channel MOSFETs. For example, the p-channels can be IRF5210PbF from International Rectifier and the n-channels, IRF540Z. The snubber circuit 590 protects the p-channels (on turn-off) and the circuits 591 protect the n-channels (on turn-off) and are optimized for a given load, in particular for the capacitance of a load. Snubber circuit 592 is designed to protect the MOSFETs on turn-on. Calculation of values of elements in a snubber circuit is known in the prior art where they are used to suppress high frequency oscillations associated with reverse recovery effects in power semiconductor applications. Table 1027 shows output voltage values in the left column and across each row the switch status for a particular voltage value. The output voltage 'Hi' refers to high impedance or open circuit and signifies that no level is applied to a channel when its two switches are off.

The microcontroller 581 can have an optional network function 584 partly or completely integrated. A real-time-clock circuit (not shown) can be used by software to implement time-based algorithms such as adjusting light states for the time of day. Optional sensors can be used to adjust driving waveforms to an environment's temperature (sensor 587), or light levels (sensor 588) internally and/or externally.

In some embodiments, a temperature sensor 587 measures the temperature of a face (inside or outside) of an electrophoretic, glass laminate (see FIG. 18) so that microcontroller 581 can adjust driving waveforms accordingly, and in particular for extremes of temperature such as high temperature operation in hot climates (exacerbated when light states significantly absorb sunlight energy) or low temperature operation in cold climates (exacerbated when an outer face is in contact with air in an outside environment). An optional light source 582 (e.g., an LED) and light sensor 588 can monitor the light transmittance level in embodiment 205 and use this in a feedback loop so that microcontroller 581 can incrementally adjust an intermediate light state until a desired light transmittance is achieved. In this case the light source 582 and light sensor 588 can be aligned on opposite faces of an electrophoretic device as shown in FIG. 18 and both surrounded by black potting epoxy to minimize interference from ambient lighting. If controller 550 controls multiple electrophoretic devices in parallel it can be sufficient to monitor the light transmittance of just one device, alternatively the light transmittance of each electrophoretic laminate device can be separately monitored and this information used to ensure that the separately controlled devices in a glass wall or façade match each other in appearance (i.e. in the level of perceivable black tint).

In use the controller 550 can be manually operated (i.e. through user interface 586 or remote control 585) and change light states in response to a user input. This is typically the case for vehicle embodiments or small scale installations where a user has sight of embodiments and is referred to herein as manual controlled. Alternatively, a controller 550 can integrate into automation systems such as climate control, illumination/lighting control, building management, audio/visual control, alarm/security control, remote (i.e. off-site) monitoring and control, or a vehicle controller and this is referred to as automation controlled. Some embodiments allow both modes. For example, a window embodiment can dim in response to user input via a user interface but then once a security system is turned on the security system can cause the window to change to a first light state by communicating with controller 550 over a network.

In some manual controlled embodiments, selection of a required intermediate light state in use is an interactive process with a user based on visual feedback. For example, in strong sunlight a user's perception of a comfortable light transmittance level for a smart glass 205 can be different to the level on an overcast day. At least two directional keys or buttons or functions (595 and 596) are provided in a user interface 586 that increase or decrease the light transmittance level respectively using intermediate light states. Visual feedback means a user decides when a desired level is reached based on observing an embodiment. An embodiment's controller 550 facilitates visual feedback by slowing the response of an electrophoretic cell to a level compatible with user interaction. In some embodiments providing visual feedback involves inserting a period where no electrical field is applied (i.e. zero volts) so that changes to intermediate light states are provided at a frequency compatible with user interaction. For example, in an embodiment capable of eight intermediate light states a controller 550 incrementally increases (or decreases) the light transmittance level by one intermediate light state every half second (comprising a waveform and a zero volts period) until a user provides feedback via a user interface 586 that the desired level is reached. In some embodiments, a pulse amplitude just sufficient to overcome a threshold level is applied to slowly move particles 10 or 11 and provide continuous visual feedback to a user at a level compatible with user interaction. These methods can be summarized as embodiments controlled by a user using a visual feedback method and are equivalent to a user adjusting a mechanical blind or shutter.

In an alternative manual controlled embodiment, the controller 550 provides preset light transmittance levels based on characteristic light transmittance levels for that embodiment type, electrophoretic ink, and optionally, temperature level. A characteristic response takes into account any non-uniformity in the response of charged particles in an electrical field and identifies the number of repeatable intermediate light states for a given set of operating conditions. This method can be summarized as embodiments controlled by a look-up table and has similarities with grey-scale control of electrophoretic display devices. A controller uses a look-up table to determine the required pulse duration (or amplitude) for a given driving waveform to change from a current intermediate light state to a selected intermediate light state.

Automatically controlled smart-glass embodiments also use a look-up table having a characteristic response. In an example of an automatically controlled embodiment, a building management system monitors an interior space's lighting level (expressed in lumens) and adjusts window embodiments (relevant to that space) throughout the day to maintain a near constant lighting level while incident sunlight is sufficient. In this case, the waveforms in FIGS. 16C and 16D allow an embodiment to be adjusted in a seamless manner without momentarily flashing completely dark or clear each time an embodiment's intermediate light state is adjusted in response to a light sensor reading. In a similar example a building management system monitors inside and outside temperature and incident sunlight intensity and adjusts light states accordingly using dependent waveforms. In another example a building management system adjusts embodiments' light states to avoid or minimize glare at sun rise or sunset. In the latter example it will be appreciated that the different faces of a building can be operated differently based on orientation/bearing. Typically a large installation of embodiments in a building will be controlled in zones. A zone can correspond to for example a single room, a floor/level, a wall, a door, or a roof. A zone can comprise a single embodiment or a number of embodiments or a number of embodiment types (e.g., a door, roof and wall embodiment relating to a single room can be operated together for privacy in a first light state or differently in intermediate light states to prevent glare from the sun).

Preferably controller 550 employs power minimizing techniques that maximize the power saving available with a metastable smart glass embodiment 205. Over a defined period if no user interaction is detected (or communications network interaction) an embodiment's software turns off the high voltage power supply (i.e. VD). In a typical power down sequence both channels 593 and 594 are taken to zero volts, then to high impedance, and then the high voltage supply turned off. In a power up sequence both channels are kept high impedance until the high voltage has stabilized (i.e. about one second). Microcontroller 581 preferably enters a sleep mode after turning off the high voltage supply and waits for activity on a user interface or network to wake-up. Alternatively, a programmable timer can provide a wake-up. In this latter case a window embodiment could be programmed to change light states at programmed times (e.g., in the morning and at night time).

In embodiment 218 just one smart glass 205 is connected to controller 550. In some embodiments smart glasses 205 are wired in parallel so that just two channels (i.e. 593 and 594) control several. In other embodiments controller 550 has numerous high-voltage, output stages 1028 allowing independent control of connected smart glasses 205. Furthermore, controller 550 can also control other integrated functions such as controlling icons in a segmented mirror embodiment or block areas on a patterned embodiment.

In active-matrix display embodiments the waveforms shown in FIGS. 16 and 17 can be applied to pixels using either two-state or three-state trajectory drivers. The latter is preferred and provides the levels VD, 0V, and −VD while the common electrode is held at 0V. In a two-state trajectory scheme the common electrode is used to provide a +VD waveform part (i.e. with OV on the common electrode) and a −VD waveform part (i.e. with +VD on the common electrode). Preferably the frame duration has the shortest time permitted by the number of rows (of the active matrix) and the updating speed of the controller. The frame duration corresponds to the minimum pulse width resolution since the voltage on a pixel can only be changed once per frame. It follows that in active matrix embodiments the frame duration can place a limit on the number of intermediate light states that can be addressed. Background information on the active matrix addressing of electrophoretic displays is available in Philips' WO 2005/024767.

In the next section, a method to manufacture electrophoretic devices that have a non-planar polymer structure within their electrophoretic cell is described, and such devices include any of the embodiments described up to now as well as those that follow. These devices rely at least in part on the shape of their non-planar structure to help concentrate charged particles in an electrophoretic ink in a transparent light state. The method comprises deriving protrusions or recesses in the non-planar structure from discrete members such as microspheres, microbeads, or polymer balls, and with the discrete members being made separately and subsequently used in forming the non-planar structure. Recesses are cavities, pits, holes, or void spaces in the surface of a non-planar structure that are open to the electrophoretic ink layer. The earlier FIG. 2D showed an embodiment 202 that uses protrusions 2 in its non-planar structure 1302 to concentrate charged particles 11 in a second light state (i.e. a highly transparent light state). As described later, embodiment 233 uses recesses 110 in its non-planar structure 1333 to receive charged particles in its transparent light state.

Figure 31:
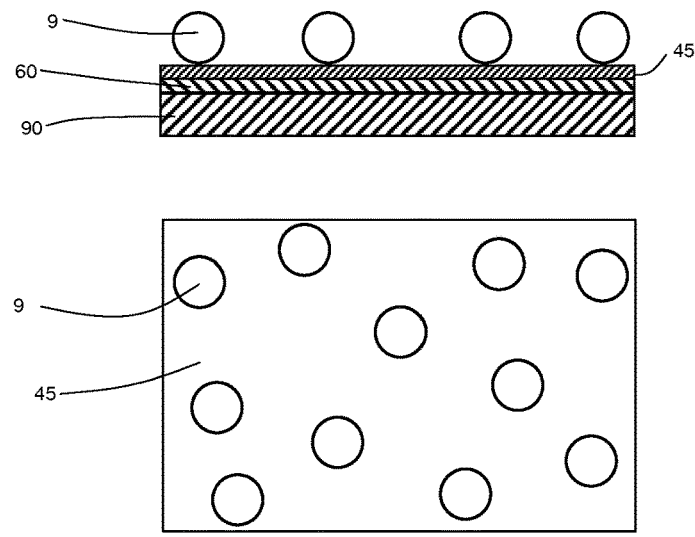
FIG. 31 shows a monolayer of dispersed, wax polymer balls bonded to an optical clear adhesive (OCA) layer 45. It is a partially constructed cell of embodiment 233.

The discrete members are coated onto a substrate and processed to form a monolayer: FIG. 3 shows a monolayer of close packed protrusions, and a monolayer of dispersed, sacrificial discrete members that are used in forming recesses is shown in FIG. 31. A non-planar structure's interface surface with an electrophoretic ink derives from part of the surface of protrusions, and in the case of recesses, from the surface revealed by the removal of sacrificial discrete members. Once the non-planar structure has been formed, the electrophoretic suspension is coated onto it, preferably as part of laminating a top substrate.

The method contrasts with prior art methods that form a structure in place in an electrophoretic device by embossing, extruding, laser micromachining, or photolithographic methods. Such methods are not compatible with low-cost, large-format, roll-to-roll manufacture. Furthermore, even for small-format displays these methods are unlikely to deliver a high density of micron-scale, three dimensional variable features (e.g. hemispherical protrusions) in a structure as required by some embodiments herein.

Discrete members are preferably dry powder coated onto a substrate that has an adhesive (i.e. tacky) surface. Preferably, the adhesive surface is solid and provided by one of: an adhesive sheet, an adhesive layer, or an adhesive or tacky coating. Preferably the adhesive is non-reactive, and more preferably the adhesive is a pressure-sensitive adhesive (PSA), and most preferably the adhesive is an optical clear adhesive (OCA). In some embodiments the adhesive layer is permanent and for example bonds a non-planar structure to an electrode-coated substrate, in other embodiments the adhesive is reworkable (i.e. removable) forming a temporary bond with discrete members coated onto its surface. In a subsequent process step the reworkable adhesive can be removed from the non-planar structure without leaving any residue on the structure.

FIG. 3 shows discrete members (i.e. polymer balls 2) after dry powder coating. A transparent substrate 90 has a transparent conducting electrode layer 60 and laminated to it is a transparent optical clear adhesive (OCA) layer 45. Monodisperse polymer balls 2 (i.e. protrusions) adhere to the OCA 45 on contact, or with a slight force. The face view of FIG. 3 is a micrograph; it was prepared by spraying polymer balls 2 onto OCA layer 45 using an electrostatic gun and then blowing off stacked balls 2 with an air nozzle (30 psi) to reveal a monolayer of balls 2. Stacked polymer balls 2 have no adhesion to each other or to the OCA layer 45 and so can be readily removed by blowing with an air nozzle or air knife. In FIG. 3 the substrate was an ITO coated (70 ohm per cm square) PET substrate (175 micron thick) with an OCA film (25 micron) laminated to it. Suitable OCA films are available from 3M such as OCA 8171 or 8261 (see www.3m.com). The adhesion of discrete members to a substrate's adhesive surface is sufficiently strong to withstand further processing steps.

In a subsequent process step to construct a non-planar structure the polymer-ball, coated substrate shown in FIG. 3 is wet coated with a prepolymer solution 51 (see FIG. 19), then a solvent in the solution is evaporated to form polymer 50 that fills the space (i.e. volume) between the surfaces of polymer balls 2 up to the level indicated by plane 1003 (i.e. a plane parallel to an embodiment's face) in FIG. 2B. In some embodiments the protrusions include a small percentage (generally <5% by mass) of larger microspheres that establish an electrophoretic cell's thickness.

In some embodiments the discrete members are wet coated onto a substrate and as the liquid phase evaporates forms a self-assembled monolayer of closely packed members. In these embodiments the liquid phase does not solubilize or swell the discrete members. Preferably, the liquid phase is water or has added components and is an aqueous phase. The use of water for the liquid phase ensures a surface tension high enough to draw the discrete members into a self-assembled close packing by capillary attraction as the liquid evaporates. Additional information on the self-assembly of micro-spheres in a liquid can be found in Aizenberg et al. Physical Review Letters, volume 84, page 2997, March 2000. Optionally, the aqueous phase can have a polymer latex or water soluble polymer and form the space filling polymer 50 directly upon evaporation of the water.

Suitable materials for discrete members that form protrusions were described earlier and can be sourced from suppliers or manufactured using a suspension polymerization technique for example. Monodisperse microspheres are available from Sekisui Chemical Co. Limited in their Micropearl range (see www.sekisuichemical.com), or from Microbeads AS (see www.micro-beads.com), or from Cospheric LLC (see www.cospheric-microspheres.com). Sacrificial discrete members are preferably a wax polymer with a melting temperature in the range of 50° C. to 150° C. and soluble in organic solvent, and include a paraffin wax, polyethylene wax, or polypropylene wax.

Figure 19:
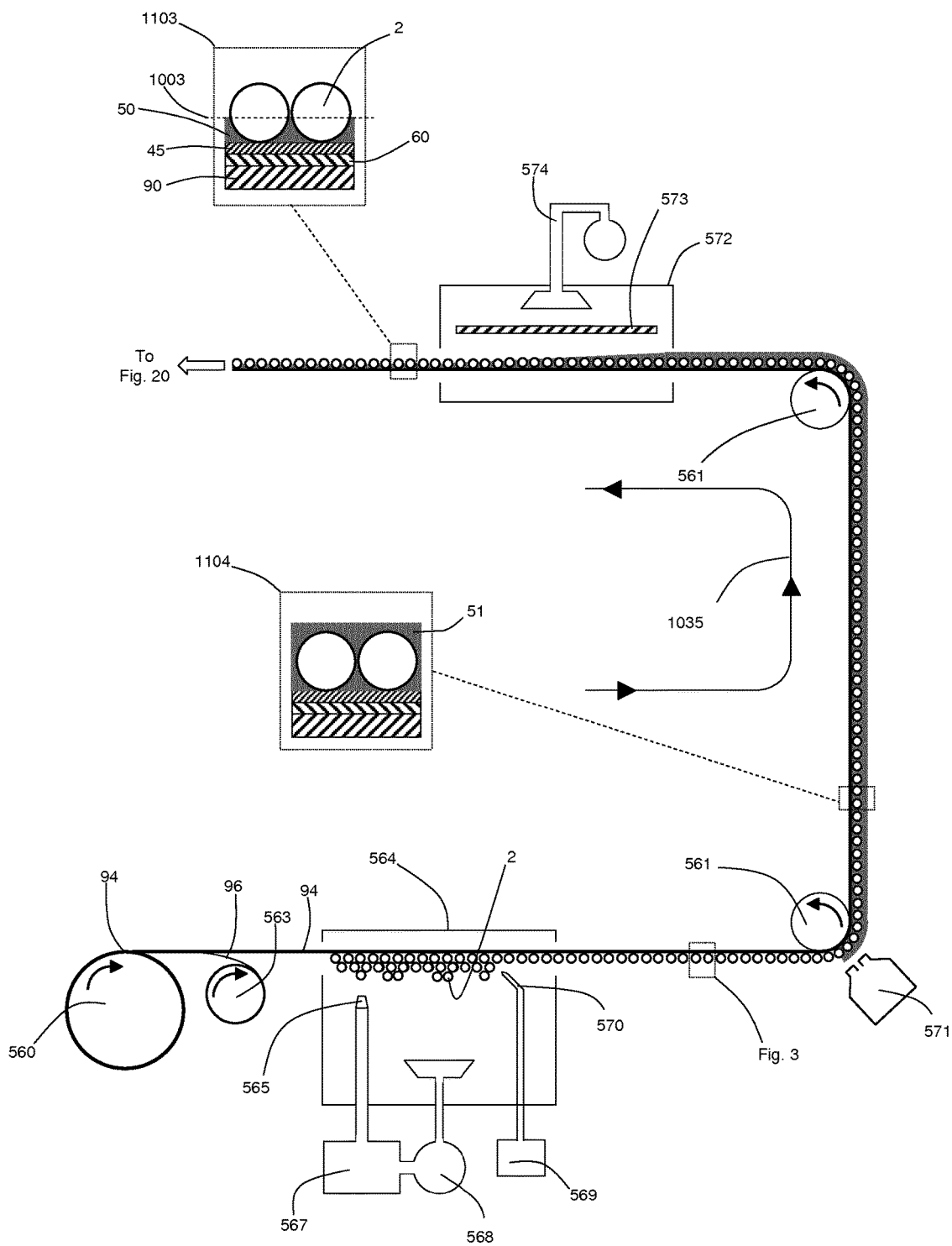
FIG. 19 shows a first part of a roll-to-roll manufacturing process for embodiments.
Figure 20:
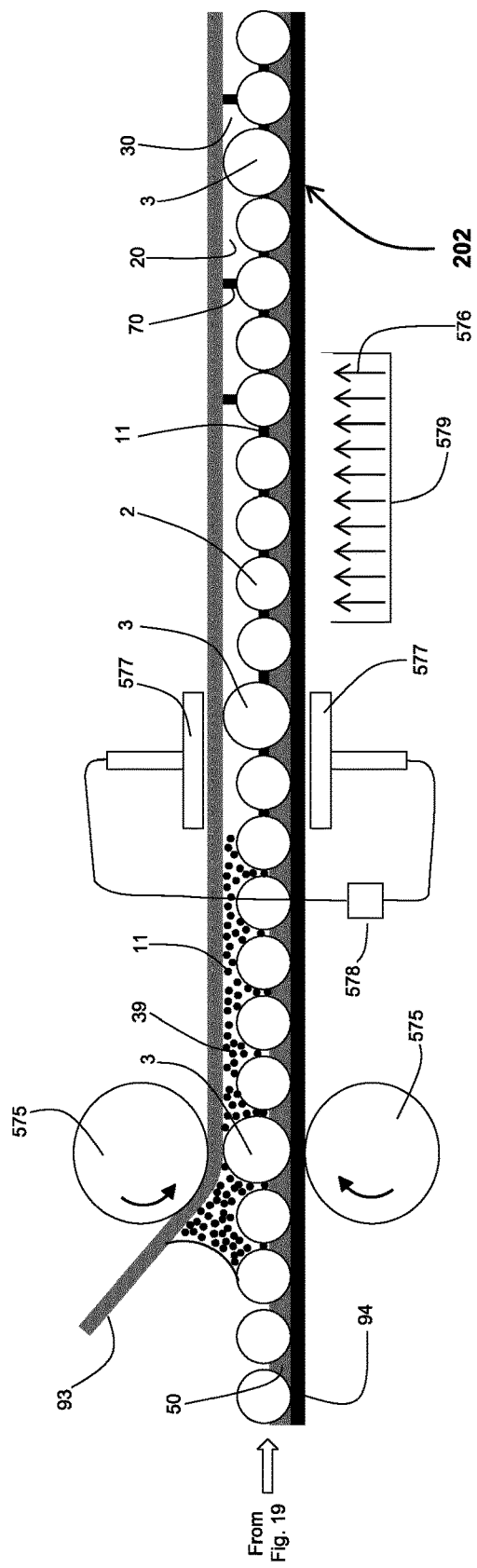
FIG. 20 shows a second part of a roll-to-roll manufacturing process for embodiments.
Figure 21:
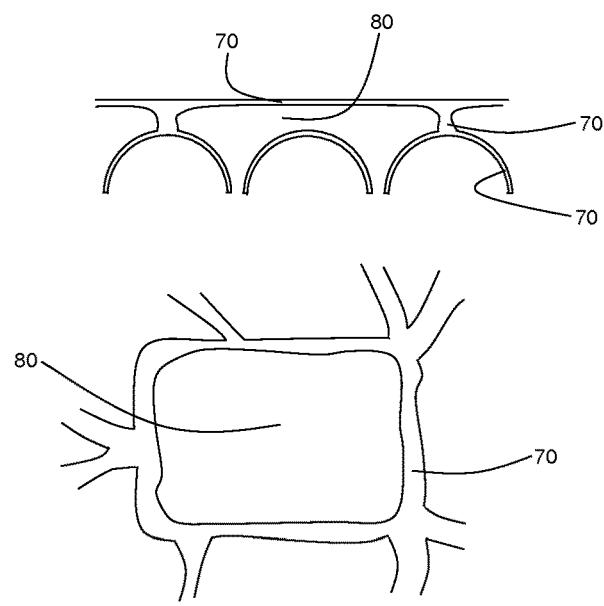
FIG. 21 shows a cavity 80 of an embodiment formed by a PIPS process.
Figure 22:
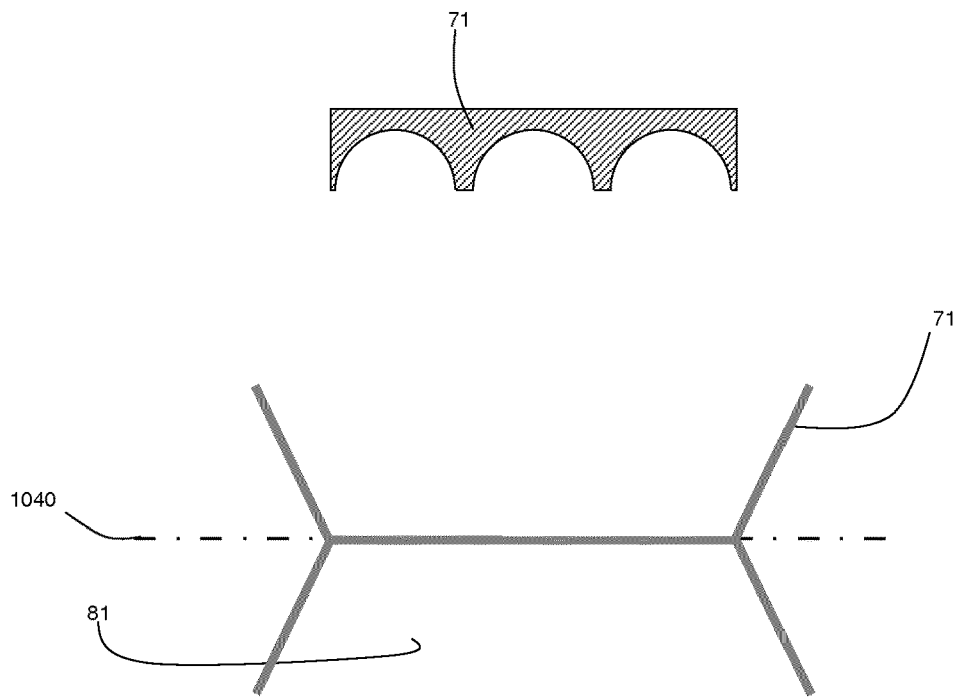
FIG. 22 shows a cavity 81 of an embodiment formed by a photolithographic process.
Figure 23:
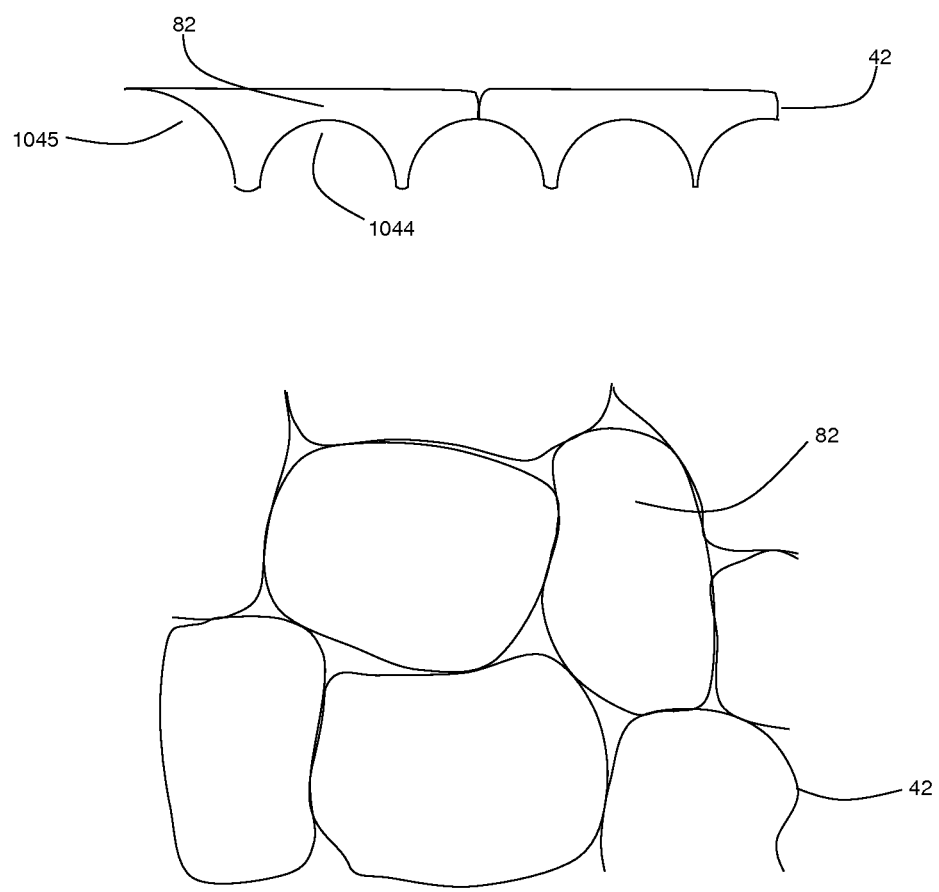
FIG. 23 shows a cavity 82 of an embodiment formed by a microencapsulation process that has a conformal shell wall.

FIGS. 19 and 20 (along with the earlier FIG. 3) show a manufacturing process to construct an electrophoretic device that has a non-planar, polymer structure within its electrophoretic cell, and in particular embodiment 202 shown in FIGS. 2A to 2G. A roll-to-roll manufacturing method is described that is compatible with a wide web (>1M) making it particularly suitable for smart glass applications, large-format, display applications, and low cost manufacturing. FIG. 19 describes the construction of a non-planar structure on a substrate comprising a monolayer of close packed polymer balls and referred to herein as a polymer-ball, coated film. The coated substrate is then laminated to a top substrate along with an electrophoretic ink suspension in FIG. 20 followed by a PIPS process. An example of a cavity 80 formed by a PIPS process is shown in FIG. 21. Alternatively a photolithographic process can be used to form cavities 81 and an example is shown in FIG. 22. Another alternative is to divide an electrophoretic ink into discrete cavities 82 using conformal shells (i.e. microencapsulated electrophoretic ink) and wet coat the conformal shells onto a polymer-ball, coated film. An example of a cavity 82 formed from a conformal shell is shown in FIG. 23. The process steps that apply sacrificial discrete members are similar to those that apply protrusions.

In a first process step in FIG. 19 an unwinder station 560 unwinds a roll of film 94 (i.e. the substrate) and feeds it to spray booth 564 after a release liner 96 is peeled away by winder station 563 to reveal the tacky surface of the OCA 45 on the underside of film 94 in FIG. 19. The direction of the web is indicated by 1035. Film 94 is a laminate of an optical clear adhesive (OCA) 45 onto an ITO coated (electrode 60) PET substrate 90. The OCA layer 45 preferably refractive index matches the polymer balls (e.g., 2 and 3) and polymer 50 in an electrophoretic cell. A film 94 can be purchased from a supplier already laminated or can be laminated in a prior step.

In a second step (shown in FIG. 19) a laminate film 94 enters a spray booth 564 where an electrostatic, dry-powder, spray gun 565 sprays polymer balls (i.e. protrusions or microspheres) onto the tacky surface of a film's OCA layer 45. In FIG. 19 a near monodisperse layer of polymer balls (i.e. 2 and 3 in embodiment 202) bond to the OCA 45 on contact (or with a slight force), and preferably do not appreciably sink into it. In can be that force of impact (from an electrostatic spray gun process) or an applied force causes polymer balls to sink slightly into a pressure-set adhesive. The balls typically randomly close pack or quasi-randomly close pack on an OCA layer 45 of laminate film 94 as shown in the face view of FIG. 3. The dry-powder spraying process causes polymer balls to stack on film 94 as shown.

The spray pattern, electrostatic charge level, and pressure can be varied with electrostatic spray gun 565 to optimize close packing. Alternatively, other dry powder coating options include a triboelectric (friction) gun, a doctor blade, or an Electro-Magnetic Brush (EMB) roll coater. The latter is most preferred as it offers precise control of the thickness of a stacked coating. Similar to processes generally used in copiers and printers, in the EMB process a powder comprising polymer balls (i.e. discrete members) mixes with carrier particles (these are particles with an iron core coated with an insulating layer). The mixing process causes the polymer balls to become tribo-electrostatically charged against the carrier particles. Numerous polymer balls connect to one carrier particle, and this combination is called a development system. These development systems are guided along a rotating drum containing magnets on a fixed static position, forming a magnetic brush on the drum. This brush on the rotating drum is then cut to the right proportion by a doctor blade. When this brush comes along an electrically charged substrate, the polymer balls from the development system move to the substrate by electric force, and in the present invention, bond to the substrate's adhesive surface. The carrier particles remain on the drum by magnetic force, and then float freely back to the mixing system to reconnect to new powder particles. EMB roll coaters are available from EMB Technology (see www.emb-technology.com).

A required level of close packing is achieved by optimizing the dry powder coating process. Local areas on a coated substrate can have differing levels of close packing and can be described as one of (in increasing degree of packing): random close packing, or part random and part lattice close packing (i.e. quasi-random), or lattice close packing including hexagonal, square, rectangular, rhombic, or parallelogrammic, or aspects of these when protrusions have a distribution of sizes.

In a third step (shown in FIG. 19) a coating's stacked polymer balls are readily removed because they do not bond to each other and cannot come into contact with OCA layer 45. An air/gas knife 570 (or nozzle) blows stacked polymer balls away by directing pressurized air/gas (e.g., 30 psi from an air regulator 569) at the polymer-ball, coated film to reveal a monolayer of polymer balls. The released stacked balls are recovered by filtering the air in a booth (564) using for example cyclone recovery station 568. The recovered polymer ball powder is then fed to polymer ball disperser 567 for subsequent spraying by gun 565. The result of this process step is a polymer-ball, coated substrate as shown in FIG. 3's face view micrograph.

In an alternative third step a coating's stacked polymer balls are removed by vacuuming the polymer-ball, coated film. Suction removes stacked balls to reveal a monolayer of polymer balls. An important aspect of the dry powder coating process for use with the current invention is the substantially immediate bonding or adhering of polymer balls on contact (or with a slight impact force) with an OCA layer 45 allowing stacked balls to be easily removed. The OCA layer 45 develops strong adhesion with the polymer balls so that subsequent process steps, such as wet coating polymer solution 51 or laminating the top substrate along with the electrophoretic ink, do not disturb the monolayer of polymer balls because of their adhesion to the OCA layer 45.

In a fourth process step (shown in FIG. 19) a polymer solution 51 (including suitable polymer solubilizing solvent) for space filling polymer 50 is coated as a thick film onto the polymer-ball coated substrate using a slot die coating station 571 or any other suitable wet coating method. In applying the wet coating the air between polymer balls (i.e. 2 and 3 in embodiment 202) is displaced. Exploded view 1104 shows the substrate after the slot die wet-coating step. Rollers 561 are used to support film 94 as it is fed through the process steps.

In a fifth process step (shown in FIG. 19) solvent evaporates from wet coat 51 (i.e. prepolymer solution 51) in an infrared heating station 572 and evaporated solvent is recovered in a solvent recovery system 574. As wet coat 51 thins (evaporation rate is regulated by infrared heating element 573) it reduces to the space between polymer balls and fills the space (i.e. volume) between balls up to the level of plane 1003 (which can be the equator plane). Space filling polymer 50 solidifies from wet coat 51 once sufficient solvent has evaporated (alternatively a thermal or photo curing stage can be used to polymerize once the solvent is substantially evaporated). A polymer latex suspension can be used as an alternative to wet coat 51 (i.e. as an alternative to a solution of prepolymer and solvent) to form space filling polymer 50. Exploded view 1103 shows the result of the fifth step. The non-planar structure comprising polymer balls 2 and 3, space-filling polymer 50, and OCA 45 is ready to be laminated to a top substrate along with an electrophoretic ink as shown in FIG. 20.

FIG. 20 is a continuation of the process steps shown in FIG. 19. In a sixth process step (shown in FIG. 20) a suspension 39 of electrophoretic ink 30 and Polymer Induced Phase Separation (PIPS) prepolymers (i.e. a formulation of monomers and photoinitiator) are coated on to the polymer-ball, coated film from the fifth process step along with a top substrate 93. The top substrate 93 is a PET film 90 with an ITO electrode 60. It can also have an optional silicon oxide insulating layer 95 over the ITO electrode. A pair of NIP rollers 575 laminates the two substrates together. Polymer spacer balls 3 together with OCA 45 establish the cell gap (i.e. the thickness of the electrophoretic cell); the spacer balls 3 prevent the main polymer ball distribution (balls 2 in the case of embodiment 202) from coming into contact with the top electrode 60 (or insulating layer 95).

In a seventh step (shown in FIG. 20) a film is driven to the second light state before its electrophoretic ink layer is divided into discrete or semi-discrete volumes within cavities. In FIG. 20 a pair of external electrodes 577 (i.e. conductive plates) apply an electrical field of about one-to-two volts per micron of separation from a signal generator 578 to the film as it passes between the electrodes. As embodiments are bistable the second light state persists. Alternatively, signal generator 578 can apply an electrical field across the electrodes of the electrophoretic cell by offsetting substrates 93 and 94 to provide opposing connection areas. In this case electrical connections can be made to the film through conducting rollers or brushes in the connection area.

In an eight process step (shown in FIG. 20) the film is UV cured in accordance with a PIPS process as it passes through UV curing station 579. Collimated UV curing light 576 is preferably incident from one side only, and preferably from the bottom substrate as shown in FIG. 20 so that the particles in the second light state (i.e. concentrated in the space between polymer balls) mask the electrophoretic ink volume directly overhead thereby ensuring that polymer does not form directly over concentrated particles. In this PIPS process step electrophoretic suspension 39 phase separates into electrophoretic ink 30 (i.e. particles 11 and suspending fluid 20) and polymer walls 70. Electrophoretic ink 30 is divided into a monolayer of discrete (or semi discrete) cavities 80 that conform to the surface of the polymer-ball, coated film as shown in FIG. 21. The forming of cavities 80 by a PIPS method is controlled by the level of crosslinker, the level of monomer, the level of photoinitiator and the monomer functionality. Examples of PIPS processes include Vlyte's EP2176377, and an article by Tod Schneider et al. in SID 2005 Digest, pages 1568 to 1571. Post the eight process step the electrophoretic film can be wound on to a roll using a winder station (not shown in FIG. 20), and later inspected, cut to size, and operationally tested as required. Alternatively, as a continuous roll an electrical field can be applied (including being applied externally) to operationally test a roll of film including cycling through one or more light states.

In summary, a manufacturing process to construct particular embodiments (e.g., embodiment 202) comprise the following steps: in a first step a film substrate is provided with an adhesive (i.e. tacky) surface, and preferably uses an optical-clear-adhesive layer; in a second step a dry powder of polymer balls (i.e. microspheres) is coated onto the adhesive surface of the film and on contact polymer balls adhere and form into a close packing resulting in a polymer-ball, coated film; in a third step stacked or excess polymer balls are removed by directing a pressurised air or gas stream at the polymer-ball, coated film so that the resultant coated film has a monolayer of polymer balls; in a fourth step a polymer solution or suspension is wet coated onto the polymer-ball, coated film, the solution or suspension comprises a prepolymer part and a solvent part; in a fifth step the solvent is evaporated so that the wet coat reduces to the space between polymer balls up to a plane about an equator plane, and once sufficient solvent has evaporated the prepolymer solidifies, or solidifies on polymerizing (e.g., by thermal initiator or photoinitiator means); in a sixth step a suspension of electrophoretic ink and prepolymers are coated on to the polymer-ball, coated film together with a substrate using a lamination technique to form an electrophoretic film; in a seventh step the electrophoretic film is driven to a second light state using an electrical field prior to curing the prepolymer; in an eight step cavities are formed within the electrophoretic film to divide the electrophoretic ink into discrete or semi-discrete (i.e. interpenetrating) volumes that conform to the polymer-ball, coated film surface, the cavities are formed by polymerizing the prepolymers causing phase separation from the electrophoretic suspension using a PIPS or photolithographic technique.

FIG. 21 shows an exploded view of a cavity 80 formed by a PIPS process step. All of the other elements of an electrophoretic embodiment are omitted to show more clearly the shape of a cavity 80. The walls 70 can have different thicknesses in the vertical (i.e. z-axis) and horizontal planes as shown. Cavities 80 form a monolayer and typically appear polygonal in a face view. In a PIPS process on phase separation the polymer forms on nearby surfaces such as the planar surface of a top electrode and the curved surface of polymer balls. Cavities 80 formed by a PIPS process conform to the surface of the non-planar structure as shown in FIG. 21. The level (i.e. percentage of monomer mass in a PIPS formulation) and functionality of the crosslinker is significant with respect to forming vertical walls 70 and determining the average axis of a cavity 80. The axis of a cavity 80 parallel to an embodiment's face ranges from about 10 to 90 micron providing polymer walls 70 at a fine spacing/pitch within an electrophoretic cell. This is important to ensuring adequate peel adhesion and mechanical strength for a completed film embodiment 202.

FIG. 22 shows an exploded view of a cavity 81 formed by a photolithographic process (see also the face view of FIGS. 11A to 11C). All of the other elements of an electrophoretic embodiment are omitted to show more clearly the shape of a cavity 81. The sectional view is through a wall/rib 71 along plane 1040 indicated in the face view. Walls/ribs 71 form on top of polymer balls as shown in the sectional view. As a photolithographic process cannot cover a top electrode 60 with a polymer layer (i.e. an insulating layer) it is necessary to use a separate insulator layer 95 as described earlier. In cavity 81 an electrophoretic film's polymer balls are in direct contact with an electrophoretic ink. The axis of a cavity 81 parallel to an embodiment's face ranges from a minimum of about 50 micron to typically 150 to 250 micron.

FIG. 23 shows another alternative to a PIPS process. An electrophoretic ink is firstly microencapsulated resulting in conformal shells 42. The shell suspension is classified if necessary to have a desired size range of shell cavities 82. All of the other elements of an electrophoretic embodiment are omitted in FIG. 23 to show more clearly the shape of a cavity 82. Microencapsulation of electrophoretic ink is described in PCT Application No. PCT/EP2013/051016 entitled "A Method For Microencapsulating Electro-Optical Fluid", for example. In this document a hard shell surface is preferred but the method described therein produces conformal shells when the polymer wall is sufficiently thin (<100 nm). This is readily achieved by using significantly less monomer in the encapsulation stage compared to that described in the examples of the document. In addition, using longer network repeat units adds flexibility to a shell's wall (as described in the referenced document).

To construct embodiments having cavities 82 a shell suspension (i.e. conformal shells and solvent) is wet coated as a monolayer in an alternative sixth process step by slot die (or other suitable technique) onto a polymer-ball, coated film from FIG. 19 (i.e. after a fifth process step). In an alternative seventh process step the solvent evaporates and the monolayer of shells conform to the polymer balls' surface as shown by detail 1045 and 1044 in FIG. 23; furthermore, the monolayer of shells abut one another as shown in the sectional view and face-view of FIG. 23. The top surface of shells becomes largely planar. A mechanical force can optionally be applied to a film to enforce a cell gap defined by polymer spacer balls 3. Once the solvent has been evaporated a top substrate can be laminated using a prepolymer solution. This solution fills any gaps between shells, or between shells and a top substrate, and once cured by UV or other means its polymer bonds the top substrate to an electrophoretic embodiment. Similar to cavities 80, the axis of a cavity 82 parallel to an embodiment's face ranges from about 10 to 90 micron providing polymer walls 72 at a fine spacing/pitch within an electrophoretic cell. Similar to cavities 80, cavities 82 (formed by microencapsulating electrophoretic ink prior to wet coating) conform to the surface of the non-planar structure (see FIGS. 21 and 23).

In the manufacturing method described in relation to FIGS. 19 and 20 one substrate has a permanent adhesive layer 45 that is part of the non-planar structure (1302 for embodiment 202) and bonds the non-planar structure to an electrode-coated substrate. The thickness of the adhesive layer 45 (25 micron or 50 micron if an OCA) adds 1 to 2 volts per micron of thickness to an embodiment's operating voltage. Consequently, it is advantageous to remove the adhesive layer so that it is a sacrificial material used for some process steps only. In some embodiments, such as embodiment 204 shown in FIG. 4, the adhesive is reworkable (i.e. removable) forming a temporary bond with discrete members coated onto its surface while a non-planar structure is made, and then the reworkable adhesive is removed and plays no further role in a device.

Figure 24:
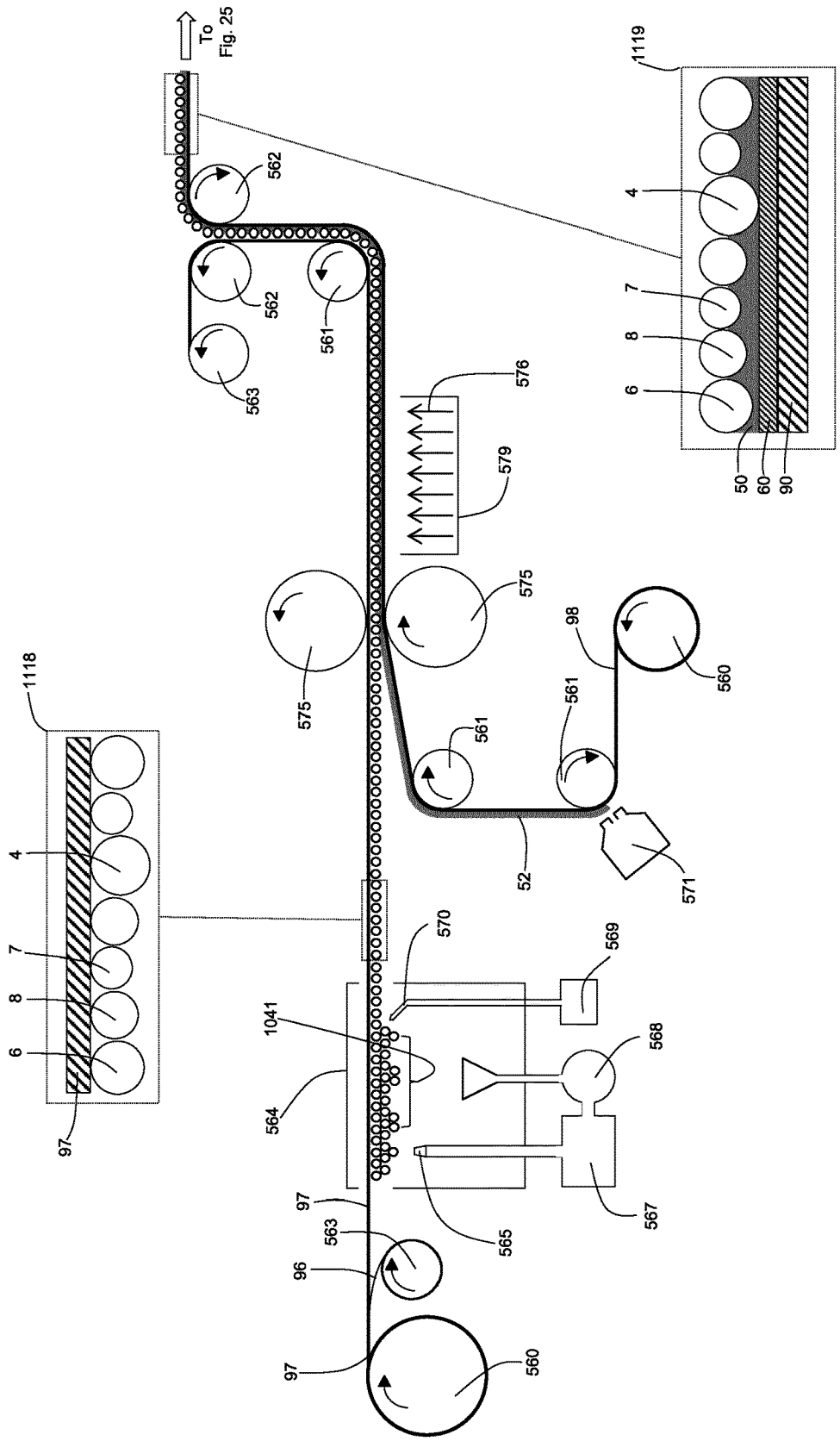
FIG. 24 shows a first part of a roll-to-roll manufacturing process for embodiments made with a sacrificial adhesive layer.
Figure 25:
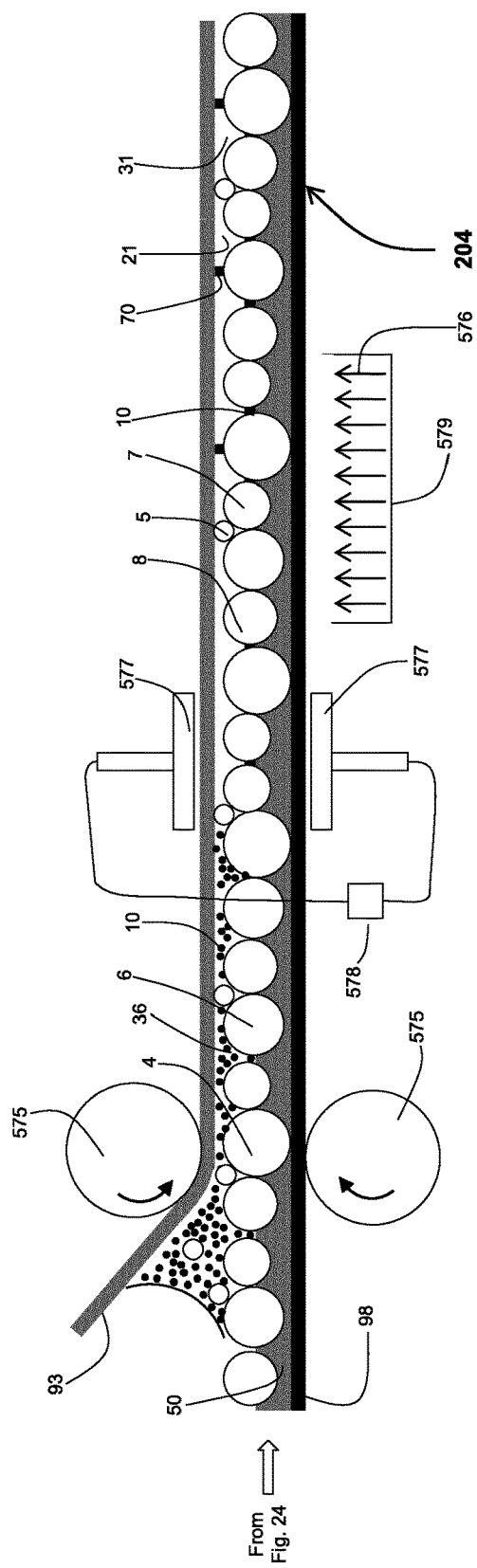
FIG. 25 shows a second part of a roll-to-roll manufacturing process for embodiments made with a sacrificial adhesive layer.

A summary of suitable process steps to construct an embodiment such as 204 (see FIG. 4) is shown in FIGS. 24 and 25 and the steps are broadly similar to those already described for FIGS. 19 and 20. In particular, FIG. 24 shows the use of a reworkable adhesive layer and sheet 97 in earlier process steps and their removal in subsequent steps so that the resulting polymer structure 1304 (see earlier description of FIG. 4) is adhered directly to a transparent electrode on a substrate in the resultant electrophoretic device. Examples of a suitable reworkable adhesive layer include: a reworkable pressure-sensitive adhesive, a reworkable OCA (available from 3M), or a self-wetting adhesive layer, or an adhesive film that has low peel strength (about 6 grams per inch), for example, adhesive film ARclear 92170 from Adhesives Research. Preferably the reworkable adhesive layer incorporates a carrier sheet or film (e.g., a PET) on one side and a release liner on the other side.

In a first step in FIG. 24 a reworkable adhesive on a PET carrier sheet 97 is provided. In a second step a dry powder of polymer balls is coated onto reworkable adhesive film 97 and on contact polymer balls adhere and form into a close packing resulting in a polymer-ball, coated film. In a third step stacked or excess polymer balls (see 1041 in FIG. 24) are removed by directing a pressurised air or gas stream at the polymer-ball, coated film so that the resultant coated film has a monolayer of polymer balls (see exploded view 1118).

In a fourth step a prepolymer solution 52 for polymer 50 is coated as a planar layer onto a substrate 98 comprising an electrode 60 and a PET film 90 using any suitable technique such as slot die 571 or doctor blade. This wet layer is then partially cured or has its solvent evaporated but remains conformal/soft (not shown in FIG. 24). It will be appreciated that the bottom substrate 98 can be a release liner so that this second substrate in the manufacturing process is also sacrificial.

In a fifth process step the coated, reworkable adhesive film 97 is laminated to the coated, bottom substrate 98 using a pair of NIP rollers 575. Lamination causes the planar layer 52 to conform to the polymer balls and fill the space between balls up to (or beyond) the plane indicated by 1003 in FIG. 4.

In a sixth step the polymer 50 is then cured by ultra-violet light (see UV station 579), or solidified by solvent evaporation, and embeds the polymer balls (4, 6, 7, and 8) in polymer 50 and strongly adheres polymer 50 directly to the electrode surface 60 of the bottom substrate 90. In a seventh step the temperature of reworkable adhesive film 97 is raised by a pair of heated rollers 562 and the reworkable adhesive film 97 peeled away from the domes of the polymer balls (as indicated by plane 1042 in FIG. 4). No residue is left on the domes of the polymer balls when a suitable reworkable adhesive is used. The result is a non-planar structure directly bonded to an electrode 60, and its thickness is that of first spacer ball 4, see exploded view 1119 in FIG. 24.

In an eight process step, shown in FIG. 25, a suspension 36 of electrophoretic ink, dispersed second spacer ball 5, and prepolymers are coated on to the polymer-ball, coated film together with a substrate 93 using a lamination technique to form an electrophoretic film. Substrate 93 is a PET film 90 with a silver nanowires electrode 63 in embodiment 204 (see FIG. 4). It will be appreciated that the substrate 93 can be a release liner so that this third substrate encountered in the manufacturing process so far is sacrificial.

In a ninth step the electrophoretic film is driven to a second light state using an electrical field prior to curing the prepolymer. In a tenth step cavities are formed within the electrophoretic film to divide the electrophoretic ink into discrete or semi-discrete (i.e. interpenetrating) volumes that conform to the non-planar structure's surface. The cavities are formed by polymerizing the prepolymers (using UV curing station 579) causing phase separation from the electrophoretic suspension using a PIPS or photolithographic technique.

Figure 26:
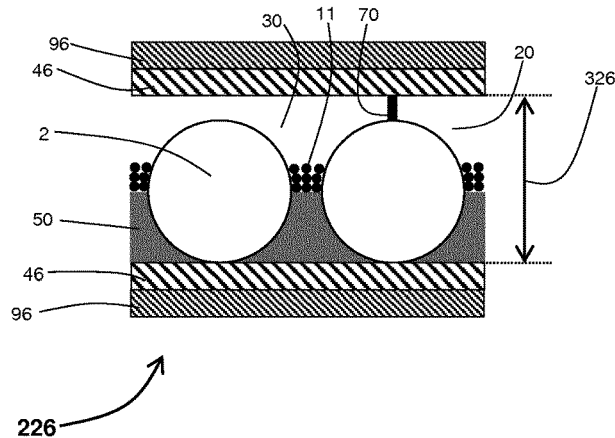
FIG. 26 shows an embodiment 226 of an electrophoretic cell that is sandwiched between adhesive layers, and is for use in a multi-layer structure.

In describing embodiments up to now, the substrates 90 were described as transparent flexible or rigid sheets and generally a substrate was coated with a transparent electrode. However, as described in relation to the process steps for FIGS. 24 and 25, one or both substrates used to manufacture a device can be sacrificial, such as a release liner, so that a substrate present for device manufacture can be removed and not form part of the resulting device. In embodiment 226 shown in FIG. 26, a resulting device's substrates and electrodes are absent, electrophoretic cell 326 is sandwiched between a pair of adhesive layers 46 and release liners 96. In use embodiment 226 can be a layer in a multilayer structure. The electrodes that apply an electrical field to embodiment 226 can be printed or coated onto any surface that is planar with its electrophoretic cell (and preferably as close as possible to the cell). In an embodiment example, an adhesive layer 46 can be an interlayer sheet/resin similar to the earlier described interlayer 510 and permit embodiment 226 to be laminated between glass panes that are coated with a transparent electrode. In this case embodiment 226 is a layer within a multilayer, interlayer structure. In another example, a structure has two or more devices 226 bonded to each other as layers in a multilayer structure and on the other faces the release liners 96 are removed to bond each outer face to a substrate coated with a transparent electrode.

Figure 27:
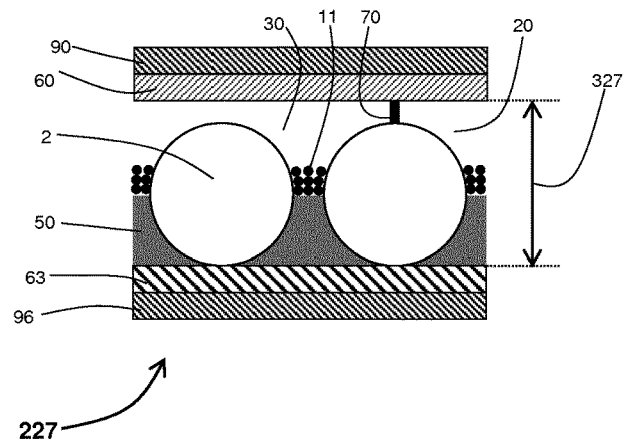
FIG. 27 shows an embodiment 227 that has an electrode printed onto its electrophoretic cell on one side.

In embodiment 227 shown in FIG. 27, electrode 63 is printed or coated directly onto a face of an electrophoretic cell 327. For example, a silver nanowire conductive ink can be printed or coated onto a face of cell 327. The printed electrode 63 is protected with an optional release liner 96. In another related embodiment electrode 63 has an adhesive layer (such as an OCA 45) and a release liner 96. In yet another related embodiment electrode 63 has a hard coat protective layer instead of a release liner 96.

Figure 28:
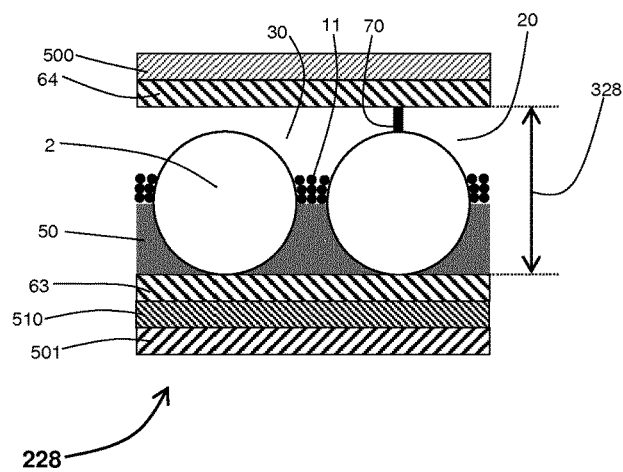
FIG. 28 shows an embodiment 228 that has float glass panes as substrates.

Embodiment 228 shown in FIG. 28 is a glass substrate device or glass laminate that is constructed by coating an electrophoretic ink directly onto an electrode coated glass substrate/pane. Glass pane 500 has an electrode 64 coated or printed onto one face and the electrophoretic cell 328 uses 500 as one of its substrates when constructing cell 328. An example of a suitable electrode-coated, float glass is TEC 70 available from Pilkington (see www.pilkington.com); it has a sheet resistivity of 58 to 72 ohms square (see TEC range).

To construct embodiment 228 a polymer-ball, coated film made with a reworkable adhesive layer (see description of FIG. 24) is laminated with electrophoretic suspension 36 onto the electrode-coated face of glass pane 500. This is then UV cured to form cavities 80 directly with glass pane 500. An electrode 63 is printed or coated onto the planar face of polymer 50 after its release-liner-type substrate is removed. Then an interlayer 510 can be used to bond pane 501 and complete glass laminate 228.

In embodiment 229 shown in FIG. 29 electrophoretic cell 329 has an embossed structure 74 that divides an electrophoretic layer 1229 into pixel-scale cavities, and within each cavity a non-planar structure 1329 made in accordance with the current invention interacts with the electrophoretic ink in forming light states, and in particular to concentrate charged particles in light states. Discrete members comprising polymer balls 2 are closely packed within the embossed cavities. Space filling polymer 50 fills the volume between polymer balls 2 up to about their equator plane and can be bonded directly to embossed structure 74. A polymer seal or adhesive layer 53 seals the cavities and bonds a top substrate comprising a common electrode 60 and a PET film 90. An active-matrix substrate 99 has a rear diffuse reflector 84. Pixel electrode 67 defines an area in a first light state, and pixel electrode 68 defines an area in a second light state. In embodiment 229 an embossing process provides vertical cavity walls at a width similar to the diameter of polymer balls 2 because this is typical of the minimum practical dispersed feature width that an embossing process on a web can manufacture. Embossing on a web cannot create the high-density, micron scale spacing of polymer balls 2.

To construct non-planar structure 1329 the bottom of embossed cavities in embossed structure 74 is coated with an adhesive, then using an electrostatic gun, a powder of polymer balls 2 is sprayed at the embossed structure. Stacked balls are removed as described by directing a pressurized air flow at them to reveal a monolayer of close packed protrusions within the embossed cavities. A prepolymer solution for space filling polymer 50 can be wet coated and then solidified using a film forming technique. Subsequently, electrophoretic ink 31 can be filled and the cavities sealed as known for an embossed type device.

FIG. 30 shows a non-planar structure 1330 that is constructed using two types of discrete members, solid discrete members that form protrusions 2 in the non-planar structure, and sacrificial discrete members whose removal from a polymer structure creates recesses 110. It will be appreciated that recesses 110 in non-planar structure 1330 receive charged particles concentrated by protrusions in the second light state of an electrophoretic embodiment. In FIG. 30 recesses 110 are dispersed over the face area at a significantly lower density that for protrusions 2.

Non-planar structure 1330 is constructed similar to that already described for the non-planar structures in either FIG. 19 or 24 by substituting a required percentage of solid protrusions in a dry powder with sacrificial discrete members. The latter are micron-scale, wax polymer balls as described earlier. The resulting instances of each are proportional to the combined mass of each discrete member type and the mean volume of each member type. Once space filling polymer 50 has solidified about the discrete members, raising the temperature or washing with an organic solvent dissolves the sacrificial discrete members to reveal recesses 110 in the non-planar structure 1330.

Figure 32:
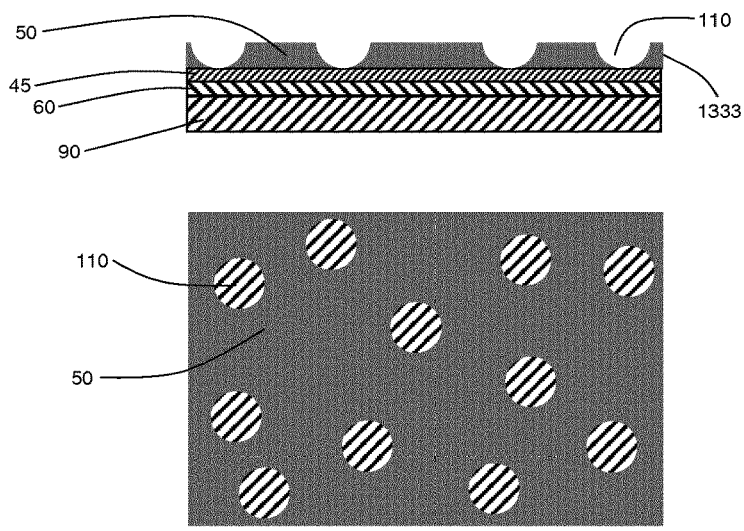
FIG. 32 shows a substrate that has a non-planar structure comprising only recesses for use in embodiment 233.
Figure 33:
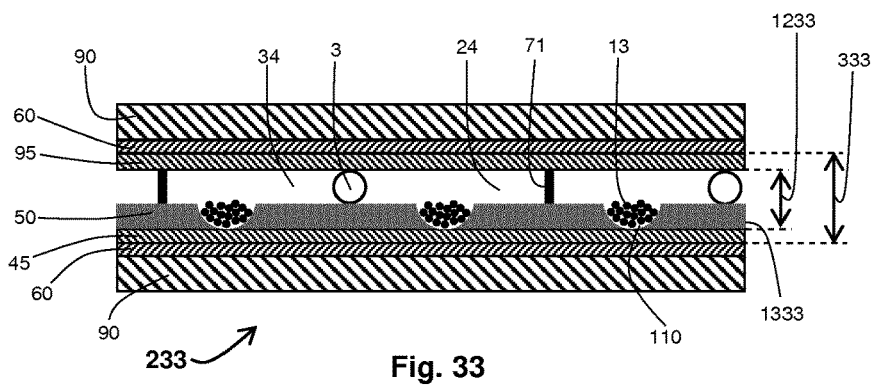
FIG. 33 shows an embodiment 233 of an electrophoretic device whose charged particles are collected in a transparent light state within recesses in a non-planar structure.

Embodiment 233 shown in FIG. 33 is a light attenuator, but its electrophoretic cell 333 can also be used with an active-matrix substrate in display devices. FIGS. 31 and 32 show the outcome of process steps in the construction of its non-planar structure 1333. An optical clear adhesive (OCA) layer 45 receives sacrificial discrete members comprising wax polymer balls 9 in FIG. 31. The wax polymer balls 9 are dispersed at a low density such that the resulting sum of their cross sectional areas in their equator plane is from 10% to 40%, and preferably 12.5% to 33%, and most preferably 15% to 30%, of the projected face area of embodiment 233. Unlike embodiments that have a non-planar structure comprising close packing of discrete members, wax polymer balls 9 are not applied by directly coating a powder onto OCA layer 45, instead an indirect powder application technique is used whereby wax polymer balls 9 are indirectly sprayed by a diffusing or spreading head/tool that causes a coating chamber to fill with dispersed aerated powder that over time coats a substrate as it passes through the coating chamber. After this coating step stacked wax polymer balls are removed by directing pressurized air/gas as described before. The resulting monolayer of wax polymer balls 9 on OCA layer 45 is shown in FIG. 31.

The wax-polymer-ball coated film from FIG. 31 is then wet coated with a polymer latex suspension to form polymer 50 of non-planar polymer structure 1333. Preferably the liquid (i.e. continuous) phase of the latex suspension is a polar solvent such as water. Upon evaporation of the liquid phase the latex film forms creating solid polymer 50 about the wax polymer balls. In a next step the temperature of the substrate is raised so that wax polymer balls 9 melt. Washing the non-planar structure 1333 with an organic solvent ensures that the wax material is dissolved and removed. The resulting non-planar structure 1333 on an ITO coated PET substrate 90 is shown in FIG. 32. It will be appreciated that a reworkable adhesive can equally be used instead of OCA layer 45 to construct non-planar structure 1333 as described earlier in relation to the method shown in FIG. 24.

To complete the construction of electrophoretic cell 333 (see FIG. 33) the non-planar structure 1333 from FIG. 32 is laminated to a top substrate together with an electrophoretic suspension similar to that described earlier in relation to FIG. 25. A suspension of electrophoretic ink 34, dispersed spacer balls 3, and solubilized prepolymers are coated on to the non-planar structure 1333 together with a substrate 93 using a lamination technique to form an electrophoretic film 233. After lamination, the electrophoretic film 233 is driven to a second light state using an electrical field prior to curing the prepolymer. To divide electrophoretic ink 34 into discrete volumes preferably a photolithographic process is used that creates vertical walls/ribs 71 during polymerization as described earlier in relation to FIG. 22.

Embodiment 233 is shown in a transparent light state in FIG. 33. Charged particles 13 in suspending fluid 24 are collected within recesses 110 in the non-planar structure 1333. The electrophoretic ink layer 1233 spans from the surface of an insulating layer 95 to the surface of OCA layer 45. Preferably electrophoretic ink 34 is a hybrid ink that relies on multiple electrokinetic forces to lead to the compaction of charged particles 13 in recesses 110 in a transparent light state. Such a hybrid ink is described for colour displays in US2011/0149376 for example. In US2011/0149376 a dielectric layer is patterned to create recesses in the dielectric. By contrast in the current invention randomly dispersed recesses in a non-planar polymer structure are created by the removal of sacrificial discrete members such as wax polymer balls.

In FIG. 33 recesses 110 are shown as having a hemispherical shape. It will be appreciated that the thickness of polymer 50 can be less than or greater than the radius of wax polymer balls 9 used to construct recesses 110, and the thickness of polymer 50 lies in the range from 0.1 to 1.9 times the radius of wax polymer balls 9, and preferably from 0.5 to 1.75 times. For example, if recesses 110 with a large opening are required then wax polymer balls whose diameter exceeds the thickness of the electrophoretic cell 333 can be used and the polymer 50 filled to a thickness of about 0.25 times the radius of a ball. As the wax polymer balls 9 are removed once polymer 50 has solidified there is no issue with their diameter exceeding the thickness of an electrophoretic cell. In another example if recesses 110 with a small opening are required then wax polymer balls whose diameter just exceeds the thickness of polymer 50 can be used and the polymer 50 filled to a level of about 1.75 times the radius of a ball. As the wax polymer balls 9 melt on heating and dissolve in organic solvent there is no issue with the removal of the dissolved wax through a recesses' opening. It will be further appreciated that wax polymer balls 9 can be deformed, for example into an oblate sphere, by applying a force to a monolayer of balls 9 on an adhesive layer (see FIG. 31), and then polymer 50 solidified about these deformed balls 9 to create correspondingly shaped recesses on removal of the balls 9.

In the next section, a moulding method is described to manufacture electrophoretic devices that have a non-planar, polymer structure within their electrophoretic cell. The moulding method can also be described as a replication method. Applications for such devices include any of the embodiments described up to now as well as those that follow. Similar to the earlier described embodiments, the embodiments that follow rely at least in part on the shape of their non-planar, polymer structure to concentrate charged particles in an electrophoretic ink in a transparent light state.

The manufacturing method uses a non-planar, polymer surface that is defined by polymer microspheres as a template and in a moulding process transfers the contoured shape of the template's surface to a replicated film. For example, the non-planar, polymer structure described in relation to FIG. 19, and shown in exploded view 1103, derives its contoured shape from polymer microspheres. The directly-formed structure can be used as a polymer template and a mould taken of its surface to inversely replicate its shape and form a negative mould master. The negative polymer mould can then be used to make multiple replicas (e.g., anywhere from 1 to about 1,000 for polymer moulds) of the non-planar, polymer structure (the template) without use of discrete polymer microspheres 2, the OCA 45 or the space filling polymer 50 used to form the non-planar, polymer structure shown in FIG. 19 and described earlier.

In some embodiments a hard, negative, mould master is made from a non-planar, polymer template by electroforming nickel onto the template's surface and thereby transferring the polymer template's contoured shape to the surface of a hard mould master. This has the advantage that the mould tool is more durable permitting a significantly greater number (i.e. from about 1,000 to 100,000) of replica films to be made. In some embodiments the surface of a non-planar, polymer template is made more durable by depositing a thin (<250 nm) metallic or ceramic conformal coating (or coatings) onto it. Negative moulds are then made of that hard surface—which conforms to (and is defined by) the polymer surface beneath. Similarly, the negative mould master can have a conformal hard coating on its non-planar, polymer surface. In other embodiments the polymer template has the inverse shape to that required and can also be used as the mould master to replicate films. In yet another embodiment, the polymer template can be a non-planar, polymer surface made from a photosensitive polymer (cured photoresist) exposed by a computer controlled laser beam or electron beam (e-beam) and developed in solution to reveal the non-planar surface shape. These different embodiments are described later.

In the method of manufacturing an electrophoretic device described in this section a non-planar, polymer structure within an electrophoretic cell is moulded. Its surface replicates the contoured (i.e. three-dimensional) surface shape of a template, and the template is defined by a plurality of polymer microstructures. The polymer microstructures can be protrusions, recesses, or a mix of both, and are in a monolayer closely packed or distributed. In some embodiments the template is a directly-formed original created with (or from) polymer materials and its surface comprises polymer microstructures. In alternative embodiments the template surface is transferred from a surface that comprises polymer microstructures. In both cases the contoured surface of the template is defined by polymer microstructures and originates from polymer microspheres.

In the method of manufacturing an electrophoretic device some or the entire template surface is solid polymer, or directly derived from solid polymer (e.g., a thin metallic coating on a polymer surface). In some embodiments protrusions other than polymer (e.g., silicon oxide microspheres) can be embedded in a polymer layer to form the non-planar, polymer surface of the polymer template. It will be appreciated that in the latter embodiments at least part of the non-planar structure is a polymer material.

One or more moulding steps replicate (or inversely replicate) the template's surface and transfer its shape to the surface of a non-planar, polymer structure on one of the device's substrates. The replicated, non-planar, polymer surface is a three dimensional (3D) transfer of the contoured shape of the template. In this regard the shape is transferred when it is a copy or an inverse copy of the polymer microstructures that define the template surface.

In a coating step the moulded, non-planar polymer structure on a device's substrate is coated with an electrophoretic suspension (synonymous with electrophoretic ink). The suspension includes charged particles of at least one type, such as positively or negatively charged black particles, suspended in a suspending fluid. The other substrate is spaced apart from the surface of the replicated microstructures on the non-planar, polymer structure, and the volume between both defines the extent of the electrophoretic suspension, that is, the volume defines an electrophoretic ink layer in the electrophoretic device. Polymer walls, cell gap spacers and/or pillars are used to space apart the moulded microstructures from the top substrate and bond both substrates to each other. A laminating step preferably combines coating the electrophoretic ink and applying the top substrate. The charged particles within the volume interact with the replicated, non-planar, polymer surface to move between a plurality of light states in response to an electrical field. For example, in response to an electrical the charged particles deflect/move over the surface of replicated, closely-packed protrusions projecting into the ink's volume thereby concentrating in the interstices of protrusions (i.e. the depressions there between or the space there between) similar to the earlier description in relation to FIGS. 1A to 1D and 2A to 2G.

The method contrasts with prior art embossing methods that directly form a three-dimensional surface in a hard template (e.g., metal, silicon, fused silica, or calcium fluoride) by material removal. Prior art hard tooling involves expensive and time consuming processes such as mechanical milling (e.g., Single Point Diamond Turning), chemical etching, ion-beam milling, reactive-ion etching, or laser ablation to directly form (or write) the replicating surface. Typically the inverse image (i.e. the negative) is directly formed in a small area called a tile and metal foil copies of this area (called shims) used to cover the tool surface, such as the surface of an embossing roller/drum. This technique leaves undesirable seams between shims and restricts use to small-area devices such as hand-held displays. While such directly formed hard tooling is feasible for embossing thermo-plastic resins to form small-area, periodic and symmetrical polymer structures, and simple polymer structures having planar faces or stepped faces, it is unduly restrictive, expensive and inflexible for the large-area, non-planar, curved and closely-packed aperiodic structures described in some of the embodiments herein. For example, on page 2 of Microsharp's WO 2012/076884 it is stated that "for a moulding drum with a surface area of approximately 0.5 $M^2$, micro-machining a structure of micro-lenses with a pitch of 50 microns across the area of the drum would take over 6 years". As used herein, embossing refers to processes that use a directly-formed hard tool surface to mould a polymer material to the surface shape of the tool.

Figure 34:
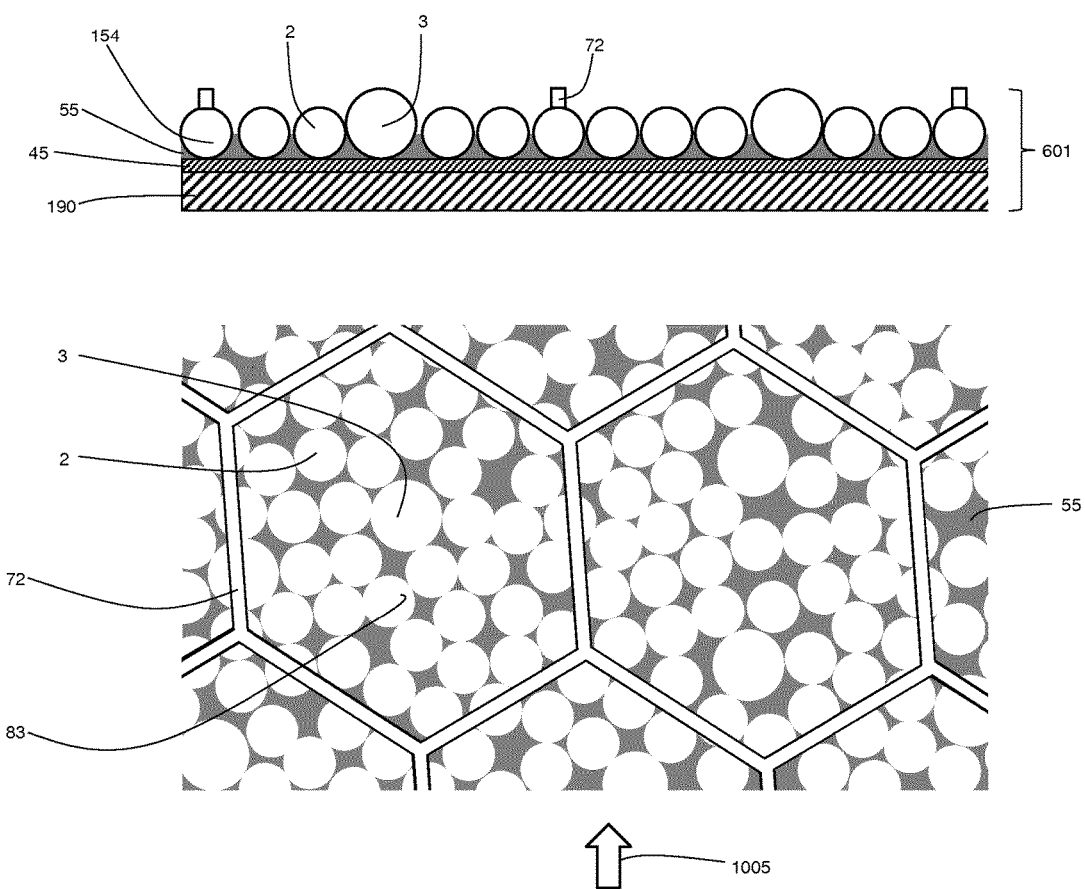
FIG. 34 shows a cross section and face view of a non-planar polymer structure on a substrate that can be used as a polymer template.

FIG. 34 shows a polymer template 601. The surface of its non-planar, polymer structure 154 is the exposed surface of a plurality of discrete polymer microspheres 2 arranged in a random, closely-packed monolayer and partially embedded in a polymer layer 55 adhered to a planar carrier substrate 190 (e.g., a PET film) using a pressure-sensitive adhesive layer 45. Cell gap spacers 3 and polymer walls 72 are used to space apart the top substrate in an assembled electrophoretic device as shown for the replicated film in embodiment 440 in FIGS. 41A and 41B. In embodiments polymers walls provide the device with mechanical structure by spanning between the substrates (as part of the non-planar structure) and strongly adhering to both. Preferably, spacers supplement the structure that the polymer walls provide, or, as an alternative to spacers, pillars (or columns or posts) can be formed analogous to forming the polymer walls. The face-view of FIG. 34 shows that the polymer walls 72 form hexagonal shaped cavities 83 that in a device divide the electrophoretic ink into corresponding discrete volumes. Polymer template 601 can be manufactured as described earlier in relation to FIG. 19 except that there is no requirement to refractive index match the different solid polymer elements that make up its non-planar polymer structure 154.

The walls 72 can be formed in a photolithographic process using a photosensitive polymer known as a photoresist as described earlier in relation to FIG. 22. The photoresist is coated onto the non-planar, polymer structure and allowed to self-level. An example of a suitable photoresist is the SU8 series available from www.microchem.com. The photoresist is cured by exposure through a photomask in contact with the uncured photoresist and in contact with the cell gap spacers 3. The latter determine the wall height (see the cross section view in FIG. 34). The photomask's geometric pattern determines the wall width and location such as shown in the face-view of FIG. 34. The UV-cured photoresist is developed in solution (e.g., methoxy propanol acetate or cyclopentanone) to reveal the walls 72. The release properties of the replicated, non-planar, polymer structure from the mould master or template are improved by having the polymer walls and facets in the microstructures subtend an angle of at least three degrees about the substrate's normal.

Figure 35:
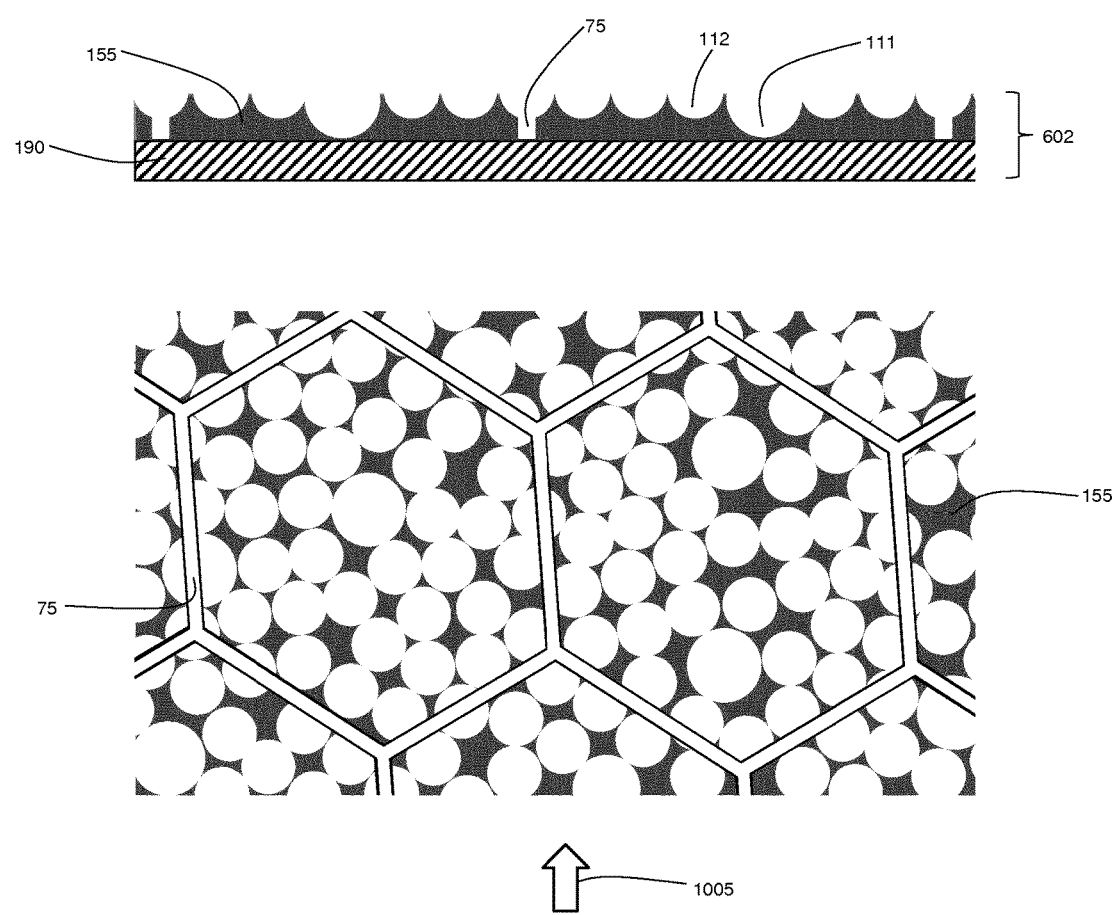
FIG. 35 shows a cross section and face view of a negative mould made of the polymer template shown in FIG. 34.

FIG. 35 shows a negative mould master 602 taken of the surface of polymer template 601 shown in FIG. 34. Non-planar structure 155 is an inverse replica or copy of the template's non-planar, polymer structure 154 and in this regard the surface shape of 154 is transferred to 155. Recesses 112, 111, and 75 are the inverse shapes of protrusions 2, cell gap spacers 3, and polymer walls 72. Mould 602 can be a soft material such as solid polymer or a hard material such as nickel. For example, mould 602 can be solid polymer and preferably is an elastomeric polymer such as the silicone polydimethylsiloxane or a fluorinated elastomer such as an acryloxy perfluoropolyether. Elastomeric polymer has significant flexibility (low modulus) that enhances the release of a mould master from the cured, replicated film. Preferably the polymer has low surface energy and very good chemical resistance to the prepolymer used to form the non-planar structure 156 in the replicated film 603. For example, a negative soft mould 602 can be made with Sylgard-184, a polydimethylsiloxane, available as a two-part prepolymer kit from www.dowcorning.com, or CN4000, a fluorinated acrylate oligomer prepolymer available from www.sartomer.com. The former incorporates a platinum catalyst and is thermally cured, and the latter requires the addition of a suitable photoinitiator such as Darocur 4265 (available from www.basf.com) and is UV cured.

A hard, negative, mould master of the surface of the template's non-planar, polymer structure 154 (see FIG. 34) can be prepared using an electroforming process. In this case nickel electroplates the surface of polymer structure 154 by electrodeposition but does not develop strong adhesion to it. Technically, electroforming is a process of synthesizing a metal object by controlling the electrodeposition of metal passing through an electrolytic solution onto a metal or metalized form, and as the surface of the non-planar, polymer structure 154 is non-conductive, the surface must be coated with a conductive, conformal coating prior to the electroforming step. For example, a thin, conformal coating (<250 nm) of a conductive polymer such as PEDOT (i.e. poly(3,4-ethylenedioxythiophene)) can be applied to the surface of polymer structure 154 in a film forming step. In an alternative coating step, a transparent conductive material such as ITO can be coated onto the surface of polymer structure 154 in a chemical-vapour-deposition (CVD) step.

Alternatively, the polymer template can be prepared with conductive polymer such as PEDOT so that its surface is compatible with electroforming. In another alternative, a moulded/replicated film (of polymer template 601) is prepared with a conductive polymer such as PEDOT, using a first, elastomeric, negative mould 602. The conductive, replicated film is then used to prepare a second, negative mould 602 that is an electroformed, hard, negative, mould master. This latter example demonstrates an advantage of the method in that replicas produced from a polymer template can themselves be used as polymer templates for preparing further negative mould masters and replicated films.

The electroformed mould is provided in sufficient thickness to support itself as a foil, sheet, or plate and can be peeled from the polymer template (referred to as a mandrel in an electroforming process). It will be appreciated that the size of the electroformed mould is limited only by the size of the polymer template and the size of the electroforming bath (i.e. the electrolytic bath) and that providing sufficient face area to cover the surface of a large roller or drum can be achieved with the method. For example, a roller having 1M web width and 318 mm diameter has a mould surface area of 1 $M^2$. It is also feasible to provide a negative mould in the form of a belt using electroforming. An electroformed, negative mould has the ability to replicate the template's non-planar, polymer surface precisely with practically no loss of fidelity, including micro and nano scale features of the microstructures. A thin chromium layer (<250 nm) can be electroplated onto the nickel surface to improve the mould's mechanical and release properties. In embodiments, a soft, elastomeric, negative mould can make in the order of 1,000 replicas whereas a hard, electroformed, negative mould can make in the order of 100,000 replicas.

In a related embodiment the polymer template surface, or the surface of the negative mould master, is made more durable by transferring the shape of the polymer surface to a hard material by depositing a thin (<250 nm) metallic or ceramic conformal coating (or coatings) onto the polymer surface by chemical-vapour-deposition (CVD), physical-vapour-deposition (PVD), or electroplating. In this case the hard coating is strongly adhered to the underlying polymer surface.

Figure 36:
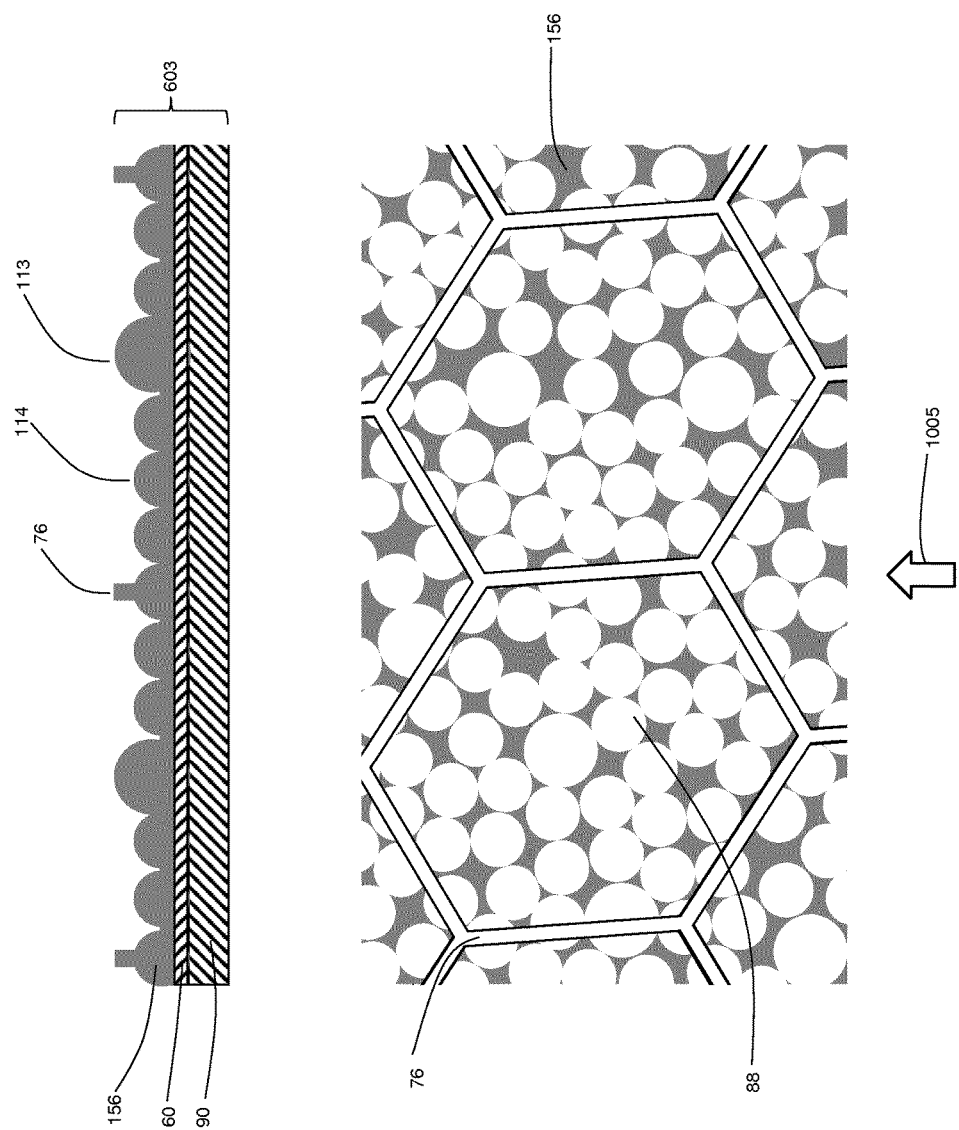
FIG. 36 shows a cross section and face view of a non-planar polymer structure on an ITO-coated PET substrate replicated from the negative mould shown in FIG. 35.

FIG. 36 shows a replicated film 603 whose surface is an inverse copy of the surface of the negative mould 602 shown in FIG. 35. Film 603 comprises moulded, non-planar polymer structure 156 bonded to one of the device's substrates. The PET substrate 90 has an ITO-coated electrode 60. Non-planar polymer structure 156 is an inverse replica or copy of the three-dimensional shape of the surface of non-planar structure 155 (FIG. 35) and a replica or copy of the template's non-planar polymer structure 154 (FIG. 34). In this regard the surface shape of polymer template 601 is transferred to negative master 602 and from there to replica 603. Protrusions 114, cell gap spacers 113, polymer walls 76 and cavities 88 have the same exposed (to air) contoured shape as polymer protrusions 2, cell gap spacers 3, polymer walls 72 and cavities 83 respectively in FIG. 34.

Moulded, non-planar polymer structure 156 can be any optically-transparent, solid polymer that is optically isotropic similar to polymer 50 described in earlier embodiments (e.g., embodiment 202 in FIGS. 2A to 2G). For example, polymer 156 can be a non-polar, amorphous, polymer—preferred—or a polar, amorphous polymer. Polymer 156 must have very good chemical resistance to the electrophoretic ink's suspending fluid. Its prepolymer can be cured by UV and/or visible light, or thermally cured. Examples include acrylates, methacrylates, or functionalized acrylates/methacrylates. In some embodiments the non-planar, polymer structure uses a high level of crosslinking to enhance chemical resistance to swelling by the suspending fluid.

Figure 37:
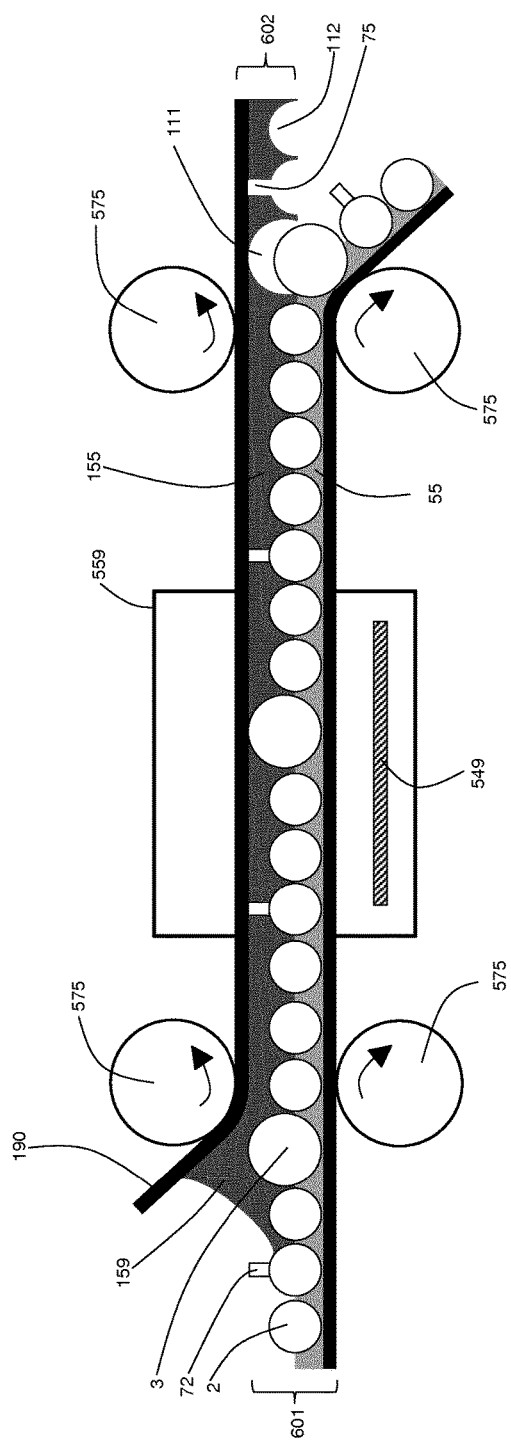
FIG. 37 shows the roll-to-roll manufacture of a negative mould in the form of a continuous film.

FIGS. 37 to 40 show roll-to-roll manufacturing steps for an embodiment 440 having a replicated, non-planar, polymer structure 157. The steps are similar to those already described in relation to FIGS. 34 to 36 and the same number for materials and elements are used. In FIG. 37 polymer template 601 (described in relation to FIG. 34) passes between a pair of NIP rollers 575 that laminate substrate 190 along with prepolymer solution 159 to template 601 to form negative mould 602. Cell gap spacers 3 and polymer walls 72 act as a mechanical stop for the NIP rollers 575 precisely metering the prepolymer 159. Curing station 559 cures prepolymer 159 from one or both sides and forms solid polymer 155 (described in relation to FIG. 35). Curing element 549 can be an UV/visible light source or an infrared curing element. The former enables rapid curing while film 602 is wound around the NIP roller and cured while still in contact with its surface while the latter is more compatible with thermal curing and is shown in FIG. 37. Negative mould master 602 can be peeled apart from the polymer template 601 by wrapping each film around opposing rollers (a simplified peeling-apart is shown in FIG. 37). If films 601 and 602 are fixed-length, continuous films (e.g., each is 100M long) then each can be wound onto a roll core in a winding station. Preferably, embodiments use fixed-length, continuous films in moulding steps, and the films are at least 2 meters long, more preferably at least 10 meters, and most preferably at least 15 meters.

In some embodiments the fixed-length, continuous film being formed by moulding (e.g., film 602 in FIG. 37) remains in contact with the other film (e.g., film 601 in FIG. 37) for at least more than one minute, and preferably for more than one hour while thermally curing, or for one or more days while room temperature curing. In some embodiments the film pair (i.e. 601 and 602 in FIG. 37) are wound under tension onto a single core and cured as a wound roll (still under tension) in an oven or at room temperature before subsequently peeling apart into separate rolls. These latter two points are equally applicable to the film pair shown in FIG. 38 (i.e. films 602 and 603).

The advantages of using a fixed-length, continuous film for the template and the master include providing a roll-to-roll replication process that uses standard equipment without requiring special tooling of any surfaces, providing a seamless continuous film when the polymer template's surface is seamless, providing a thermally cured (or room temperature cured) replicated, non-planar, polymer structure, and providing a roll-to-roll replication process where each replication of the master's surface produces a fixed-length film. The latter point is particularly advantageous when using a soft master such as one formed from elastomer polymer. For 1,000 replications of the master's surface 1,000 rolls of replicated film are produced, and if each roll is 100M long this means that a soft-tooled master can produce 100 kilometers of replicated film with 1,000 replications of its surface. By comparison, a roller/drum master of diameter 318 mm has its surface replicated 100 times to produce a single 100M roll, and 100,000 times to produce 100 kilometers of replicated film.

Figure 38:
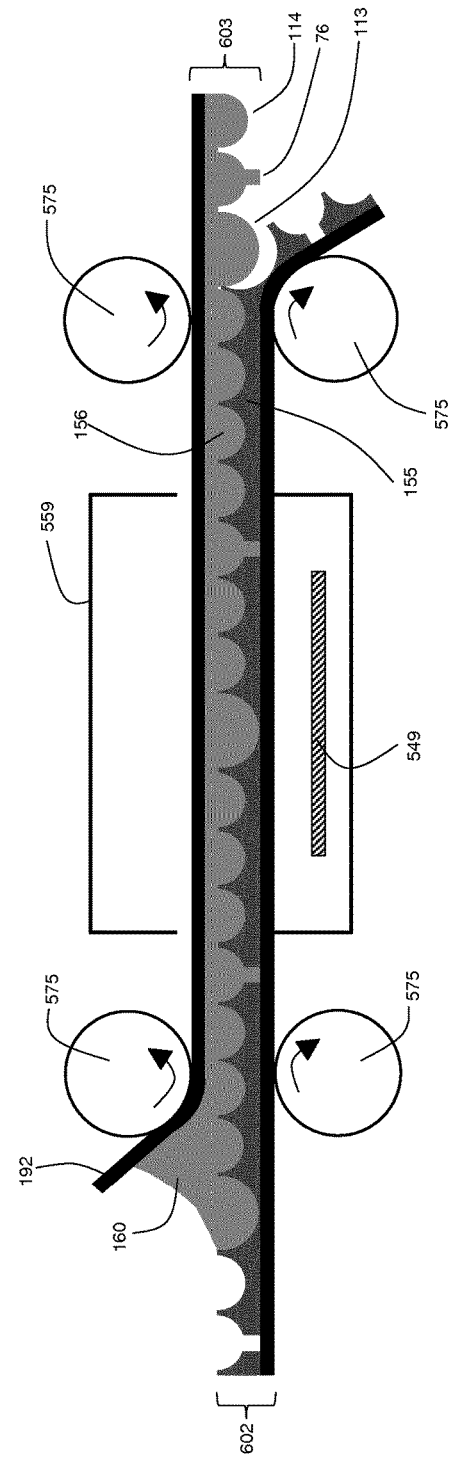
FIG. 38 shows the roll-to-roll manufacture of a non-planar polymer structure on an ITO-coated PET substrate replicated from the negative mould in FIG. 37 and in the form of a continuous film.

In FIG. 38 negative mould 602 (described in relation to FIGS. 35 and 37) passes between a pair of NIP rollers 575 that laminate top substrate 192 along with prepolymer solution 160 to negative mould 602 to form replicated film 603. The preferred film orientation during lamination minimizes the risk of trapping air in the prepolymer coating 160 and is indicated by 1005 in FIGS. 34 to 36. The polymer walls in the template are orientated to ensure that recesses 75 (corresponding to replicated polymer walls 76) make an angle (≥10 degrees) in the plane of the film's substrate to the pinch line of the NIP rollers 575. Substrate 192 comprises PET film 90 and ITO electrode 60 (see FIG. 36). Spacers can be dispersed in prepolymer 160 to space apart mould 602 from substrate 192, or alternatively, substrate 192 is brought into contact with mould 602 by the NIP rollers 575. The latter case has the advantage of minimizing the z-axis dimension (i.e. perpendicular to a face) of the non-planar, polymer structure 157, and as a consequence minimizing the cell gap and operating voltage. Advantageously the ITO electrode of substrate 192 is covered everywhere by a minimum polymer thickness (≥1 micron) to provide an insulating layer and isolate the electrophoretic ink from the electrode. Curing station 559 cures prepolymer 160 to form replicated, non-planar, polymer structure 156 (described in relation to FIG. 36). The latter is peeled apart from the negative mould master 602 and further processed as described in FIG. 39.

Figures 41A, 41B:
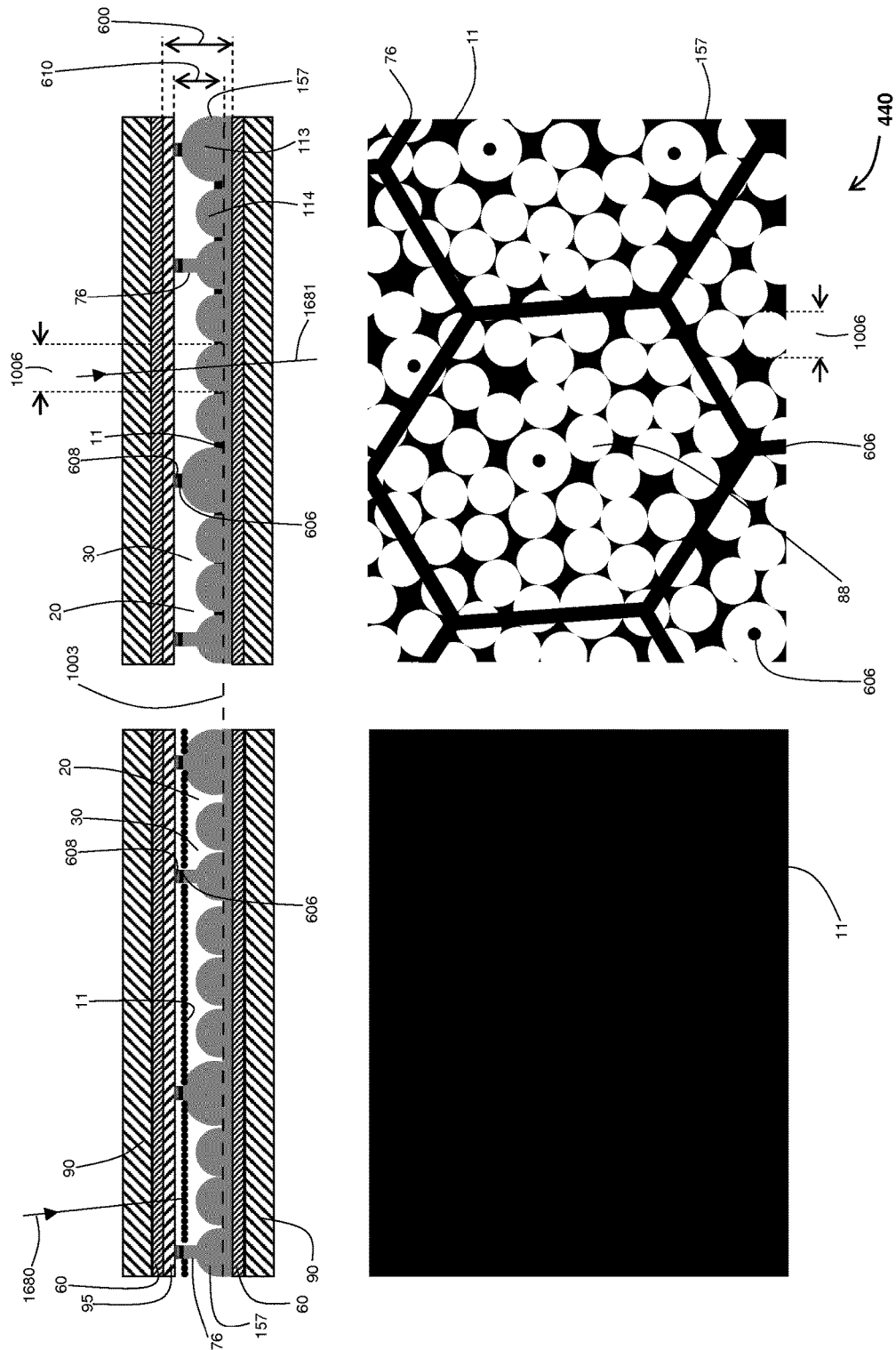
FIG. 41A shows embodiment 440 in a first light state. Its non-planar structure 157 was replicated from a polymer template in a moulding manufacturing method.
FIG. 41B shows embodiment 440 in a second light state. In the face view black mask 606 covers polymer walls 76 and corresponds to a non-switching area that does not transmit light.

In FIG. 39 replicated film 603 (described in relation to FIGS. 36 and 38) has the top surface of its polymer walls 76 and cell gap spacers 113 (and pillars if present) coated with a black masking material 606 in a roll printing step using printing roller 605. The black masking material 606 is preferably a prepolymer or film-forming material loaded with black colorant. Preferably the colorant is a pigment similar to the type used in the black, charged particles, and the polymer is similar (or at least compatible) with the polymer in the non-planar structure 156. Printing roller 605 can use a printing method such as material transference from an elastomer-coated roller. The black masking material 606 can be precisely metered using an anilox roller that transfers coating material to the elastomer-coated roller 605 for printing onto the polymer walls 76. In FIG. 39 curing station 559 has a light source 549 to cure black masking material 606 as back masking elements 606. The face-view of FIG. 41B shows the black mask 606 covering otherwise transparent polymer walls 76 in the transparent light state (and corresponding to charged particles maximally concentrated). The face-view of FIG. 41A is of the strongly light absorbing state and avoids light transmittance through the polymer walls 76 and the domes of spacers 113 due to these non-active areas (i.e. charged particles are prevented from covering) being covered with black mask 606. Preferably in embodiments non-active areas that form part of a face-view are covered with a black mask including contact areas between the non-planar, polymer structure 157 (see FIGS. 40, 41A and 41B) and the top substrate 193.

Similarly, printing roller 607 coats the polymer walls 76 and cell gap spacers 113 (and pillars if present) with an adhesive 608. Optionally, the adhesive 608 can be a black pigment loaded adhesive eliminating the need for a separate black mask printing step. The adhesive is selected to promote adhesion between the top substrate 193 (FIG. 40) and polymer walls 76 (or black mask 606). Its selection is dependent on the functionalities of each surface and preferably it covalently bonds to both having compatible functionalities with each. For example, the surface of substrate 193 can be modified in a reaction with a surface priming agent that provides a second reactive group for reaction with adhesive 608. Similarly, the polymer walls 76 can be provided with unreacted groups for reaction with adhesive 608 and/or unreacted groups on the substrate surface. Preferably adhesive 608 (both its prepolymer and cured polymer) is insoluble in the suspending fluid 20 of electrophoretic ink 30.

In embodiments the requirement to provide sufficient polymer wall contact area with the top substrate to develop strong peel adhesion between both substrates is balanced with the requirement to minimize the face-area corresponding to the polymer walls. The polymer wall contact area forms non-switching black areas in a face-view reducing the maximum light transmittance in the second light state as shown in the face view of FIG. 41B. Preferably the polymer-wall contact-area is less than 25% of the device's face-area, and preferably less than 20%, and more preferably less than 17.5%, and most preferably less than 15%.

In FIG. 40 the replicated film 603 from the printing steps shown in FIG. 39 passes between a pair of NIP rollers 575 that laminate top substrate 193 along with electrophoretic ink 30 to film 603 to form electrophoretic film device 440. Top substrate 193 comprises PET film 90, ITO electrode 60 and optional insulating layer 95 as shown in FIGS. 41A and 41B. Similar to the laminating step in FIG. 37, cell gap spacers 113 and polymer walls 76 act as a mechanical stop for the NIP rollers 575 precisely metering the electrophoretic ink 30.

In an optional step the electrophoretic ink film is driven to the transparent light state (i.e. the charged particles 11 are maximally concentrated in a second light state) using either an external electrical field or the electrodes 60 of device 440. A similar step was described earlier in relation to FIG. 20. The pair of external electrodes 577 (i.e. conductive plates) apply an electrical field of about one-to-two volts per micron of separation from a signal generator 578 to the film as it passes between the electrodes. As embodiments are bistable the charged particles 11 remain concentrated in the interstices of protrusions 114. Curing station 579 cures adhesive 608 with collimated UV light 576 strongly bonding the non-planar, polymer structure 157 to the top substrate 193. Electrophoretic film device 440 is a continuous film and can be wound under tension onto a roll core in a winding station.

Advantageously, the cavities 88 (shown in 41A and 41B) divide the electrophoretic ink 30 into discrete volumes that are each sealed. This allows continuous electrophoretic film 440 to be cut to size in use without leaking electrophoretic ink 30 other than for cavities along the cut edge and ruptured as part of cutting/slitting. In some embodiments film 440 is cut by a $CO_2$ laser that melts the polymer adjacent the cut line and effectively seals cavities that would otherwise be ruptured as a consequence of cutting. A connection ledge for signal connection to each electrode 60 can be cut similarly without compromising the electrophoretic ink seal within the viewing area of electrophoretic device 440.

Embodiment 440 in FIGS. 41A and 41B is made using the roll-to-roll moulding method described in relation to FIGS. 37 to 40. Its non-planar, polymer structure 157 is a replica or copy of the contoured shape of the surface of polymer template 601 shown in FIGS. 34 and 37 but has been enhanced by printing a black mask 606 over the contact areas with the top substrate as shown in the cross sectional views and the face-views of FIGS. 41A and 41B. The top substrate is bonded to the polymer walls 76 of polymer structure 157 using a cured adhesive 608. The z-axis dimension (i.e. height in the cross sectional view) of the electrophoretic ink layer 610 is typically within a few microns of the cell gap 600 and in some embodiments both can be equal. The difference is a thin polymer section in the non-planar structure 157 indicated by the plane 1003 in FIGS. 41A and 41B and the optional insulating layer 95 on the top electrode. This contrasts with the earlier embodiment 202 made using discrete microspheres, its electrophoretic ink layer 1202 is shorter than cell gap 302 by the total of the radius of protrusions 2 and the thickness of OCA layer 45, and consequently is about half or less the cell gap (see FIGS. 2A to 2G). Advantageously embodiment 440 minimizes the operating voltage—using about half or less that of embodiment 202—because its electrophoretic ink layer 610 is about the same height as the cell gap 600.

Preferably the template shape is seamless in the area corresponding to the maximum (viewing) face-area of the device. While a seamless surface can be created on a roller/drum from a polymer template (or as a polymer template when it is the master), it is preferable to use a polymer template whose seamless surface area is greater than or equal to the maximum face-area of the device. The polymer template can be a belt or fixed-length continuous film whose seamless length is longer than the maximum device length, and most preferably the template is a fixed-length continuous film without seams in its surface shape.

FIG. 41A shows embodiment 440 in the strongly light absorbing state (i.e. the first light state) and corresponds to charged particles 11 maximally spread adjacent the top electrode 60 in suspending fluid 20. Light ray 1680 incident on the device is completely absorbed by charged particles 11, similarly light rays incident on the black masked areas 606 are absorbed. The face-view of electrophoretic film 440 appears uniformly black and with sufficient charged particle loading film 440 has near negligible light transmission (≤3% and preferably ≤1%). Film 440 provides privacy in the first light state by strongly attenuating light and not transmitting specular light.

FIG. 41B shows embodiment 440 in the transparent light state (i.e. the second light state) and corresponds to charged particles 11 maximally concentrated in the interstices of protrusions 114 in suspending fluid 20. Light ray 1681 is incident within an aperture area 1006 defined by a protrusion 114 and is transmitted as specular light to provide visual access through film 440. As shown in the face-view of FIG. 41B, in the second light state, each protrusion 114 provides a discrete aperture area 1006 that is substantially free of charged particles 11 and transparent to specular light, and the concentrated particles 11 surrounding the aperture areas 11 define a contiguous strongly light attenuating area corresponding to the interstices of protrusions 114.

In embodiment 440 the replicated, non-planar polymer 157 and suspending fluid 20 are selected so that the fluid 20 is insoluble in (does not swell) the polymer 157. As described for earlier embodiments (e.g., 202 or 204), to minimize haze in the electrophoretic device 404 its non-planar, polymer structure 157 is optically isotropic and refractive index matched to the suspending fluid 20 of the electrophoretic ink 30, preferably within 0.01 of each other, more preferably within 0.005, and most preferably within 0.002. Advantageously in the moulding method the replicated, non-planar polymer structure has a single refractive index for its solid polymer structure making it easier to reach a refractive index match with the suspending fluid 20 than in the earlier embodiment 202 where the non-planar polymer structure 1302 comprises two or more solid polymers (i.e. polymer microspheres 2, space-filling polymer 50, and polymer walls 70). Furthermore, in the moulding method the replicated, solid polymer selection is not constrained by the need to provide discrete polymer microspheres by a suspension polymerization process or to provide polymer walls by a photolithographic process. As described earlier, each part of the non-planar, polymer structure 154 in the polymer template 601 can be independently selected (different polymer chemistries, cure chemistries, or refractive indices) and then their exposed, three-dimensional, surface shape replicated with a single polymer material that is optimized for its compatibility with the suspending fluid in an electrophoretic device 440.

Figure 42:
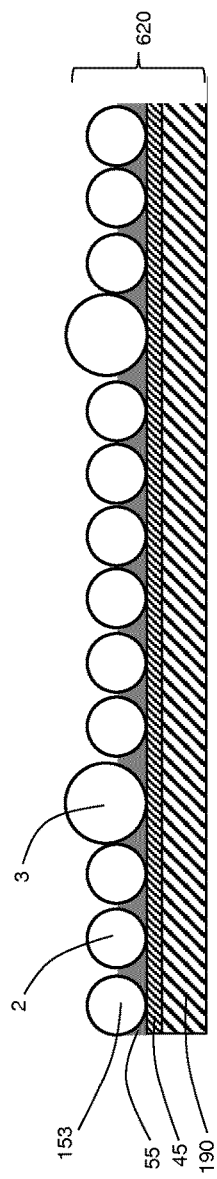
FIG. 42 shows a cross section of a polymer template. Its non-planar polymer structure comprises a monolayer of closely packed polymer microspheres and the structure does not have polymer walls.
Figure 43:
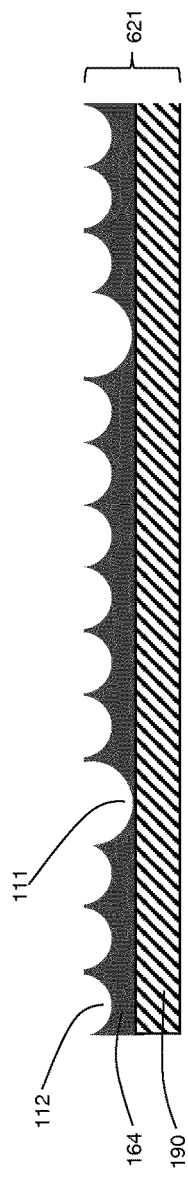
FIG. 43 shows a cross section of a negative mould made of the polymer template shown in FIG. 42. The second cross section shows recesses corresponding to polymer walls that are laser ablated in the negative mould.
Figure 44:
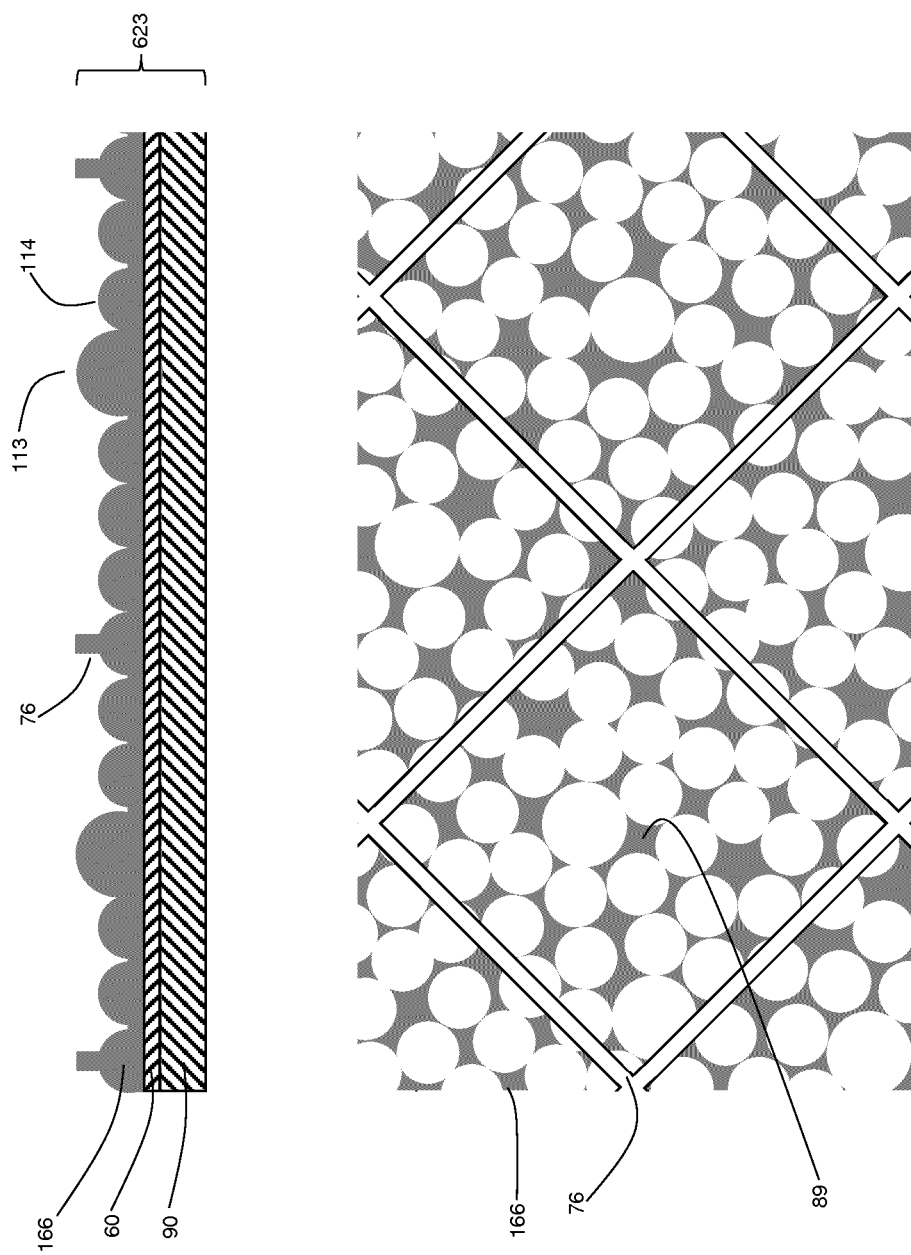
FIG. 44 shows a cross section and face view of a non-planar polymer structure on an ITO-coated PET substrate replicated from the negative mould shown in FIG. 43.

FIG. 42 shows a polymer template 620 similar to the earlier described polymer template 601 shown in FIG. 34 except non-planar, polymer structure 153 does not have polymer walls. Polymer template 620 can be prepared as described earlier in relation to FIG. 19. As an alternative to forming polymer walls on the polymer template, FIGS. 42 to 44 show that recesses corresponding to polymer walls are laser ablated in the negative mould 622 and consequently replicated film 623 (FIG. 44) has polymer walls 76 even though the polymer template 620 that transfers the surface shape of the microstructures does not. It will be appreciated that negative mould 622 is a replicated, non-planar polymer structure that has additional features added as recesses (i.e. walls and/or pillars) before it transfers the shape of its polymer surface to the replicated film 623 in FIG. 44.

FIG. 43 shows negative mould 621 and it is an inverse copy of polymer template 620. Its non-planar, polymer structure 164 does not have recesses corresponding to polymer walls as polymer template 620 did not have polymer walls. Negative mould 621 is further processed to provide recesses 77 corresponding to polymer walls and is shown as negative mould 622 after adding recesses 77. The recesses 77 are formed in the negative mould using laser ablation. Preferably the solid polymer used in non-planar, polymer structures 164 (it becomes 165 after laser ablating the recesses 77 corresponding to the walls) provides adequate absorption at the laser ablating wavelength while the substrate 190 has negligible absorption. For example, if the negative mould's polymer has significant aromatic content then this will provide absorption for a laser wavelength in the UV spectrum. Elastomeric copolymer (dimethylsiloxane-co-diphenylsiloxane) is suitable for laser ablating in the UV spectrum. Alternatively, additives such as colorant can be used in the negative mould's polymer to provide absorption at a desired laser wavelength and avoid absorption in the substrate 190.

FIG. 44 shows replicated film 623 including polymer walls 76 and cavities 89 for receiving electrophoretic ink 30. Replicated, non-planar, polymer structure 166 is a three-dimensional inverse copy of the surface shape of negative mould 622, and a copy of the shape of polymer template 620 in regard to the surface shape of the microstructures that interact with the charged particles in an electrical field to concentrate particles in the interstices of protrusions in a second light state. The exposed surface of protrusions 114 and cell gap spacers 113 in non-planar, polymer structure 166 is transferred from the exposed surface of the corresponding polymer protrusions 2 and cell gap spacers 3 in non-planar, polymer structure 153.

In some embodiments the polymer template can be prepared as described earlier in relation to FIGS. 4 and 24. This provides polymer protrusions that have different diameters and that align to a tangential plane in the electrophoretic ink layer (see 1042 and 1204 respectively in FIG. 4). Polymer walls and pillars can be provided on the polymer template using the photolithographic process described earlier in relation to FIG. 34, or recesses corresponding to polymer walls and pillars can be laser ablated in the negative mould of the polymer template as described in relation to FIG. 43.

In some embodiments the polymer template can have a mix of closely-packed, polymer protrusions and recesses as described earlier in relation to FIG. 30. The negative mould master of the polymer template is an inverse copy of the surface shape with protrusions in the template becoming recesses and recesses becoming protrusions. Advantageously the protrusions in the negative mould act as a mechanical stop (or spacer) for NIP rollers 575 in the replicating film step described earlier in relation to FIG. 38.

In some embodiments the polymer template's microstructures are recesses and these are distributed in the surface of the non-planar polymer structure as described earlier in relation to FIGS. 31 to 33 (see non-planar polymer structure 1333). Polymer walls and pillars can be provided on the polymer template (see FIG. 32) using the photolithographic process described earlier in relation to FIG. 34, or recesses corresponding to polymer walls and pillars can be laser ablated in the negative mould of the polymer template as described in relation to FIG. 43. In the latter case the prepolymer used for the negative mould has a low level (1 to 3% by mass) of spacers to provide a planar polymer layer in the negative mould (forming a base for the moulded protrusions) in which the recesses for the polymer walls are provided.

In some embodiments the polymer template is the mould master and is provided as the inverse shape transferred to the replicated film. In these embodiments the preparation of a negative mould is eliminated. The polymer microstructures on the template are the inverse of those in the replicated film so that a polymer template having closely-packed recesses provides a replicated film with closely-packed protrusions and vice versa. For example, sacrificial wax microspheres are used to prepare a polymer template with closely-packed recesses similar to the steps described in relation to FIGS. 31 and 32 earlier except using a closely-packed monolayer of wax balls 9 in FIG. 31 instead of the distributed monolayer shown. The sacrificial wax microspheres are embedded in a polymer layer and then removed/dissolved so that the surface exposed in the polymer layer by their removal forms recesses. Uniquely in these embodiments, recesses corresponding to polymer walls and pillars can be laser ablated in the polymer template (as opposed to the negative mould in other embodiments). In this regard a planar polymer layer replaces (or is provided in addition) to the planar adhesive layer 45 to form a base beneath the polymer layer 50 (in FIG. 32) having the recesses. The additional polymer layer is used to provide the recesses for the polymer walls and pillars. After the laser ablating step the non-planar, polymer structure of the polymer template having closely-packed recesses appears similar to structure 165 in negative mould 622 shown in FIG. 43.

In embodiments that use a polymer template as the mould master the moulding steps comprise: forming the replicated, non-planar, polymer structure by coating the template surface with a prepolymer and laminating the first substrate (optionally the coating is done as part of laminating), curing the coating to inversely replicate the shape of the template surface in a polymer layer secured to the first substrate, and peeling apart the template and the replicated, non-planar, polymer structure on the first substrate.

In some embodiments the template's surface is directly formed by optically writing the non-planar, polymer structure into a photosensitive polymer known as a photoresist and developing the resist. Any suitable photoresist can be used including the earlier described SU8 series available from www.microchem.com. The contoured shape of the non-planar, structure is defined by polymer microstructures that can be protrusions or recesses as already described. Directly writing the structure exposes the photosensitive polymer and the exposed structure is developed in solution in a separate step. Preferably a computer controlled system uses a laser beam or electron beam (e-beam) to expose the photosensitive polymer and form the contoured shape of the non-planar, polymer surface with microstructures that have smooth slopes and curvature.

Preferably the software of the computer controlled system controls each microstructure allowing each to be independently designed and written. Preferably software controls the area per square centimeter (or square meter) corresponding to the interstices and this area is selectable. The area corresponds to the area between protrusions that concentrates charged particles in the second light state and is shown in the face view of FIG. 41B for example. Preferably software controls the dimensions and layout of the polymer walls 76 and these are selectable as required to optimize a device for a particular application. Preferably, the computer controlled system provides the means to achieve an arbitrarily-shaped, non-planar, polymer template that is an analog, continuously-varying, surface-relief, polymer structure.

The direct writing of contoured microstructures in a photosensitive polymer includes the technologies described as direct-write lithography, single-point laserwriting, laser interferometry, and electron-beam lithography. Single-point laserwriting is described, for example, in U.S. Pat. No. 6,410,213, and utilizes a focused laser beam to spatially expose photosensitive resist that has been coated on a substrate. The laser beam is modulated as it scans to expose the substrate and in a subsequent step developing reveals a continuous, analog surface (i.e. smooth curvature). By varying the exposure dose spatially based upon predetermined contrast curves of the photosensitive material, arbitrary surface profiles and contours, including spherical, aspherical, toroidal, hyperbolic, parabolic, and ellipsoidal, can be achieved. It is the exposure of the focused beam and the continuous exposure of overlapping energy as the beam is scanned that creates microstructures with a smooth, continuous, analog surface.

Another optical writing method for a photosensitive polymer includes grayscale masks and is described in U.S. Pat. No. 5,285,517. The method involves encoding the desired surface shape with a mask that presents variable transmission/attenuation as a function of position. When the photosensitive polymer (i.e. resist) is exposed through this mask it creates a continuously varying surface shape whose depth is directly related to the local attenuation of the mask. After development, locations of high attenuation lead to shallow structures and vice versa.

The next section describes a solution that minimizes or avoids the perception of a diffraction pattern about a bright light source viewed through an electrophoretic device that uses a non-planar, polymer structure in forming an optically-transparent light state. In a diffraction pattern light and dark bands surround a bright light source greatly magnifying its apparent size. It becomes perceivable when light levels either side of a device are significantly different such as when viewing a bright street light or the headlamps of a car at night time.

Diffraction as used herein refers to various phenomena arising from the wave nature of light and occurs in embodiments at the edge of light transmitting areas where light waves become obstructed (or absorbed) by black charged particles. The diffraction phenomenon can be described as the apparent bending of light waves around an obstruction (i.e. concentrated black charged particles) and the spreading out of light waves past small openings (i.e. apertures free of charged particles). Similar to the earlier described devices, the embodiments that follow rely at least in part on the shape of their non-planar, polymer structure to concentrate black charged particles in an electrophoretic ink in a transparent light state thereby forming (or exposing) light obstructions (i.e. strongly absorbing areas) and light apertures (i.e. transmitting areas) whose circumferences diffract light.

While diffraction occurs whenever light waves encounter abrupt changes such as the edge of an aperture or obstruction, or a change in refractive index, its effects are generally most pronounced for waves whose wavelength is roughly similar to the dimensions of the cause of diffraction. When viewing an object through a device, the closer the dimension of an area of concentrated black charged particles is to the wavelength of visible light the greater the diffraction, or the closer the diameter of an aperture is to the wavelength the greater the diffraction. In devices that provide periodically spaced apertures or obstructions (e.g., the devices described as having hexagonal-close-packing of protrusions in previous sections) a complex diffraction pattern of varying intensity (i.e. light and dark bands) results about brightly lit objects viewed through the device. The complex pattern is due to the superposition, or interference, of different parts of a light wave that travels to a viewer by different paths and is analogous to diffraction patterns formed by diffraction gratings.

Many of the applications contemplated herein, such as variable light transmittance films for use in windows, are viewed from a distance of one meter or more and the diffraction pattern (where present) is generally known as Fraunhofer diffraction (i.e. far field conditions). If the object and viewing distances are less than one meter then the pattern (where present) can fulfil the conditions for Fresnel diffraction (i.e. near-field diffraction), see the relevant entries in www.wikipedia.org for example.

In embodiments an electrophoretic cell has a first substrate and a second substrate spaced apart from the first substrate. Preferably, each of the substrates comprises respective first and second electrodes defining an electrophoretic cell. Alternatively, each of the substrates comprises a layer which is arranged to be affixed in cofacing relationship with a respective electrode of an electrophoretic cell as described earlier in relation to embodiments 226 and 227 (see FIGS. 26 and 27).

Between the substrates of the electrophoretic cell (and substantially covering a face of a substrate) there is an electrophoretic ink layer adjacent the first substrate, and a non-planar, polymer structure secured to the second substrate. The electrophoretic ink comprises black charged particles in a suspending fluid and is in contact with the surface of the non-planar, polymer structure forming an interface between fluid and solid polymer within the cell. The non-planar, polymer structure's surface comprises a plurality of aperiodically arranged microstructures that can be protrusions and/or recesses. The aperiodic microstructures are in a monolayer and their aperiodic arrangement means that they occur irregularly in a local area and do not conform to a grid when viewing a face of the device.

In the second light state the black charged particles interact with the non-planar, polymer structure in response to an electrical field applied to the electrodes to concentrate adjacent the interface forming (or exposing) features that diffract light. These features are a plurality of apertures (i.e. optical openings) through which light travels or obstructions (i.e. optical stops) around which light travels, and light diffracts at the circumference of both. In the second light state the features (i.e. apertures and/or obstructions) are defined by the microstructures and consequently are aperiodic when viewing a face of the embodiment. The aperiodic arrangement of features formed by (or resulting from) the aperiodic arrangement of microstructures, diffracts light randomly minimizing the perception of a Fraunhofer diffraction pattern (or a complex pattern of varying intensity due to the superposition or interference of different parts of light waves) about a bright light source viewed through embodiments. In embodiments the centre-to-centre distances of features in a local area are random corresponding to the irregular arrangement of the microstructures. The earlier described embodiment 202 has aperiodically arranged protrusions 2 that form aperiodic apertures 1006 in the second light state as shown in the face view of FIG. 2B.

Microstructures that are protrusions (e.g., the hemispheres shown in FIGS. 2A to 2G and 41A and 41B) project into the electrophoretic ink and in the second light state charged particles are concentrated in the interstices of protrusions forming discrete aperture areas in continuous or semi-continuous light absorbing (i.e. obstructing) areas. Conversely, with microstructures that are recesses (e.g., the hemispherical recesses shown in FIGS. 32 and 33) it is the electrophoretic ink that projects into the non-planar, polymer structure and the charged particles are concentrated in the recesses forming discrete light blocking/obstructing areas in continuous or semi-continuous light transmitting areas.

Figure 45:
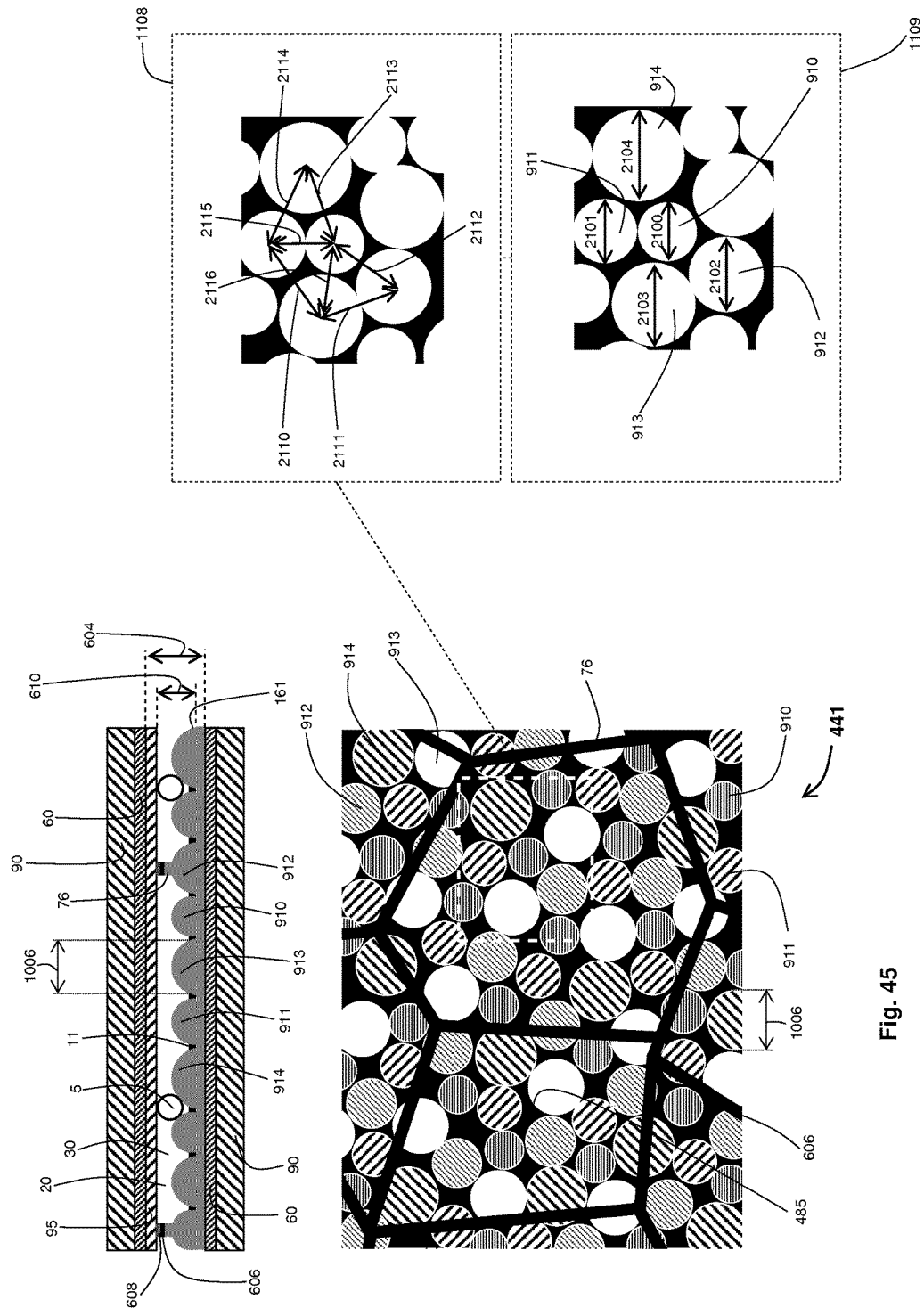
FIG. 45 shows a cross section and face view of embodiment 441 in a second light state. Non planar polymer structure 161 has a number of differently sized hemispheres, and the hemispheres are in an aperiodic arrangement. The polymer walls are also aperiodic.

In the second light state the apertures or obstructions are defined by cross sections through the microstructures parallel to the substrates in the plane of (or containing) the concentrated charged particles that form the extent (or edge) of the apertures or obstructions. This is shown in FIG. 45. Apertures 1006 are defined by the extent of black charged particles 11 about the protrusions and in a plane parallel to the substrates 90 as shown in the cross sectional view. The face view shows that the apertures 1006 are circular and their circumferences correspond to the circumferences of cross sections through the hemispherical protrusions in the plane of the charged particles (see exploded views 1108 and 1109). Preferably the cross sections have variable area forming variably sized apertures as shown in the exploded view 1109 in FIG. 45. In some intermediate light states, such as described in earlier sections and shown in FIGS. 2C and 2D, the apertures are also defined by cross sections through the microstructures parallel to the substrates and containing the charge particles that define the extent (or edge) of the aperture 1006, see the cross sectional and face views of FIG. 2C.

In embodiments the circumferences of apertures or obstructions are the main source of diffraction, and the total circumference of the apertures or obstructions is proportional to the total resulting light diffraction. In the second light state the total circumference of the apertures is minimized per square unit of face area (e.g., per square centimeter or per square meter) of the device, or conversely, the mean aperture area is maximized. Correspondingly in embodiments the circumference of cross sections through microstructures in the plane defined by charged particles in the second light state is minimized, or conversely, the mean cross sectional area of microstructures is maximized. In embodiments where the microstructures are protrusions the mean diameter (or major axis) of the apertures is more than 20 microns, preferably more than 50 microns, more preferably more than 80 microns, and most preferably more than 95 microns. Advantageously, light diffraction is less in embodiments when the apertures are discrete and the concentrated charged particle area is continuous or semi-continuous for a given light transmittance level. Never-the-less, some embodiments have discrete obstructions (defined by concentrated charged particles in recesses) in continuous or semi-continuous light transmitting areas. In the figures that follow embodiments that have discrete apertures in surrounding continuous light obstructing areas (i.e. concentrated, black, charged particle area) are shown but the descriptions can readily be applied to embodiments that have discrete obstructions in surrounding continuous light transmitting areas.

In embodiments the non-planar polymer structure and the suspending fluid are optically-transparent. Light travels from the suspending fluid to the non-planar, polymer structure without significant diffraction by refractive index matching both, preferably to within 0.0035, and most preferably within 0.002 (as defined in earlier sections).

The first, second and intermediate light states were described earlier, for example, in relation to embodiment 202 shown in FIGS. 2A to 2G. In embodiments the black charged particles are responsive to an electrical field applied to the electrodes of the light attenuator to move (or translate position) between: a first extreme light state adjacent the first electrode in which the particles are maximally spread within the cell to lie in the path of light through the cell strongly attenuating light, and a second extreme light state adjacent the surface of the non-planar, polymer structure in which the particles are maximally concentrated to remove them from the path of light through the cell substantially transmitting light. In some embodiments the microstructures are closely-packed protrusions projecting into the electrophoretic layer and contacting the suspending fluid, and under the influence of an electrical field the charged particles are deflected from their path from the first electrode (first light state) to the second electrode (second light state) moving over the surface of the protrusions and being driven to concentrate in the interstices of the protrusions to form the second light state.

In the second and intermediate light states the charged particles form a concentrated edge to the apertures or obstructions providing a sharp transition (in an edge area) between visible light transmitting and visible light absorbing, and preferably in embodiments the apertures are substantially free of charged particles. In some embodiments the surface of the microstructures (defining the surface of the non-planar polymer structure) slows the velocity of the black charged particles as they move over the surface in an electrical field relative to the velocity of the particles in the suspending fluid before reaching the surface. Advantageously this slowed velocity assists in concentrating the particles as they move towards the interstices in the light state. For example, the slope of a microstructure's surface affects the velocity of particles deflected over its surface. Similarly, surface energy, chemical affinity, roughness, and surface functionality differences between the charged particles and the solid polymer surface affects the velocity of particles deflected over its surface and is used to slow the velocity of the charged particles as they deflect over the solid polymer surface.

FIG. 45 shows embodiment 441 in the second light state. Its non-planar, polymer structure 161 has aperiodically arranged hemispherical protrusions (910 to 914). The non-planar polymer structure 161 is replicated from a polymer surface produced by randomly close-packing protrusions in a monolayer as described in earlier sections. The exploded view 1108 shows that the centre-to-centre dimensions of neighbouring apertures defined by the cross sectional areas of protrusions are different (see dimensions 2110, 2111, 2112, 2113, 2114, 2115 and 2116) consistent with an aperiodic arrangement. Furthermore, the protrusions have a mix of different diameters enhancing the randomness of the aperiodic arrangement as shown by their corresponding apertures in the second light state in exploded view 1109. The apertures are defined by the protrusions 910, 911, 912, 913 and 914 and their respective diameters are 2100, 2101, 2102, 2103 and 2104. In related embodiments the differences derive from a population of microstructures having randomness in at least one feature such as diameter or surface shape. In some embodiments a mix of these differences is used, preferably having equal incidence of each one (each difference) and random probability for each one. In embodiments both the discrete apertures and the continuous light obstructing area (i.e. the concentrated black charged particles area) are random, or possess a degree of randomness. Light encountering embodiment 441 diffracts with a significant degree of randomness and minimizes the perception of a diffraction pattern about a bright light source viewed through the device.

The earlier described embodiment 204 shown in FIG. 4 is similar in that it too has protrusions of different diameters and the different protrusions align to a tangential plane 1042 in the electrophoretic ink layer 1204 (see FIG. 4). Non-planar, polymer structure 161 can be made as a replication of a polymer template using one or more moulding steps as described in the previous section. A suitable polymer template can be made as described earlier in relation to FIGS. 4 and 24. In FIG. 45 the cell gap spacer 5 is dispersed in the electrophoretic ink 30 and coated along with the ink similar to FIG. 25. As described in earlier sections, black charged particles 11 are in suspension in suspending fluid 20 and are free to spread in a plane parallel to the face of top electrode 60 in a first light state (i.e. spacers 5 and polymer walls 76 space the inner most layer on top substrate 90—insulating layer 95 in the figure—apart from the protrusions ensuring that the protrusions do not bridge the electrophoretic ink layer 610. The electrophoretic cell 604 comprises all the elements sandwiched by the pair of electrodes 60 and in devices having a replicated, non-planar polymer structure its thickness (i.e. z-axis dimension) is typically within a few microns of the thickness of the electrophoretic ink layer 610.

Polymer walls 76 divide the electrophoretic layer 610 into discrete cavities 485 shown in the face view of FIG. 45. The walls 76 are covered by black mask 606 and span between the substrates bonding to the insulating layer 95 of top substrate 90 using cured adhesive 608 as described earlier in relation to FIGS. 39 to 41B. In the second light state the black mask is a light obstruction and a source of diffraction in areas where it divides the surface of a protrusion creating two apertures instead of one. To minimize or avoid the perception of a diffraction pattern arising from the black mask 606 on polymer walls 76, the arrangement of the polymer walls and the cavities 485 are aperiodic.

In some embodiments pillars (or spacers or columns) set the cell gap and space apart the non-planar, polymer structure and the top substrate, optionally bonding to both. The pillars appear black in a face view and are an obstruction locally where a pillar edge is adjacent a light transmitting area in the second light state (e.g., when a pillar falls within an aperture). To minimize or avoid the perception of diffraction pattern arising from the black mask on the pillars, the arrangement of the pillars are aperiodic.

Figure 46:
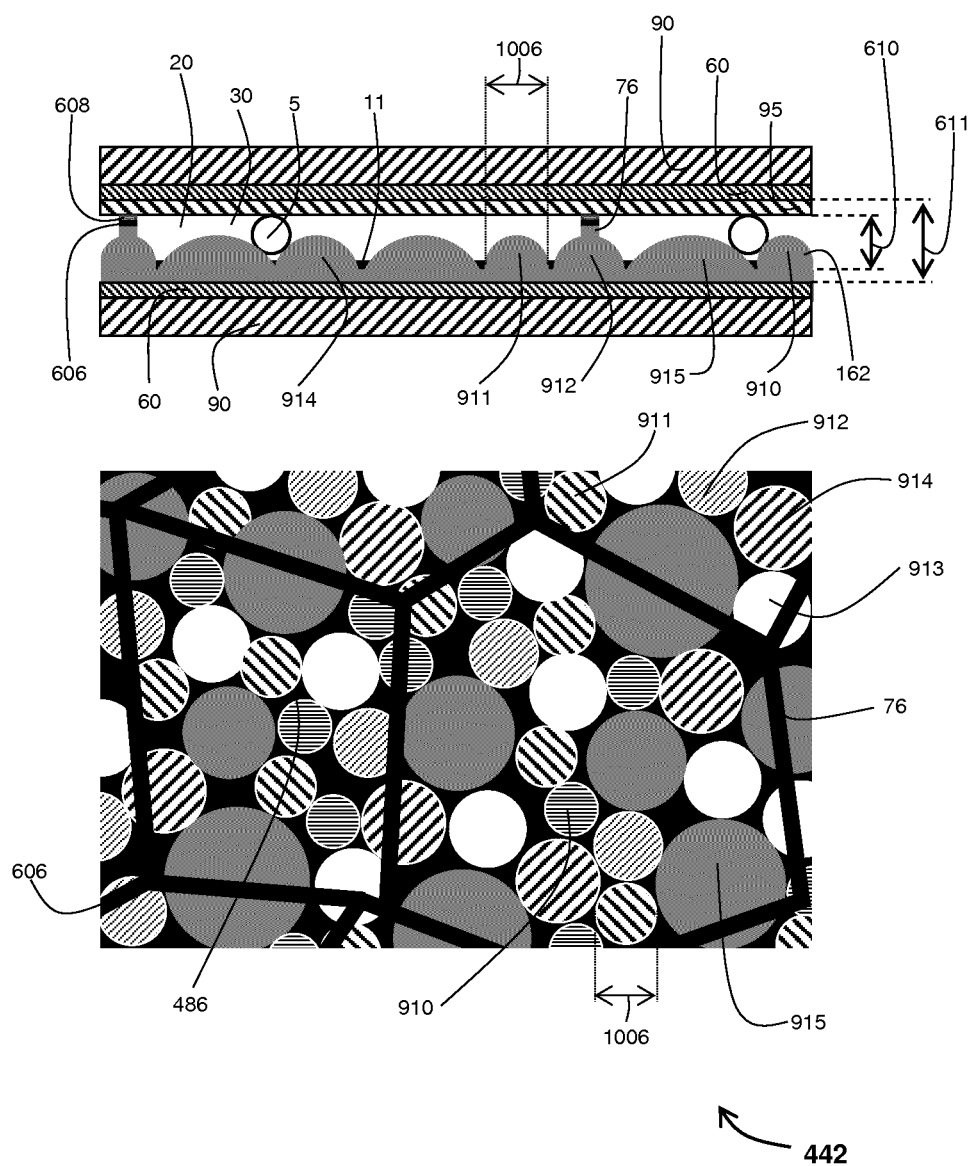
FIG. 46 shows a cross section and face view of embodiment 442 in a second light state. Non planar polymer structure 162 comprises a mix of differently sized spherical caps and hemispheres in an aperiodic arrangement.

FIG. 46 shows embodiment 442 in the second light state. Its non-planar, polymer structure 162 has aperiodically arranged protrusions in electrophoretic cell 611. Some protrusions are hemispherical similar to embodiment 441 in FIG. 45, these are 910, 911, 912 and 914. To enhance the differences in the cross sectional area of protrusions (and consequently apertures) in the second light state, some protrusions are spherical caps instead of being hemispheres and this type of protrusion is indicated by 915 in FIG. 46. Similar to embodiment 441, in embodiment 442 the centre-to-centre dimensions of neighbouring apertures defined by the cross sectional areas of protrusions are different consistent with an aperiodic arrangement. Furthermore, the enhanced mix of different diameters in device 442 enhances the randomness of the aperiodic arrangement. Both the discrete apertures and the continuous light obstructing area, that is the concentrated black charged particles area, are random, or possess a degree of randomness. Light encountering embodiment 442 diffracts with a greater degree of randomness than for device 441 and minimizes the perception of a diffraction pattern about a bright light source viewed through the device.

To minimize or avoid the perception of a diffraction pattern arising from the black mask 606 on polymer walls 76, the arrangement of the polymer walls and the cavities 486 are aperiodic.

In some embodiments to enhance randomness the microstructures on the non-planar, polymer structure have their surface deformed. Suitable techniques for deforming the surface of a non-planar, polymer structure (e.g. structures 161 or 162) include non-uniformly melting, non-uniformly corroding, non-uniformly etching, non-uniformly milling, or non-uniformly laser ablating. A suitably deformed non-planar, polymer structure is then replicated in moulding steps as described in the previous section. In an example of a non-uniform corroding technique, non-planar, polymer structure 161 is dipped in a solution of sulphuric acid and nitric acid. By controlling the dipping time and the solution ratio arbitrary surface profiles for the microstructures can be achieved.

Figure 47:
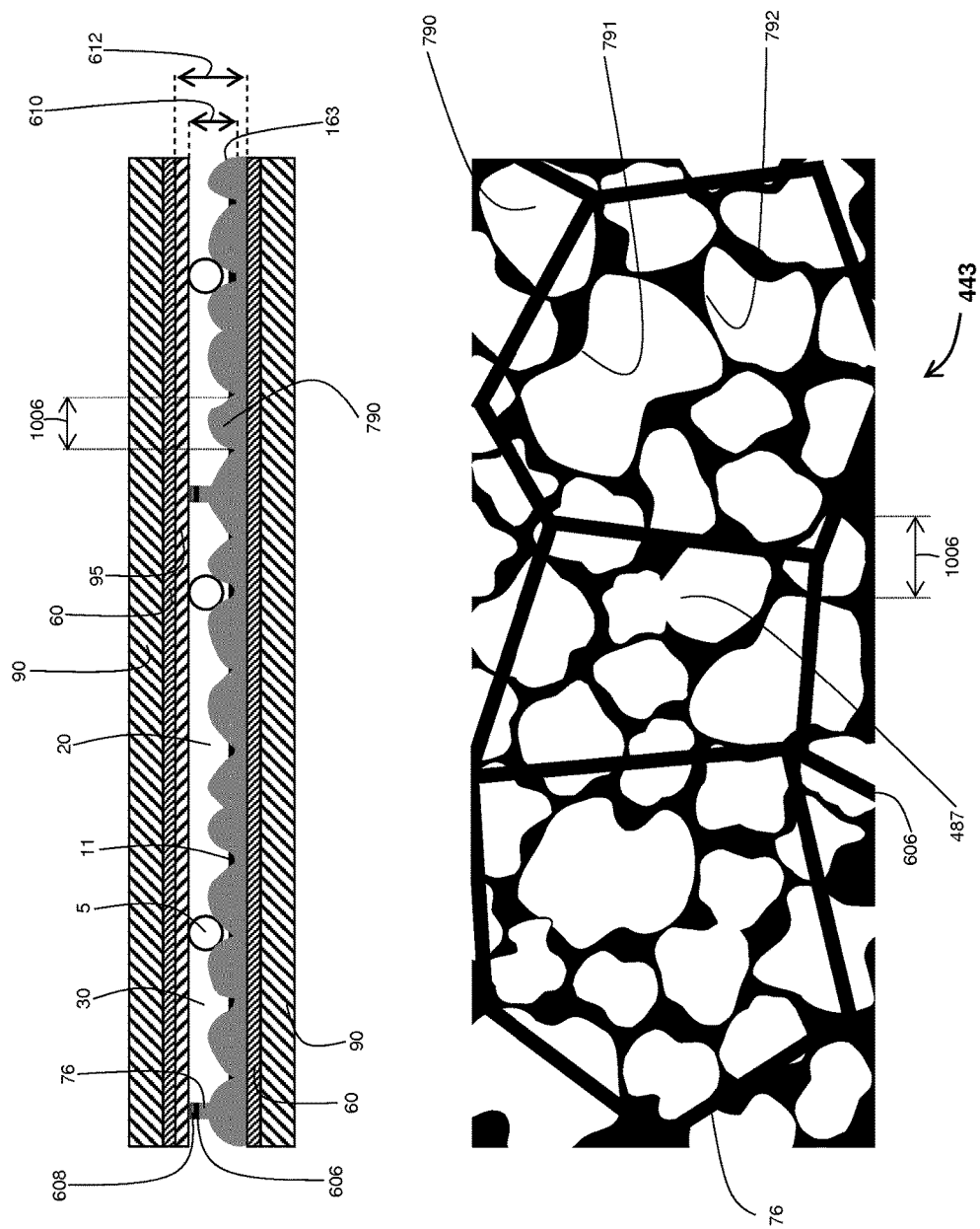
FIG. 47 shows a cross section and face view of embodiment 443 in a second light state. Non planar polymer structure 163 is aperiodic and comprises protrusions having a degree of randomness in their shape, size and orientation.

FIG. 47 shows embodiment 443 in the second light state. Similar to earlier embodiments, black charged particles 11 are deflected by (or move over) the surface of protrusions 790 in an electrical field and concentrate in the interstices of protrusions 790 as shown. The non-planar, polymer structure 163 has aperiodically arranged protrusions in electrophoretic cell 612. The surface shape and orientation of its protrusions 790 are different from each other and can be random or possess a degree of randomness. Protrusions of the type 790 have convex 792 and concave 791 parts and in embodiment 443 protrusions are shown with a plurality of convex and concave parts. To enhance randomness the protrusions 790 have a mix of different slopes corresponding to a mix of curvatures. Both the discrete apertures 1006 and the continuous light obstructing area, that is the concentrated black charged particles area, are random, or possess a degree of randomness. Light encountering embodiment 443 diffracts randomly and avoids the perception of a diffraction pattern about a bright light source viewed through the device.

To minimize or avoid the perception of a diffraction pattern arising from the black mask 606 on polymer walls 76, the arrangement of the polymer walls and the electrophoretic ink cavities 487 are aperiodic.

Similar to embodiments 441 and 442, the highest point of the surface of the respective protrusions (nearest point to the top substrate 90) substantially falls within a common plane parallel to the plane of the top substrate 90. This ensures that black charged particles 11 can spread adjacent the top electrode 60 in the first light state and cover the protrusions in the non-planar, polymer structure as shown for example in FIG. 41A earlier. In some embodiments to enhance randomness in intermediate light states the protrusions have different heights in the z-axis (i.e. perpendicular to a face) resulting in the highest protrusions forming apertures before charged particles 11 are concentrated by lower protrusions (i.e. corresponding to intermediate light states closest to the first light state). The lower protrusions begin to form apertures as increased light transmittance is required (i.e. as intermediate light states approach the second light state). Intermediate light states were described earlier and shown in FIGS. 2C to 2G. In embodiments intermediate light states have aperiodic apertures and obstructions defined by microstructures and diffract light randomly.

Figure 48:
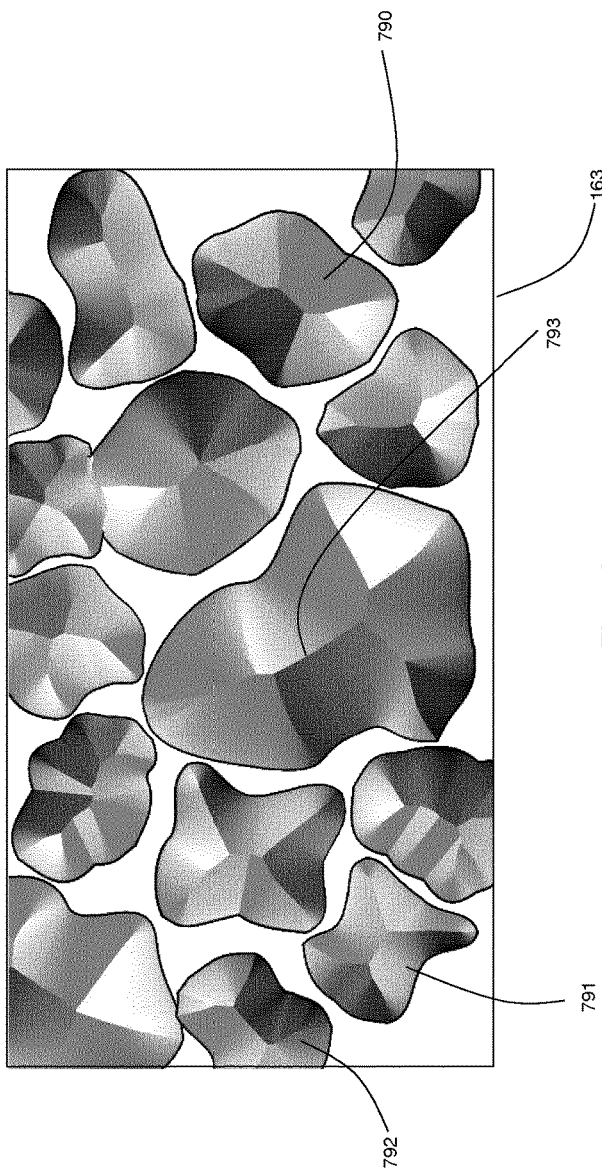
FIG. 48 shows a face view of the non-planar polymer structure 163 from embodiment 443 (FIG. 47).

FIG. 48 shows non-planar, polymer structure 163 in a face view. The protrusions 790 are rendered as three-dimensional surfaces. These are the structure and protrusions used in embodiment 443 (see FIG. 47). The protrusions have different cross-sectional areas and different cross-sectional, geometric forms defining different aperture areas as shown in FIG. 47. To enhance randomness the circumferences of the protrusions (and consequently apertures) are irregular and different from one another. In FIG. 48 protrusions 790 have smooth curvature parts corresponding to convex 792 and concave 791 parts. Some protrusions have a ridge 793, others a col, others an apex, and still others a dome. In some embodiments protrusions can run into each other resulting in two or more peaks that initially form two or more apertures in device 443 before merging into one as intermediate light states approach the second light state. The protrusions 790 are irregular and randomly orientated. They can have a mix of arbitrary surface profiles including spherical, aspherical, toroidal, hyperbolic, parabolic, ellipsoidal, and facets.

Figure 49:
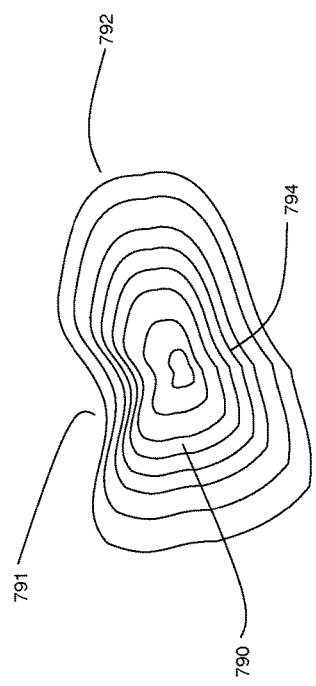
FIG. 49 is an exploded view of a protrusion from FIG. 48 with its surface shape represented by contour lines.

FIG. 49 shows an exploded of a protrusion 790 of the type in non-planar, polymer structure 163 (see FIGS. 47 and 48). The continuously varying surface of protrusion 790 is shown using contour lines 794. The spacing between contour lines 794 corresponds to slope with less spacing indicating greater slope. The circumference of protrusion 790 approximates an aperture in the second light state, the exact aperture circumference being determined by the edge or extent of the concentrated charged particles 11. The circumference has convex 792 and concave 791 parts and is irregular enhancing the randomness of light that diffracts on passing the circumference.

Figure 50:
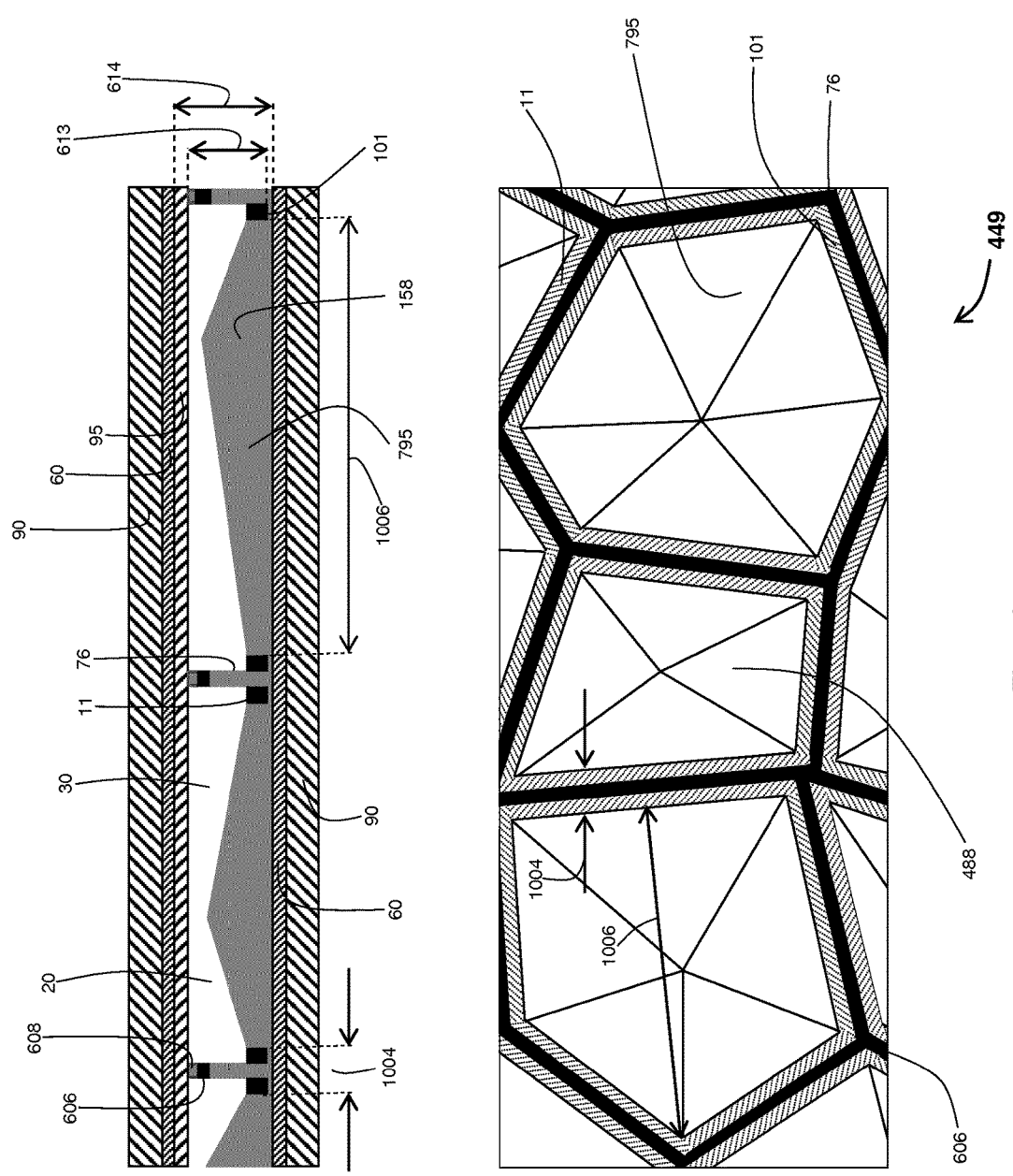
FIG. 50 shows a cross section and face view of embodiment 449 in a second light state. Non-planar polymer structure 158 comprises protrusions 795 whose extent coincides with channels 101 and cavities 488.

FIG. 50 shows embodiment 449 in the second light state. Similar to earlier embodiments, black charged particles 11 are deflected by (or move over) the surface of protrusions 795 in an electrical field and concentrate in the interstices of protrusions 795 forming apertures 1006. The non-planar, polymer structure 158 has aperiodically arranged protrusions 795 in electrophoretic cell 614. The surface shape, cross-sectional area, cross-sectional geometric form, and orientation of its protrusions 795 are different from each other and can be random or possess a degree of randomness. Protrusions of the type 795 are asymmetrical and have facets with different areas and slopes to enhance the randomness of the apertures 1006 defined by the protrusions in light states. Light encountering embodiment 449 diffracts randomly and avoids the perception of a diffraction pattern about a bright light source viewed through the device. Furthermore, device 449 has less light diffraction than device 443.

Channels 101 coincide with the interstices of protrusions 795 and hold concentrated, black, charged particles 11 in the second light state. The channels 101 are recesses in the non-planar, polymer structure 158 and are at least partly below the level of the protrusions 795 as shown in the cross sectional view. In embodiments concentrated black, charged particles fill a volume in the interstices of protrusions proportional to the particle loading in the electrophoretic ink (e.g. a particle loading in the range 5% to 30% by mass of the ink). In viewing a face of the device in the second light state the concentrated particles form light absorbing areas (i.e. obstructions) that limit the maximum light transmittance. Advantageously channels 101 minimize the face area covered by concentrated, black, charged particles 11 in the second light state by concentrating (or stacking) the particles in the z-axis of the cell 614.

In embodiment 449 each protrusion 795 is closely surrounded by its channel 101 and a polymer wall 76 and their extent define an electrophoretic ink cavity 488. In the face view of FIG. 50 the black mask 606 covering polymer walls 76 is in peripheral areas of the apertures (i.e. does not form part of an aperture's circumference) in the second light state with wall edges adjacent concentrated black particles 11 as shown by light obstruction dimension 1004. Advantageously in embodiment 449 black mask 606 covering walls 76 does not diffract light because along its circumference (in a face view) it does not coincide with a light transmitting area. In a related embodiment to 449 the channel 101 is absent and black charged particles 11 concentrate in the volume between the protrusion 795 and its surrounding wall 76 and adjacent the bottom electrode 60. More generally, it is advantageous in embodiments that polymer wall sections (or lengths in the face view) coincide with peripheral areas of protrusions so that in the second light state concentrated black charged particles are adjacent an edge of the wall section.

Preferably, the non-planar, polymer structure 158 is continuous in the cell 614 and isolates the electrophoretic ink layer 613 from the bottom electrode 60. Both the discrete apertures 1006 and the continuous light obstructing area 1004, that is the concentrated black charged particles area and the black mask area, are random, or possess a degree of randomness. To minimize or avoid the perception of a diffraction pattern arising from the black mask 606 on polymer walls 76, the arrangement of the polymer walls and the cavities 488 they form, are aperiodic.

In related embodiments to 449, the cavities, polymer walls and channels coincide with the extent of more than one microstructure. For example, each electrophoretic ink cavity, defined by its surrounding polymer walls 76, contains two or more protrusions with part of their extent coinciding with the walls, and each protrusion is surrounded by a channel.

The non-planar, polymer structure 158 in device 449 is derived from a photosensitive polymer (cured photoresist) exposed by a laser beam or electron beam (e-beam) and developed to reveal the surface of microstructures. Preferably each microstructure is independently written, asymmetrical, and randomly orientated. More preferably, the parameters that define each are uncorrelated, and the close-packing of microstructures and cavities has random centres. The technique of using the controlled exposure of a photosensitive polymer to develop the surface of the non-planar, polymer structure was described in the earlier section relating to replication by moulding.

The size of apertures and obstructions in embodiments is maximized as described earlier to minimize their total circumference per square unit of face area. The upper limit is determined by the resolution of a typical viewer's eye. Preferably apertures and obstructions are sufficiently small that their geometric form in a face view is not apparent. In embodiments where the microstructures are protrusions and the black charged particles form discrete apertures in the second light state, the maximum angle subtended by an aperture to a viewer at a required viewing distance is one arcminute (corresponding to 290 microns at a viewing distance of 1 meter) and preferably 0.6 arcminutes (corresponding to 174.5 microns at 1 meter). The subtended angle of the aperture pitch (i.e. aperture and concentrated charged particle area) is double these limits. In embodiments where the microstructures are recesses and the black charged particles form discrete obstructions in the second light state, the maximum angle subtended by an obstruction to a viewer at a required viewing distance is one arcminute (corresponding to about 290 microns at a viewing distance of 1 meter) and preferably 0.6 arcminutes (corresponding to about 174.5 microns at 1 meter). The subtended angle of the obstruction pitch (i.e. obstruction and light transmitting area) is double these limits.

The invention claimed is:

1. A light attenuator comprising:
   a cell comprising a first substrate and a second substrate spaced apart from said first substrate, and
   a layer between said substrates containing an electrophoretic ink, a surface of said layer adjacent said second substrate comprising a monolayer of closely packed transparent protrusions projecting into said layer, said protrusions having surfaces defining a plurality of depressions in the volumes there between, said ink including charged particles of at least one type, the particles being responsive to an electric field applied to said cell to move between:
   a first extreme light state, in which particles are maximally spread within the cell to lie in the path of light through the cell and to strongly attenuate light transmitted through the cell;
   over the surface of said protrusions, which deflect said particles from their path from the first substrate to the second substrate;
   to a second extreme light state in which said particles are maximally concentrated within each said depression to remove them from the path of light through the cell and to substantially transmit light through the cell.

2. A light attenuator as claimed in claim 1, wherein each of said substrates comprises a respective electrode defining an electrophoretic cell.

3. A light attenuator as claimed in claim 1, wherein said electrophoretic cell is metastable having one or more light states intermediate said first and second light states.

4. A light attenuator as claimed in claim 1, wherein said protrusions are either: monodisperse or have a distribution of sizes and/or shapes.

5. A light attenuator as claimed in claim 1, wherein said protrusions comprise surfaces which are at least partly defined by non-planar structures.

6. A light attenuator as claimed in claim 5 wherein the protrusions non-planar structures are in discrete form.

7. A light attenuator as claimed in claim 1 wherein in said second light state, each protrusion provides a discrete aperture area that is substantially free of said charged particles and transparent to specular light, said charged particles in said second light state surrounding said aperture areas defining a contiguous strongly light attenuating area.

8. A light attenuator as claimed in claim 1 wherein the particles are responsive to an electric field applied to said cell to move between two unidirectional sets of intermediate light states, a first set of intermediate light states transitioning from said first light state and providing a range of increasing light transmittance levels as charged particles vacate an increasing aperture area on each protrusion's surface as a second light state is approached, and a second set of intermediate light states transitioning from said second light state and providing a range of decreasing light transmittance levels as concentrated charged particles spread adjacent said first electrode, decreasing aperture areas as said first light state is approached.

9. A light attenuator as claimed in claim 1 wherein said electrophoretic cell includes one or more of the following polymer elements: protrusions, space-filling polymer, and cavity walls; said elements being optically isotropic and refractive index matched to a suspending fluid of said electrophoretic ink, preferably within 0.01 of each other, more preferably within 0.005, and most preferably within 0.002.

10. A light attenuator as claimed in claim 9 wherein said polymer elements comprise either: a non-polar, amorphous, polymer; or a polar, amorphous polymer.

11. A light attenuator as claimed in claim 1 wherein less than about 10% of said protrusions provide cell-gap spacers, determining the cell gap of the electrophoretic cell.

12. A light attenuator as claimed in claim 2 wherein said electrophoretic cell is divided into a monolayer of discrete or semi-discrete cavities, said cavities conforming to the curvature of said protrusions on one side and the planar surface of said second electrode on another side.

13. A light attenuator as claimed in claim 1 wherein said charged particles include one of: a dye colorant, the charged particles being refractive index matched to the electrophoretic ink suspending fluid; a pigment colorant; or comprise one of positively or negatively charged black particles.

14. The light attenuator as claimed in claim 1 wherein the light attenuator is incorporated as a layer in one of a mirror, a window, a light shutter, a light modulator, a variable light transmittance sheet, a variable light absorptance sheet, a variable light reflectance sheet, a monochrome display, a color display, an electrophoretic skin, an electrophoretic paint layer, an electrophoretic sun visor for a vehicle and a see-through display.

15. A device according to claim 14 including a reflective surface wherein said electrophoretic ink layer is disposed adjacent said reflective surface, and in a first light state said charged particles directly mask the reflective surface.

16. A light attenuator as claimed in claim 1 wherein the depressions are in contiguous form.

17. A light attenuator as claimed in claim 5, wherein a maximum separation of adjacent non-planar structures at a plane incorporating said depressions, does not exceed 250 microns and more preferably does not exceed 150 microns to avoid a perceivable optical defect.

* * * * *